US012271720B1

(12) United States Patent
Silver et al.

(10) Patent No.: US 12,271,720 B1
(45) Date of Patent: *Apr. 8, 2025

(54) SYSTEM AND METHODS FOR DETECTING REQUIRED RULE ENGINE UPDATES USING ARTIFICIAL INTELLIGENCE MODELS

(71) Applicant: Citibank, N.A., New York, NY (US)

(72) Inventors: Miriam Silver, Tel Aviv (IL); James Myers, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/781,965

(22) Filed: Jul. 23, 2024

Related U.S. Application Data

(63) Continuation-in-part of application No. 18/535,001, filed on Dec. 11, 2023, now Pat. No. 12,045,610.

(51) Int. Cl.
*G06F 8/60* (2018.01)

(52) U.S. Cl.
CPC ...................... *G06F 8/60* (2013.01)

(58) Field of Classification Search
CPC ........................................................ G06F 8/60
USPC ............................. 717/168–174; 706/25–45
See application file for complete search history.

(56) References Cited

U.S. PATENT DOCUMENTS

| | | | | |
|---|---|---|---|---|
| 5,586,218 A * | 12/1996 | Allen | ................. | G06N 3/004 706/14 |
| 5,671,361 A * | 9/1997 | Brown | ................. | G06Q 10/06 705/7.23 |
| 7,313,552 B2 * | 12/2007 | Lorenz | ................. | G06N 5/025 706/45 |
| 7,984,513 B1 * | 7/2011 | Kyne | ................. | G06F 21/10 726/30 |
| 8,572,552 B2 * | 10/2013 | Kennaley | ................. | G06F 8/10 717/104 |
| 8,930,298 B2 * | 1/2015 | Demuth | ................. | G06N 5/025 706/48 |
| 9,020,872 B2 * | 4/2015 | Junker | ................. | G06N 5/025 706/45 |
| 9,251,466 B2 * | 2/2016 | Rajesh | ................. | G06N 5/027 |
| 10,949,337 B1 * | 3/2021 | Yalla | ................. | G06N 20/00 |
| 11,436,777 B1 * | 9/2022 | Karli | ................. | G06V 20/13 |
| 11,676,685 B2 * | 6/2023 | Jaganathan | ................. | G06V 10/764 706/25 |
| 11,803,792 B2 * | 10/2023 | Makhija | ................. | G06Q 10/08 |

(Continued)

OTHER PUBLICATIONS

Sottara et al, "Enhancing a Production Rule Engine With Predictive Models Using PMML", ACM, pp. 39-47 (Year: 2011).*

(Continued)

*Primary Examiner* — Anil Khatri
(74) *Attorney, Agent, or Firm* — Foley & Lardner LLP

(57) ABSTRACT

The systems and methods provide a model deployment criterion. The model deployment criterion indicates a difference in a value against which the proxy model may be measured to determine when, if ever, the proxy model should be deployed to replace the existing rule engine. The model deployment criterion may be keyed to the proxy model (e.g., based on a difference in its size, throughput speed, number of changes, etc.), the existing rule engine (e.g., based on a difference in its age, update occurrences to its rule base, etc.), and/or comparisons between models (e.g., based on differences in results, throughput speed, efficiency, etc.).

18 Claims, 12 Drawing Sheets

(56) References Cited

U.S. PATENT DOCUMENTS

| | | | |
|---|---|---|---|
| 12,094,010 B1* | 9/2024 | Hampapur | G16H 40/20 |
| 12,131,819 B1* | 10/2024 | Murray | G16H 10/60 |
| 2021/0173935 A1* | 6/2021 | Ramasamy | G06F 21/577 |

OTHER PUBLICATIONS

Rattanasawad et al, "A Review and Comparison of Rule Languages and Rule-based Inference Engines for the Semantic Web", IEEE, pp. 1-6 (Year: 2013).*

Behravesh et al, "Rule Modeling Engine for Optimizing Complex Event Processing Patterns", IEEE, pp. 128-135 (Year: 2009).*

Genesis et al "ClRef: A Tool for Visualizing the Historical Data of Software Refactorings in Java Projects", ACM, pp. 174-179 (Year: 2023).*

Kibria et al, "Big Data Analytics, Machine Learning, and Artificial Intelligence in Next-Generation Wireless Networks", IEEE, pp. 32328-32338 (Year: 2018).*

Langley et al, "Applications of Machine Learning and Rule Induction", ACM, pp. 54-64 (Year: 1995).*

* cited by examiner

100

```
pseudo                                          Copy code

RULE "Age Check"
WHEN
   User.age >= 18
THEN
   Actions:
      - Allow access to the website
      - Grant user privileges
END RULE RULE "Discount Calculation"
WHEN
   User.totalPurchaseAmount > 1000
THEN
   Actions:
      - Apply a 10% discount to the total
END RULE
```

150

```
rule                                            Copy code when
   $order: Order(totalAmount > 1000)
then
   $order.applyDiscount(10); // Apply a 10% discount to the order
end
```

FIG. 1

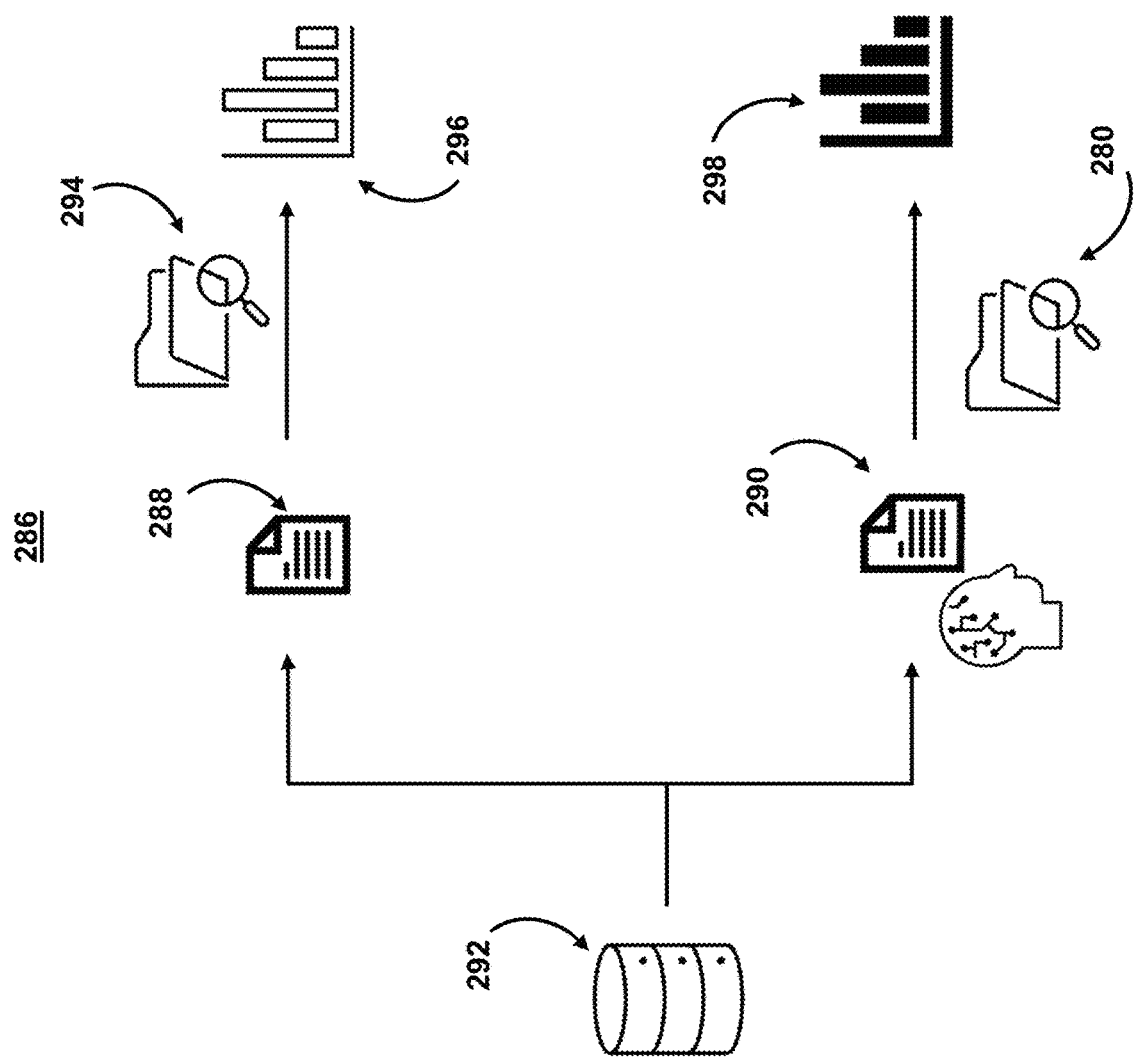

SYSTEM AND METHODS FOR DETECTING REQUIRED RULE ENGINE UPDATES USING ARTIFICIAL INTELLIGENCE MODELS

CROSS-REFERENCE TO RELATED APPLICATIONS

This application is a continuation-in-part of U.S. patent application Ser. No. 18/535,001, filed Dec. 11, 2023. The content of the foregoing application is incorporated herein in its entirety by reference.

This application is further related to U.S. patent application Ser. No. 18/669,421, filed May 20, 2024, which is a continuation-in-part of U.S. patent application Ser. No. 18/535,001. The content of the foregoing applications is incorporated herein in its entirety by reference.

BACKGROUND

A rule engine is a software system or component designed to process and execute a set of predefined rules to make decisions, perform actions, or provide automated responses. These rules are typically expressed in a formal, structured way (e.g., using specified script languages, rule conditions, rule actions, structured rules, etc.) and can be used to automate complex decision-making processes in various domains. However, updating rule engines can pose several technical challenges, depending on the complexity of the system and the specific requirements of the update. For example, rule engines often interact with other components and systems in an organization's technology stack, so updating the rule engine may introduce compatibility issues with other software, application programming interfaces (APIs), and/or data sources. Ensuring that the updated rule engine can seamlessly integrate with existing systems can be technically challenging. As another example, rule engines rely on a current rule base, rule sets, and/or conditions to make decisions. When updating a rule engine, the system needs to migrate data and rules from the old system to the new one. Ensuring a smooth and accurate data migration process can be technically complex, especially if the data structures have changed. As yet another example, rule engines manage highly complex rule sets with dependencies and interactions. Updating such rule sets while maintaining their logic and ensuring that they function correctly can be technically demanding. In view of these technical challenges, complexities, and demands, artificial intelligence may provide for improvements in updating rule engines.

Artificial intelligence, including, but not limited to, machine learning, deep learning, etc. (referred to collectively herein as "artificial intelligence models," "machine learning models," or simply "models"), refers to a wide-ranging branch of computer science concerned with building smart machines capable of performing tasks that typically require human intelligence. Key benefits of artificial intelligence are its ability to process data, find underlying patterns, and/or perform real-time determinations. Nonetheless, attempting to use an artificial intelligence-based solution in practical applications such as updating rule engines raises novel technical problems.

SUMMARY

Despite the benefits of artificial intelligence, solutions for updating rule engines have been hindered by several technical problems. For example, one approach to applying artificial intelligence to updating rule engines would be to train an artificial intelligence model to directly create or update the rule engine. However, as stated above, rule engines are often complex; thus, any model used to do so would need to be able to interpret these complexities. Moreover, training an artificial intelligence model to create or update a rule engine requires training data that indicates how to update the artificial intelligence model and/or what criteria to use to determine whether an update has a positive or negative effect.

To further complicate these issues, each set of training data would need to be specific to the model being updated as well as the objective being sought. Such a level of specificity is impractical for training purposes because gathering and generating the needed volumes of data can be both time-consuming and resource-intensive, the required quality of the training for the model to learn effectively is high, and the training data labeling (when needed) can be extremely labor-intensive, especially for complex data like images, videos, and/or texts.

Accordingly, systems and methods are described herein for overcoming the technical problems related to updating rule engines using artificial intelligence models without requiring training data specific to the model being updated or the objective being sought. For example, as opposed to training an artificial intelligence model to directly create or update the rule engine, the systems and methods are used to (1) detect when a rule engine should be updated; and (2) generate code to more effectively use current model components. Notably, the systems and methods to both detect when an update should be made as well as how to generate code may be done irrespective of the existing model components and/or an existing model objective. By doing so, the technical and practical burden of generate training data is greatly reduced.

With respect to detecting when a rule engine should be updated, the system may perform this detection irrespective of the existing model components and/or an existing model objective as the system generates modified inputs to determine when a proposed modifications to the rule engine script is required as opposed to directly creating and/or updating the rule engine. The system may then generate outputs based on the modified inputs. The outputs of the current rule engine (using actual inputs) may then be compared to the outputs of the modified inputs. The system may then compare the outputs for differences to particular characteristics to determine whether or not to update the rule engine. For example, by determining modified inputs that may mirror potential changes in future actual inputs, the system may determine when a modification to the rule engine is required. Moreover, as the model used to generate the different inputs determines only changes to potential characteristics of actual inputs (as opposed to changes to the model to generate new outputs), the training burden and/or required for training data is significant reduced and/or eliminated.

In some aspects, systems and methods for detecting required rule engine updated using artificial intelligence models that do not require training specific to model components and objectives are described. For example, the system may retrieve historical data for a first rule engine, wherein the historical data comprises historical inputs used by the first rule engine to generate historical outputs. The system may determine, using a first artificial intelligence model, a first modified input for the first rule engine based on a first data characteristic of a first subset of the historical inputs. The system may input the first modified input into the first rule engine, wherein the first rule engine processes the first modified input to generate a first modified output. The system may input a first actual input into the first rule engine to generate a first actual output. The system may determine a first difference between the first modified output and the first actual output. The system may compare the first difference to a first model deployment criterion. The system may determine whether to deploy a first modified rule engine based on comparing the first difference to the first model deployment criterion.

With respect to generating code, the systems may perform this generation irrespective of the existing model components and/or an existing model objective. For example, the system may determine characteristics of a first artificial intelligence model while that model is generating outputs. The system may then use a second artificial intelligence model that is trained to generate characteristic modifications based on detected patterns between labeled inputs to the first artificial intelligence model and characteristics used to process the labeled inputs. The similarity of the outputs of the models and/or the differences in the characteristics may be used to determine what changes in, e.g., processing efficiencies may be gained without modifying the outputs (or without modifying the outputs within a specified threshold). For example, by determining and comparing outputs of different versions of a rule engine script (e.g., versions that may rely on different model components, parameters, etc.), the system may indirectly determine different model components, parameters, etc. that result in similar (or improved) outputs. Moreover, as the model used to generate the modified script determines only changes to script, the training needs to only be specific to the script language not the existing model components and/or an existing model objective.

In some aspects, systems and methods for generating code for rule engines using artificial intelligence models without requiring training data that is specific to model components and objectives are described. For example, the system may identify a first characteristic for a first artificial intelligence model, wherein the first artificial intelligence model comprises a plurality of characteristics. The system may determine, using a second artificial intelligence model, a second characteristic for replacing the first characteristic in the first artificial intelligence model, wherein the second artificial intelligence model is trained to generate characteristic modifications based on detected patterns between labeled inputs to the first artificial intelligence model and characteristics used to process the labeled inputs. The system may process a first input through the first artificial intelligence model using the first characteristic to generate a first output. The system may process a second input through the first artificial intelligence model using the second characteristic to generate a second output. The system may determine a first difference between the first output and the second output. The system may determine whether to replace the first characteristic with the second characteristic in the first artificial intelligence model based on the first difference by deploying first modified script in the first artificial intelligence model corresponding to the second characteristic.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1 shows illustrative diagrams for rule engine script and modified rule engine script, in accordance with one or more embodiments.

FIG. 2C shows an illustrative diagram for generating code for rule engines using artificial intelligence models, in accordance with one or more embodiments.

DETAILED DESCRIPTION OF THE DRAWINGS

Figure 2A:
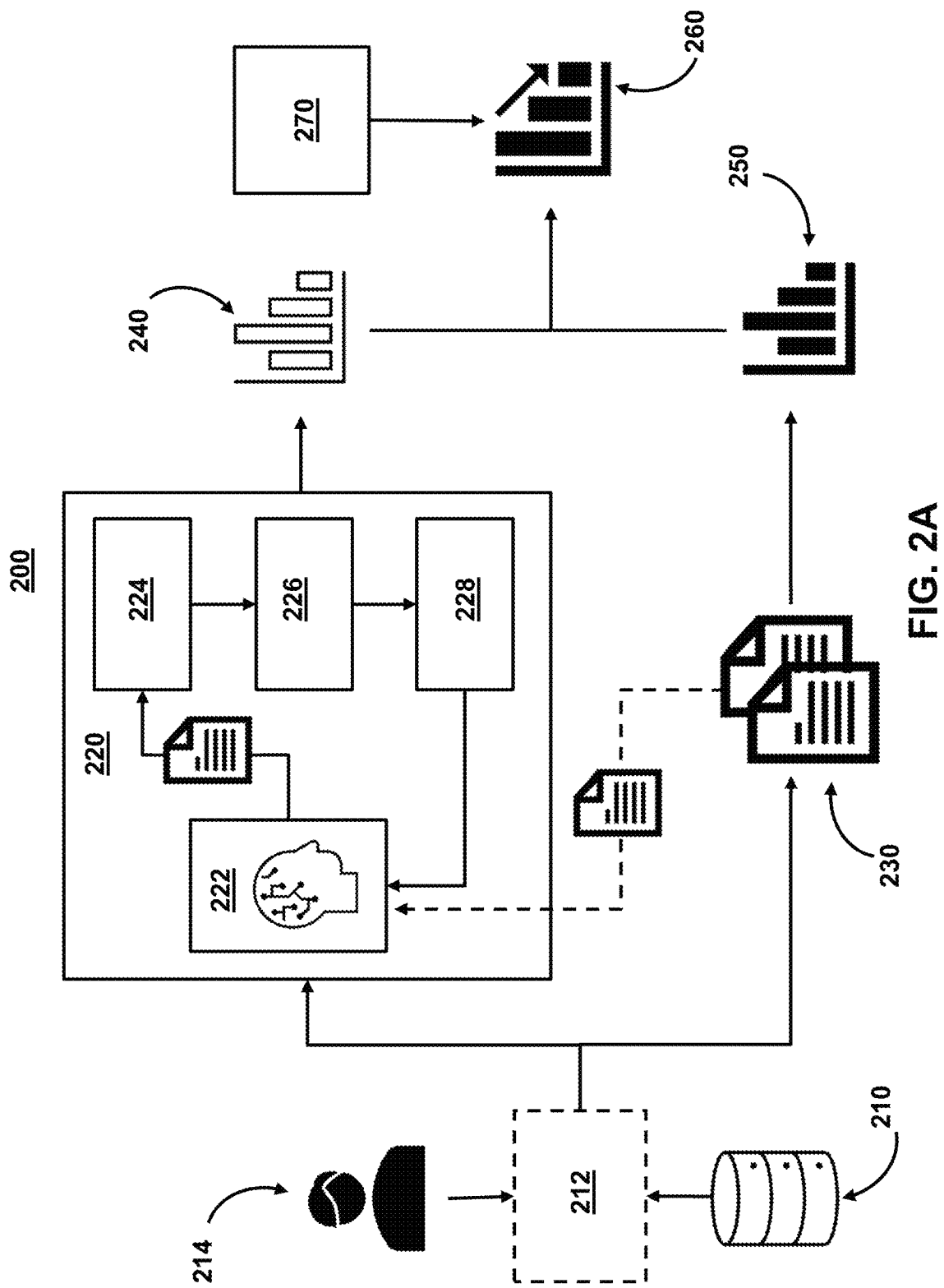
FIG. 2A shows an illustrative diagram for updating rule engines during software development using generated proxy models, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Despite the benefits of artificial intelligence, artificial intelligence solutions for updating rule engines have been hindered by several technical problems. For example, one approach to applying artificial intelligence to updating rule engines would be to train an artificial intelligence model to directly create or update the rule engine. However, as stated above, rule engines are often complex; thus, any model used to do so would need to be able to interpret these complexities.

One model that may potentially interpret this complexity would be an unsupervised model. For example, unsupervised models, such as deep neural networks, are incredibly complex, with millions or even billions of parameters. These models may learn patterns and relationships in data (e.g., relationships in high-dimensionality data) that may be difficult for humans to comprehend and/or visualize. Unfortunately, these models are considered "black boxes" because they do not provide insight into how they arrived at a particular decision. They learn from data, but the internal workings of the model are not transparent or easily interpretable. This creates a novel technical problem when applying unsupervised models to updating rule engines, which require explainability in the results. That is, the system needs to be able to describe how a rule engine was updated and/or how a particular result was derived.

Accordingly, systems and methods are described herein for novel uses and/or improvements to artificial intelligence applications requiring explainability such as updating rule engines. As one example, systems and methods are described herein for updating rule engines using generated proxy models that mimic the format and structure of the existing rule engines. For example, as opposed to training a model to directly create or update the rule engine, the system may train a model to modify script of the existing rule engine. By training the model to modify the script of the existing rule engine as opposed to directly creating or updating the rule engine, this "proxy" model mimics the format and structure of the existing rule engines (e.g., mimics the script language, rule conditions, rule actions, structured rules, etc.). Moreover, as the results of the proxy model consist of script that mimics the proxy model, this script can be reviewed and is thus explainable.

However, using the generated proxy model to modify script of the existing rule engine creates yet another novel technical problem. For example, model development of a model typically concludes with a validation step whereby testing data is used to determine that a given model is sufficiently trained (e.g., the testing data is used to verify that the results for the testing data match the results that would be expected based on the training data). As such, in a conventional training routine, validation would occur by determining that the results of the proxy model match the results of the existing rule engine. Yet training the proxy model to match the existing rule engine would serve no purpose (as the existing rule engine is already known and/or explainable). At best, the proxy model would continuously write and/or rewrite the script of the existing rule engine without a determined goal.

The systems and methods address this additional novel technical problem by instituting a model deployment criterion. The model deployment criterion indicates a difference in a value against which the proxy model may be measured to determine when, if ever, the proxy model should be deployed to replace the existing rule engine. The model deployment criterion may be keyed to the proxy model (e.g., based on a difference in its size, throughput speed, number of changes, etc.), the existing rule engine (e.g., based on a difference in its age, update occurrences to its rule base, etc.), and/or comparisons between models (e.g., based on differences in results, throughput speed, efficiency, etc.). For example, as opposed to directly comparing the modified rule engine to the existing rule engine, or even an output of the modified rule engine to an output of the existing rule engine, the system compares a difference in the outputs to the model deployment criterion. By doing so, the technical problems related to validating the proxy model are overcome as the validation indicates whether the differences in the proxy model and the existing model correspond to the model deployment criterion.

In some aspects, the systems and methods described herein update rule engines using generated proxy models with predefined model deployment criteria that mimic the format and structure of the existing rule engines as described. For example, the system may determine a first model deployment criterion. The system may determine, using a first artificial intelligence model, a first modified script for a first modified rule engine based on a first script extracted from a first existing rule engine, wherein the first artificial intelligence model is trained to generate rule engine script based on comparisons of historic script interpretations of historic rule bases for historic rule engines. The system may determine a first difference between a first output and a first modified output, wherein the first existing rule engine processes first rule base data to generate the first output, and wherein the first modified rule engine processes the first rule base data with the first modified script to generate the first modified output. The system may compare a first difference between the first output and the first modified output to the first model deployment criterion. The system may determine whether to deploy the first modified rule engine based on comparing the first difference to the first model deployment criterion.

As described herein, systems and methods are described herein for novel uses and/or improvements to artificial intelligence applications requiring explainability such as updating rule engines. As one example, systems and methods are described herein for updating rule engines using generated proxy models that mimic the format and structure of the existing rule engines. For example, as opposed to training a model to directly create or update the rule engine, the system may train a model to modify script of the existing rule engine. By training the model to modify the script of the existing rule engine as opposed to directly creating or updating the rule engine, this "proxy" model mimics the format and structure of the existing rule engines (e.g., mimics the script language, rule conditions, rule actions, structured rules, etc.). Moreover, as the results of the proxy model consist of script that mimics the proxy model, this script can be reviewed and is thus explainable.

For example, the system may train a generative model to improve rules-based decision engines. In such cases, the generative model may be first trained to improve rules generally (e.g., identifying and ingesting relevant data, recognizing rules, creating new rules, running new rules through filters and performance thresholds, and/or outputting revised rules) and then may be reused and tailored to specific rules-based decision engines. Training a generative model to improve rules within a rules-based decision engine involves several steps and considerations. Generative models, such as Transformer-based architectures, generative adversarial networks (GANs) or variational autoencoders (VAEs), aim to learn and generate new data that follows a certain distribution. Transformer-based models: excel at analyzing and generating rule scripts by capturing sequential relationships and contextual dependencies, enabling them to suggest nuanced and explainable rule modifications. As such, the system may gather and preprocess relevant data. This may involve identifying and ingesting datasets that contain information about the rules and their outcomes. In some embodiments, the data may be cleaned, normalized, and prepared for model training. The system may represent the rules and related data in a format suitable for the generative model. This may involve encoding rules, their attributes, and/or associated outcomes into a structured format that the model can understand and learn from. Training the generative model may involve, the system feeding it with the prepared dataset. The model may learn the underlying patterns, relationships, and structures within the rules and associated data. For example, a GAN might learn to generate new rules that adhere to the learned patterns. During fine-tuning transformers based and/or other pertained models learn to apply their pre-trained knowledge to engine-specific data to spot the underlying structure and relationships within the rule system. Once trained, the generative model can recognize existing rules and their patterns. It can also generate new rules by producing outputs that follow similar patterns observed in the training data. This could involve creating rules that conform to certain criteria or constraints. Running the generated rules through filters and performance thresholds is crucial to ensure their quality and effectiveness. Rules that meet certain performance criteria or validation tests are retained, while those that do not meet the specified thresholds are discarded or revised. The generative model's outputs—whether new rules or revised versions—may be integrated back into the rules-based decision engine. These updated rules can improve decision-making by adapting to changing conditions or optimizing performance based on the learned patterns. The system may then tailor a generative model to a specific rules-based decision engine, which may involve training the model on relevant and domain-specific data, adjusting model architecture or parameters to better capture the nuances of the rules, and/or refining the generated rules based on the specific requirements and performance metrics of the decision engine.

By doing so, the system mitigates the technical problems associated with generative artificial intelligence, namely generative models are expensive to create (e.g., computing resources to train), expensive to run (e.g., computing resources), and have low explainability (e.g., have difficulty explaining outcomes, have difficulty tracking & performing audit processes, and/or the same prompts produce different outcomes). The system thus also overcomes many of the technical problems of rules-based engines, namely rules-based decision engines are brittle (e.g., do not adapt when circumstances, data, context change), expensive to replace (e.g., revision requires extensive human analysis), and/or lack potential insights of generative models (e.g., detecting language patterns).

By overcoming these technical problems, the system may use a generative model that is trained to revise rules and may be reused on multiple rules-based decision engines. In doing so, the system may determine known performance indicators (KPIs), data sources, rules, outcomes. For example, KPIs may be measurable values that organizations use to evaluate the success of specific activities, projects, or processes in relation to their strategic goals. KPIs are essential tools for assessing performance, tracking progress, and making informed decisions to improve performance or outcomes. KPIs may directly relate to the goals and objectives of the organization or a specific project. They provide a clear indication of whether these objectives are being met. KPIs may be quantifiable and measurable, allowing for easy tracking and comparison over time. They are typically expressed as numerical values or percentages. KPIs may be easily understood by all stakeholders. They should communicate a clear message about performance without ambiguity. KPIs may have associated timeframes or periods over which they are measured, allowing for monitoring and assessment within specific intervals.

The system may generate new rules based on improving KPIs. These new rules (and/or a KPI associated with them) may comprise a deployment criterion. The system may test new rules for KPI improvements. The system may test new rules against filters (e.g., in order to avoid bad rules/bad outcomes that violate one or more requirements (e.g., anti-discrimination requirements)). For example, the system may determine a difference (e.g., a difference in a KPI) between a first output from an existing rule and a modified output from a rule generated by the generative model. Based on comparing the difference to the first model deployment criterion, the system may determine whether to deploy a modified rule engine.

FIG. 1 shows illustrative diagrams for rule engine script and modified rule engine script, in accordance with one or more embodiments. For example, FIG. 1 includes user interface 100 and user interface 150. As referred to herein, a "user interface" may comprise a human-computer interaction and communication in a device, and may include display screens, keyboards, a mouse, and the appearance of a desktop. For example, a user interface may comprise a way a user interacts with an application, content, and/or a website. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same.

In some embodiments, user interface 100 may present script for an existing rule engine. As described herein, script may be a sequence of instructions or commands written in a programming or scripting language that can be executed by a computer and/or an interpreter. Scripts may be used to automate tasks, perform specific actions, or solve problems within a software application, operating system, and/or other computing environments. Scripts may be shorter and less formal than full-fledged computer programs and are usually written in scripting languages, which are designed for ease of use and rapid development. As described herein, rule engine script may comprise a set of rules and conditions that specify how a system or application should behave in response to certain inputs or events.

Unlike compiled programs, scripts may be interpreted (and generated as described herein) line by line by an interpreter (such as a scripting engine or runtime environment) rather than being compiled into machine code. This makes scripts more portable and flexible but potentially slower. In some embodiments, scripts may be written in high-level programming languages, which are more human-readable and easier to write than low-level languages such as assembly or machine code. Script may be used for automating repetitive tasks, such as file operations, system maintenance, data processing, and more. Script can save time and reduce the risk of human error. In some embodiments, script can be used to customize and extend the functionality of existing software or systems. For example, rule engine script may be used to add interactivity to rule engines, and shell scripts for the rule engine may automate system administration tasks for the rule engine. In some embodiments, the script may respond to events or triggers by executing specific actions in response to certain conditions. For example, rule engine script may be used to generate interpretations of inputs.

User interface 100 includes script from an existing rule engine. While shown as pseudocode, the script may be written in one or more programming/scripting languages such as JavaScript (e.g., which may enable interactive and dynamic web pages), Python (e.g., which may improve simplicity and readability), Bash (e.g., a Unix shell scripting language used for automating system administration tasks in Linux and other Unix-like operating systems), PowerShell (e.g., a scripting language developed by Microsoft for managing Windows operating systems and performing administrative tasks), and/or other programming languages.

User interface 150 includes modified script for a modified rule engine. For example, the modified script may comprise a modified sequence of instructions or commands written in a programming or scripting language that can be executed by the computer and/or the interpreter. For example, the system may automatically rewrite script to modify or generate code automatically based on certain rules, patterns, and/or templates. To do so, the system may use code refactoring, optimization, and/or generating of repetitive code sections. For example, the system may use code generators that are programs that take input data or high-level specifications and produce code based on predefined templates or rules. In another example, the system may use refactoring tools and libraries. The code refactoring may comprise restructuring and improving the existing script with or without changing its external behavior. The primary goal of the code refactoring may be to enhance code quality, readability, maintainability, and often performance by making the code more efficient and easier to understand. For example, the system may split a long function into smaller, more focused methods to improve readability and maintainability. Additionally or alternatively, the system may replace hard-coded numbers or strings with named constants or configuration variables to improve code maintainability. Additionally or alternatively, the system may reorganize classes, modules, and packages to follow a cleaner and more logical structure.

In some embodiments, the modified script in user interface 150 may be generated using generative artificial intelligence. Generative artificial intelligence is a subset of artificial intelligence that specifically deals with the creation of new content, such as images, text, music, and more. Generative artificial intelligence systems are designed to produce output that is not explicitly programmed, but rather generated based on patterns and information learned from existing data. Generative artificial intelligence may include semi-supervised or supervised learning. For example, in supervised learning the model may be trained to predict next word/sentence based on training data (e.g., labelled data featuring potential word/sentences). In some embodiments, the system may also use large language model (LLM), which is a type of artificial intelligence model that is designed to process and understand natural language. It is trained on massive amounts of text data, using advanced machine learning algorithms to learn patterns and relationships between words, phrases, and sentences.

In some embodiments, the system may determine a scripting language used by the existing rule engine and/or generate modified script in the same scripting language. Alternatively, the system may determine a scripting language used by the existing rule engine and/or generate modified script in a different scripting language. For example, the system may determine that a different scripting language is more efficient than a current scripting language. To determine the efficiency of a scripting language, the system may compare one or more factors. For example, the system may consider a task or a domain. The nature of the task may play a crucial role in choosing a scripting language. Different languages are better suited for different domains. For example, Python is often chosen for data analysis and scientific computing, while JavaScript is commonly used for web development. In another example, the system may consider an existing ecosystem. If a project needs to integrate with existing software or systems, it may be advantageous to choose a scripting language that is well-supported and compatible with those systems. This can simplify integration and reduce development time. In another example, the system may consider a development team's expertise. The knowledge and experience of the development team are important. Using a scripting language that the team is already familiar with can lead to faster development and better code quality. In another example, the system may consider performance requirements. Some scripting languages may be more performant for certain tasks than others. If a project has specific performance requirements, the system may consider which scripting language can meet those requirements. In another example, the system may consider community support. The availability of community support, libraries, and documentation can greatly impact development speed and problem-solving. Popular languages tend to have more extensive resources available. In another example, the system may consider security. Depending on the nature of the project, security and safety considerations may influence the choice of scripting language. Some languages have built-in features that make it easier to write secure code. In another example, the system may consider portability and/or cross-platform compatibility. If the system needs the script to run on multiple platforms, the system may choose a language that is known for its portability and has support for the platforms you require. In another example, the system may consider project requirements. Specific project requirements, such as the need for multi-threading, networking, or GUI (graphical user interface) development, can guide the choice. Some scripting languages are better suited for certain types of applications. In another example, the system may consider scalability. The system may consider whether the scripting language and associated tools are suitable for scaling the rule engine as it grows.

In some embodiments, the system may determine a level of compatibility of a scripting language with other script in the existing rule engine. For example, the level of compatibility may influence the efficiency of the scripting language. To determine compatibility, the system may examine the features and syntax of the scripting languages. The system may compare them to the existing scripts and the rule engine to determine whether they are compatible. The system may ensure that the language supports the operations, data types, and constructs needed by the rule engine. As another example, the system may check whether the scripting language can interoperate with the existing scripts and rule engine components. This includes evaluating how data can be shared between the languages and whether the language can call functions or methods from the rule engine or other scripts. As another example, the system may verify that the scripting language can work with the data formats used by the rule engine. This may involve parsing or serializing data in a compatible way. As another example, the system may consider whether the scripting language has libraries or frameworks that can help with integration. For example, if the rule engine uses a specific protocol or data format, a scripting language with a library for that protocol can simplify integration.

In some embodiments, the system may compare performance characteristics of a scripting language with other script in the existing rule engine. For example, the performance characteristics may influence the efficiency of the scripting language. The system may assess the performance characteristics of the scripting language to ensure that it can meet the performance requirements (e.g., data formats, throughput speed, security vulnerabilities, etc.) of the existing rule engine. If the scripting language is significantly slower, it may not be compatible for performance-critical components. For example, performance characteristics of a scripting language may refer to how the language behaves in terms of execution speed, memory usage, startup time, and resource efficiency. These characteristics play a significant role in determining whether a scripting language is suitable for a specific task or application. The execution speed of a scripting language refers to how quickly it can process and execute code. Faster execution is desirable for applications where performance is critical. Some languages, such as Python, are known for being slower than others, while languages such as JavaScript and Lua are generally faster. Memory usage refers to the amount of system memory a scripting language and its running programs consume. Languages that are more memory-efficient use less memory, which can be important for applications running on resource-constrained environments. The time it takes to start a scripting language interpreter or runtime environment can impact the responsiveness of applications. Quick startup times are crucial for certain types of applications, such as command-line tools or server processes. Resource efficiency encompasses factors such as CPU (computer processing unit) utilization and disk input/output (I/O). Some scripting languages are better at managing system resources and can minimize the impact on the overall system.

In some embodiments, modified script for a modified rule engine may include additional rules, functions, and/or other script components. For example, the system may generate modified script by adding, removing, and/or otherwise altering content in script for an existing rule engine. For example, as shown in FIG. 1, the system may generate a new function that comprises additional variables, rules, and/or functions. For example, the system may generate modified script based on the rules extracted from the script shown in user interface 100. As one example, natural language processing algorithms can analyze unstructured text sources, such as existing script, security policies, guidelines, and/or technical documentation, to extract key concepts, patterns, and relationships. These extracted elements form the foundation for generating input validation rules. As a practical example, the system may analyze a company's security policy documents, extracting key phrases related to data input requirements and restrictions. The system may identify terms like "password complexity," "data format specifications," and "acceptable characters." These extracted concepts may serve as the basis for creating input validation rules.

Based on the extracted elements, the system can generate formal rules using a specific rule language, such as regular expressions or decision trees. These rules may define the acceptable and unacceptable formats or values for user inputs. The system may then encode these rules in the modified script. As a practical example, using the extracted concepts, the system generates formal input validation rules. For instance, the system might create a regular expression specifying the required password format or a decision tree outlining the conditions for valid user inputs. These rules may then define the criteria for acceptable data inputs.

Some embodiments herein describe updating rule engines as an example type of decision engine that can be automatically updates during software development. However, other embodiments can perform similar updates to other decision engines. For example, some decision engines use one or more decision trees to process data and generate outputs. These decision trees can be modified by changing attributes and threshold values on which to split data at each node, by changing the structure of the tree (e.g., depth and number of nodes of the tree), by changing leaf node labels, or by changing the number of decision trees that are used in a given decision tree-based decision engine. Other decision engines can employ any or a combination of rules, machine learning-based techniques, or probability-based techniques, including Bayesian methods (e.g., Bayesian networks or Bayesian inference), random forests, fuzzy logic, graphical models, Markov-based models, or hybrid models. Decision engines could also incorporate neural networks, specifically deep learning models, which are proficient in handling complex patterns and large datasets. Support vector machines (SVMs) offer another method for classification and regression tasks, known for their effectiveness in high-dimensional spaces. Reinforcement learning algorithms can optimize decision-making through trial and error, learning optimal actions based on rewards received from the environment. Additionally, decision engines can be augmented with evolutionary algorithms, which simulate natural selection processes to iteratively improve decision rules or parameters. Ensemble methods, like boosting and bagging, can be used to enhance prediction accuracy by combining the strengths of multiple learning algorithms. Some decision engines include two or more types of engines.

A generative model, such as a large language model (LLM), is used to generate and update decision engines. The generative model uses existing decision engines, analysis of the outputs of existing decision engines, and external data sources to generate rule data. Rule data is data that is usable by a computer system to process input data and to make a decision based on the input data. For example, rule data in a rule engine can include rule script, as described with respect to FIG. 1. In a decision tree-based decision engine, rule data can include attributes and a threshold value on which to split data at a node of the decision tree, as well as a structure of the decision tree and the number of decision trees in the decision engine. A Bayesian network-based decision engine can have rule data that identifies variables at a given node, a probability for each variable at the node, and a structure of connections between nodes. Rule data can also include an explanation of each rule, in some cases. For example, when generating rule data, an LLM can be prompted to output an explanation of what problem the rule solves and how the rule solves that problem.

FIG. 2A shows an illustrative diagram for updating rule engines during software development using generated proxy models, in accordance with one or more embodiments. For example, FIG. 2A comprises system 200. System 200 may comprise a software development workflow used for updating rule engines using generated proxy models with predefined model deployment criteria that mimics formats and structures of existing rule engines.

System 200 may include rule base 210. Rule base 210 may be a central component that stores and manages a collection of rules. Rule engines are designed to evaluate and apply rules based on certain conditions and trigger actions when those conditions are met. These rules are stored in the rule base. The rule base plays a pivotal role in decision-making processes, business logic, and automation. Rule engines are commonly used in various domains, including business process management, decision support systems, expert systems, fraud detection, and more. The structure and capabilities of the rule base can vary depending on the specific rule engine and its intended use cases. The goal is to provide a mechanism for expressing and executing business logic and decision-making rules in a way that is separate from the core application code, allowing for easy adaptation and maintenance of the rules as business requirements change. Rule base 210 may contain a set of rules, each of which consists of conditions and actions. Conditions specify when a rule should be triggered, while actions define what should happen when the rule is activated.

For example, rule engines are designed to evaluate and apply rules based on a set of predefined conditions that must be met to trigger specific actions or outcomes. These conditions typically involve logical statements or expressions that assess data attributes, values, or states within a system. In business process management, conditions might include workflow stages, user inputs, or transaction statuses that dictate the next steps in a process. In decision support systems, conditions can involve thresholds, historical data patterns, or predictive models that guide strategic decisions. Expert systems rely on conditions derived from domain-specific knowledge and heuristics to simulate human expert decision-making. In fraud detection, conditions often encompass patterns of behavior, anomalies in transaction data, or compliance with regulatory standards to identify and flag suspicious activities. The rule engine continuously monitors the relevant data and evaluates these conditions in real-time or near-real-time, ensuring that the appropriate rules are applied when the specified criteria are satisfied, thereby enabling automated, consistent, and efficient decision-making across various domains.

In the context of rule engines, data attributes, values, or states within the system can vary widely depending on the specific domain and application. For instance, in Business Process Management (BPM), attributes may include workflow stages such as "Approval Pending" or "Under Review," user roles like "Manager" or "Employee," and task statuses such as "Completed" or "In Progress." In Decision Support Systems (DSS), relevant data might involve thresholds like "Revenue >$1,000,000," historical data patterns such as sales increases during Q4, and predictive scores like "Risk Score >70." Expert Systems rely on diagnostic results (e.g., "Positive," "Negative"), symptom descriptions such as "High fever" or "Persistent cough," and treatment protocols like "Administer Antibiotic X." For Fraud Detection, attributes often include transaction amounts (e.g., "$10,000"), transaction patterns such as multiple transactions within an hour, user behavior like logins from known locations, and compliance indicators such as "KYC Verified."

In E-commerce, data attributes might cover customer segments like "New Customer" or "Loyal Customer," purchase history indicating products bought (e.g., "Product A, B, and C"), and cart contents such as "Product X, Quantity: 2." Healthcare Systems might utilize patient records detailing medical history and current health status (e.g., "Chronic Conditions: Diabetes"), lab results such as "Blood Sugar Level: 120 mg/dL," and medication prescriptions like "Drug Y, Dosage: 50 mg." These diverse data attributes, values, or states are crucial for the rule engine to make informed decisions, ensuring that rules are applied accurately and relevant actions are taken based on the specific conditions met within the system.

System 200 may receive input 212 for processing. Input 212 may correspond to a determination required by system 200, training data for system 200, and/or other information input into system 200 to generate an output (e.g., output 240 or output 250). For example, system 200 may receive a request to determine whether or not to extend credit to a user, a request to detect potential fraud, etc. For example, in the context of a loan approval process, system 200 may determine whether to approve a loan based on a set of predefined rules (e.g., from rule base 210), criteria (e.g., user specific criteria), and algorithms (e.g., as found in rule engine 230). Input 212 may include details and/or other characteristics specific to the required determination as well as one or more rules from rule base 210. For example, system 200 may input a first script (e.g., from rule engine 230) into proxy model 220 to determine a modified script for a modified rule engine, wherein proxy model 220 is trained to generate rule engine script based on comparisons of historic script interpretations of historic rule bases for historic rule engines. System 200 may also input the rule base data (e.g., input 212) into rule engine 230. Rule engine 230 may process the rule base data to generate a first output (e.g., output 250). System 200 may also input the rule base data into the modified rule engine (e.g., proxy model 220), wherein proxy model 220 processes the first rule base data with the first modified script to generate a first modified output.

For example, input 212 may comprise a feature input. A feature input may be a specific piece of data or an attribute that is used as an input to a machine learning model or a data analysis task. Features are essential components of data used to make predictions or classifications or to perform various analyses. They represent the relevant information or characteristics of the data that the model or algorithm uses to make decisions or generate insights. The feature input may comprise information about a user and/or a specific request or determination task. For example, input 212 may be based on information from profile 214. The system may monitor content generated by the user to generate user profile data. As referred to herein, "a profile" and/or "profile data" may comprise data actively and/or passively collected about a user and/or request. For example, the profile data may comprise content generated by the user/request and a user/request characteristic for the user/request. A profile may be content consumed and/or created by a user/request.

Profile data may also include a data characteristic. As referred to herein, "a data characteristic" may include any information about a user, request, and/or information included in a directory of stored user settings, preferences, and information for the user/system. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system actively or passively monitoring.

In some embodiments, the embodiments herein may use multi-modal data. Multi-modal data refers to data that comes from multiple sources or sensors, each capturing different types of information. This type of data encompasses various formats and types, such as text, images, audio, video, and numerical data, and integrates them to provide a more comprehensive understanding of a subject or phenomenon. For example, in healthcare, multi-modal data might include patient medical records (text), MRI scans (images), heart rate and other vital signs (numerical data), and patient interviews (audio). In autonomous driving, multi-modal data could involve camera images, LiDAR scans, GPS data, and radar signals. The integration of these diverse data types allows for more robust analysis and decision-making, as it combines different perspectives and information streams to capture a richer, more detailed picture of the environment or situation. This holistic approach is particularly valuable in complex systems where single-source data might be insufficient to fully understand or address the challenges at hand.

System 200 may process input 212 using proxy model 220 and rule engine 230. For example, rule engine 230 and proxy model 220 may receive and process input 212 to generate output 240 and output 250. Rule engine 230 may comprise a software component or system that is designed to evaluate, interpret, and/or execute a set of predefined rules (e.g., from rule base 210) to make decisions or perform actions (e.g., in response to input 212). Rule engine 230 may be used in a variety of applications, from business and finance to artificial intelligence and automation, to simplify and manage complex decision-making processes based on a set of conditions and actions.

Proxy model 220 may comprise generative model 222. A generative model may be a type of artificial intelligence model designed to generate new data (e.g., script for rule engine 230), often in the form of text, images, audio, or other media, which is similar to existing data or exhibits some desired characteristics. For example, proxy model 220 may generate script as shown in user interface 150 (FIG. 1). A generative model is capable of producing content that is not copied or directly retrieved from a dataset but is instead created based on patterns and knowledge learned from training data. For example, generative model 222 may comprise an artificial intelligence model that determines modified script for a modified rule engine based on script extracted from an existing rule engine (e.g., rule engine 230). Generative model 222 may be trained to generate rule engine script based on comparisons of historic script interpretations of historic rule bases for historic rule engines. In one example, generative model 222 may comprise one or more Generative Adversarial Networks (GANs). GANs consist of two neural networks, a generator and a discriminator, which are trained simultaneously in a competitive manner. The generator attempts to create data that is indistinguishable from real data, while the discriminator tries to differentiate between real and generated data. This adversarial training process results in the generator producing increasingly realistic data. Additionally or alternatively, generative model 222 may comprise one or more Variational Autoencoders (VAEs). VAEs are used for generating data by learning a probabilistic distribution of data in a lower-dimensional space. VAEs are particularly useful for generating diverse data samples. Additionally or alternatively, generative model 222 may comprise one or more Recurrent Neural Networks (RNNs). RNNs are a type of neural network used for sequence-to-sequence tasks. They can be used to generate sequences of data, such as text or music. Additionally or alternatively, generative model 222 may comprise one or more transformer models. Transformer-based models, such as GPT (Generative Pre-trained Transformer) and BERT (Bidirectional Encoder Representations from Transformers), have demonstrated strong generative capabilities for natural language generation tasks.

In some embodiments, generative model 222 is a large language model (LLM). The LLM receives input data in the form of text, numerical data, images, videos, audio, graphs, or other multi-modal data. Based on the input data, the LLM generates rule script for rule engine 230. Some embodiments of the LLM are augmented with external data in order to generate rule script. For example, generative model 222 can use retrieval-augmented generation (RAG), in which the LLM retrieves facts from a repository of external sources to help the LLM generate the rule script. A prompt into the LLM identifies one or more data sources that are to be used by the LLM while generating the rule script, either by directly providing the data sources with the prompt or by identifying a location where the LLM can access the data sources. For example, the LLM can access a repository of external sources that include information such as policies of an organization in which the system 200 operates; policies of a city, state, or country in which the rule script will be deployed; documents that identify goals of the organization; datasets that indicate how rule script is used or how the results of certain rules affect various outcomes; or the like. For example, based on a policy document indicating certain nondiscrimination policies of an organization or locality, the LLM can generate rule script that does not violate these policies.

An LLM can additionally or alternatively be augmented by prompts that directly provide information to the LLM for the LLM to use as it generates rule script, or that instruct the LLM to perform in certain ways. For example, the LLM can be caused to generate rule script based on prompt engineering strategies such as chain-of-thought (CoT) prompting, ReAct prompting (reason, act), directional stimulus prompting, or generative knowledge prompting. CoT prompting can be used, for example, to achieve transparent reasoning in rule generation. Each CoT prompt into the LLM breaks a problem down into small logical steps that are provided to the LLM either through zero-shot or few-shot inputs. The LLM can be prompted in this way to identify potential red flags based on input features and external information. For example, the LLM can be instructed to explain why it generated the rule script that it did, what problem is solved by the rule script, and/or what the outcome of the rule script is expected to be. ReAct prompt engineering similarly instructs an LLM to document its reasoning and action in rule formulation. For example, when generating rule script related to detecting cybersecurity fraud, the LLM is first prompted to reason about potential fraud indicators present in a set of data. The LLM is then prompted to act by specifying a rule that can detect such indicators, resulting in a rule that is reasoned, actionable, and explainable. Directional stimulus prompting similarly instructs the LLM to document reasons and actions, but directed towards specific reasons or actions. In the cybersecurity fraud detection example, directional stimulus prompting can instruct an LLM to focus on indicators of specific types of fraud. Finally, generative knowledge prompting can be used to cause an LLM to enhance rule understandability with explanations. Beyond generating rule script, the LLM can be prompted to provide a plain language explanation or rationale for a rule that can help users understand the logic behind a rule.

In some embodiments, the system can use a LLM to test for language stresses and changes from one language to another by leveraging the model's deep understanding of linguistic patterns and structures. The LLM, trained on diverse multilingual datasets, can analyze and compare syntax, verbiage, and grammatical constructs across different languages. When evaluating a text, the system can use the LLM to identify nuances in word choice, sentence structure, and idiomatic expressions that signify language-specific stresses and variations. By generating translations or paraphrases, the LLM can highlight how meaning and emphasis shift due to linguistic differences. Additionally, the model can be used to simulate language transitions, examining how certain phrases or sentences transform when translated, thus providing insights into the syntactical and verbal changes. This capability allows the system to not only translate content accurately but also to preserve the intended meaning and stress, ensuring that the subtle nuances of the original language are maintained in the target language.

Proxy model 220 may have additional components for generating modified script. For example, proxy model 220 may comprise filter 224. Filter 224 may employ a variety of techniques and technologies to identify and block content that is considered inappropriate, offensive, and/or harmful. Filter 224 may use keyword filtering where filters scan text-based content for specific keywords, phrases, or patterns associated with objectionable content. These keywords are often part of a blacklist. If a match is found, the content is flagged or blocked. Additionally or alternatively, filter 224 may comprise filters that can analyze images and videos to identify explicit or objectionable content. This can involve image recognition, facial detection, or algorithms that recognize nudity or violence. Additionally or alternatively, filter 224 may comprise filters that categorize content into predefined categories, such as adult, gambling, violence, personally identifiable information, and/or hate speech. The system can set filtering rules based on these categories. Additionally or alternatively, filter 224 may comprise lists of known objectionable websites, domains, or URLs. These lists may be updated regularly. Additionally or alternatively, filter 224 may comprise models that can be trained to recognize patterns of objectionable content. They can adapt and improve their detection capabilities over time.

The system may categorize a given rule based on its content, outcome, and/or effect. For example, the system may train a model to categorize rules based on the content of the rules (e.g., whether the rule itself includes a blacklisted term) and/or the outcome or effect (e.g., whether an outcome or effect of a rule corresponds to a blacklisted term). For instance, the system may use classification algorithms such as Support Vector Machines (SVM), Decision Trees, and/or Neural Networks can learn patterns from labeled data to categorize rules according to specific criteria, effects, and/or outcomes. The system may also use NLP techniques to understand and process human language. Through techniques like text classification or sentiment analysis, the system can categorize rules based on their linguistic content. NLP models can identify keywords, phrases, and/or semantic structures to determine the category of a rule. The system may also use NLP to summarize the outcome and/or effect of a given rule. The system may then use text classification or sentiment analysis on the summarized content to determine if the summarized content comprises objectionable information. The system may also categorize rules by applying predefined logical rules or conditions. In such cases, the system may use a set of if-then statements or logical rules to categorize rules based on specific criteria, outcomes, and/or effects. The system may also use semantic analysis to understand the meaning and relationships between different rules in order to generate ontologies of rules. Ontologies define relationships between concepts and can help categorize rules based on their semantic connections, making it possible to organize rules based on their meanings and context. The system may then filter rules based on the ontologies and/or the relationships therein. For example, the system may determine a first rule is filtered out based on an objectionable effect. The system may then filter out a second rule based on its shared ontology with the first rule. The system may also categorize rules by extracting meaningful features related to their content, outcome, and/or effect, and then use these features to train models for classification or clustering.

Proxy model 220 may also include validator 226. Validator 226 may perform a validation process for modified script. For example, proxy model 220 may validate a script before implementing it in a rule engine to ensure that the script is error-free, adheres to the syntax and rules of the rule engine, and will execute as intended. The specific process of script validation can vary depending on the rule engine and the scripting language used. In some embodiments, the script is subjected to a syntax check to ensure that it follows the correct grammar and structure of the scripting language. Syntax errors, such as missing semicolons, unbalanced parentheses, or invalid keywords, are identified during this step. In some embodiments, static analysis tools can be used to inspect the script for potential issues without executing it. These tools can identify variables that are used but not defined, unused variables, and other potential problems. In some embodiments, proxy model 220 may use specific scripting language or dialect (e.g., based on rule engine 230). Validation may include checking that the script adheres to the syntax and rules defined by the rule engine. For example, it may ensure that the script uses the appropriate functions or methods provided by the rule engine. If the script relies on external libraries or dependencies, a validation process may include checking that these dependencies are correctly installed and available for use. In some cases, the script may be executed in a simulated environment or debugged to identify issues that might not be evident during static analysis. Security checks, including scanning for vulnerabilities, injection attacks, and other security issues, may also be performed, especially when the script will process sensitive data. Once the script has passed the validation process, proxy model 220 can safely implement the modified script into a rule engine (e.g., rule engine 230). However, ongoing testing and monitoring may be performed by system 200 to ensure that the script performs as expected and remains free from errors as the application evolves.

Proxy model 220 may also (in some embodiments) include manual review 228. For example, manual review 228 may comprise proxy model 220 generating for display (e.g., in a user interface) a modified script for user review. For example, manual review 228 may include filters allowing users to report objectionable content. Once reported, the content can be reviewed and, if confirmed, added to the filter's blacklist. Manual review 228 may also include filters that can be configured with custom rules defined by users or administrators. These rules specify what content is considered objectionable and how to handle it. Manual review 228 may also include filters that can incorporate user feedback to improve accuracy. Users can mark false positives and false negatives, helping the system to adapt and refine its filtering.

Proxy model 220 may generate output 240. For example, proxy model 220 may generate output 240 by inputting the first rule base data (e.g., input 212) into proxy model 220, wherein proxy model 220 processes the first rule base data with the first modified script (e.g., generated by generative model 222) to generate a first modified output. In some embodiments, the output may comprise generated rules. For example, the generated rules may be integrated into various security systems, including firewalls, web servers, and/or intrusion detection systems. In such cases, these rules may act as checkpoints, evaluating user inputs against the defined criteria and preventing invalid or malicious data from entering the system. As a practical example, the generated rules may be integrated into a web application firewall. When a user submits a form, the firewall may evaluate the input against the defined rules, allowing only inputs that meet the specified criteria to pass through. This may prevent SQL injection, cross-site scripting, and/or other malicious activities.

System 200 may then compare output 240 and output 250 at decision engine 260. For example, decision engine 260 may compare two rule engine scripts or rule sets by analyzing the structure, logic, and/or content of the scripts to identify similarities, differences, and potential conflicts. The exact method for comparing rule engine scripts may vary depending on the rule engine, the specific rules language, and the objectives of the comparison (e.g., a model deployment criterion). In some embodiments, decision engine 260 may compare rule engine scripts to perform a syntax check to ensure that both scripts are valid and follow the correct grammar and structure of the rule engine's scripting language. This may include checking for errors such as missing semicolons, unmatched parentheses, or invalid keywords. Additionally or alternatively, decision engine 260 may perform a structure comparison by analyzing the overall structure of the scripts. This may include checking the organization of rules, conditions, and actions. Differences in rule ordering, grouping, or naming may be identified. Additionally or alternatively, decision engine 260 may compare individual rules to identify similarities and differences. This may involve comparing the conditions and actions of each rule. Rules with identical conditions and actions may be considered similar. Additionally or alternatively, decision engine 260 may identify potential conflicts between scripts and/or rules. Conflicts may occur when two or more rules can be triggered simultaneously, leading to ambiguous behavior. These conflicts need to be resolved to ensure that the rule engine behaves predictably. Additionally or alternatively, decision engine 260 may analyze how variables and data are used within the scripts. Differences in variable names, data sources, or data types should be highlighted. Additionally or alternatively, decision engine 260 may compare the logic of the scripts by checking for differences in how conditions are structured and how actions are implemented. For example, differences in conditional logic or action sequences can be flagged. Additionally or alternatively, decision engine 260 may determine what errors (or the number thereof) occur and how error handling and exception handling are implemented within the scripts. Differences in how errors are caught, reported, or handled may be identified.

For example, the system may adapt to the specific context of the data being validated, taking into account factors such as the type of input, the source of the input, and/or the user's privileges. This context-aware approach ensures that validation rules are tailored to the specific requirements of the system and its users. As a practical example, the system may consider the context of user inputs. For sensitive operations, the system may generate stricter validation rules, while allowing more flexibility for less critical actions. For example, the system might enforce stronger validation for financial transactions and less stringent rules for general user profile updates.

In some embodiments, if version control is in place, decision engine 260 may compare script versions to identify changes and updates made over time. This is particularly useful for tracking script evolution. For example, the system may continuously monitor and analyze new data sources, such as threat intelligence feeds, vulnerability reports, and industry best practices. By identifying emerging threats and trends, the system may suggest modifications or additions to the existing validation rules, ensuring that systems remain up-to-date and protected against evolving attack methods. As a practical example, the system may continuously monitor threat intelligence feeds and identifies new attack patterns. If it detects a novel threat that existing rules do not cover, the system may suggest updates to the validation rules. For instance, if a new type of injection attack becomes prevalent, the system may recommend adjustments to input validation criteria to mitigate this specific threat.

In some embodiments, decision engine 260 may run the scripts in a controlled environment to identify behavioral differences and inconsistencies that may not be evident during a static comparison. The system may run the scripts to determine differences in outputs (e.g., determine how the same input results in different outputs). For example, the system may compare two scripts to determine how the two scripts interpret rules in rule base 210 differently. In some embodiments, the system may determine a difference in the performance of a model. For example, system 200 may determine one or more performance metrics for a rule engine based on the scripts. For example, the system may determine a first performance metric for the existing rule engine and a second performance metric for the modified rule engine.

Performance metrics for a rule engine may refer to measures used to evaluate the effectiveness, efficiency, and/or quality of the rule engine's operations and decision-making. These metrics help assess how well the rule engine is performing its intended tasks, such as processing rules, making decisions, and/or handling data. The performance metrics may be used to identify areas of improvement and ways to optimize the rule engine's behavior.

In some embodiments, a performance metric may comprise throughput, latency, scalability, rule evaluation time, resource utilization, rule complexity, hit rate, false positive rate, false negative rate, rule authoring time, error rate, rule coverage, and/or rule execution. Throughput measures how many rules or rule evaluations the engine can process in a given time period. It is usually expressed as rules per second or transactions per second. Higher throughput often indicates better performance. Latency measures the time it takes for the rule engine to process a request or rule evaluation, typically in milliseconds or microseconds. Lower latency is desirable, as it indicates faster decision-making. Scalability assesses the rule engine's ability to handle an increasing workload by adding more resources, such as CPU, memory, or servers. It measures how well the engine can maintain its performance as demand grows. Rule evaluation time measures the time it takes to evaluate a single rule or set of rules. It helps identify rules that are particularly time-consuming and may need optimization. Resource utilization metrics, such as CPU and memory usage, assess how efficiently the rule engine uses available resources. Overutilization may lead to performance degradation, while underutilization indicates potential efficiency improvements. Rule complexity metrics evaluate the complexity of the rules themselves. Complex rules may require more processing time and resources. Identifying overly complex rules can lead to rule optimization efforts. Hit rate measures the percentage of rules or conditions that are triggered (i.e., true) relative to the total number of rules or conditions evaluated. A high hit rate suggests that most rules are relevant and effectively contribute to decision-making. In applications where the rule engine must filter content, the false positive rate measures how often the engine incorrectly flags non-objectionable content as objectionable. Lower false positive rates are generally desirable. The false negative rate assesses how often the engine fails to identify objectionable content when it is present. Lower false negative rates are typically preferred. Rule authoring time measures the time it takes to create or update rules. Faster rule authoring can lead to more efficient rule management and quicker adaptation to changing requirements. The number and frequency of errors encountered during rule execution, such as syntax errors or runtime exceptions, provide insights into the reliability and stability of the rule engine. Rule coverage measures the percentage of cases or scenarios for which rules provide decisions or actions. High rule coverage indicates that the rule engine effectively handles a wide range of situations. The rule engine's overall response time, including the time it takes to receive, evaluate, and respond to a request, is a crucial performance metric for applications that require real-time decision-making. These performance metrics help rule engine administrators and developers assess the efficiency and quality of the rule engine's operations. Optimizing the rule engine based on these metrics can lead to faster decision-making, better resource utilization, and improved system performance. The specific metrics of interest may vary depending on the application and use case of the rule engine.

System 200 may then receive a model deployment criterion (e.g., criterion 270). For example, system 200 may receive one or more criteria that indicate when a new model (e.g., a modified rule engine) should be deployed. For example, the model deployment criteria may refer to the set of criteria or conditions that must be met before a model is deployed into a production environment (e.g., the existing rule engine is replaced). These criteria serve as guidelines and standards to ensure that the deployed model is effective, reliable, secure, and aligned with the intended business or application objectives. Model deployment criteria are important to maintain the quality and performance of the deployed model and to mitigate potential risks.

The model deployment criteria may be key to a difference between outputs. For example, the system may determine a difference between two outputs and may compare that difference to a threshold difference to determine whether to deploy the new model. The model deployment criteria may be based on any of the differences detected as discussed herein. For example, training artificial intelligence models can be computationally expensive and time-consuming. Similarly, rerunning a model (whether it requires additional training or not) requires significant computational resources, including high-performance hardware like GPUs or TPUs. It also demands electricity and can contribute to a larger carbon footprint due to increased energy consumption. To minimize the expensive, time, and/or computational resources, the system may only deploy a new model, generate modified rules, and/or other execute one or more processes based on one or more criteria.

In some embodiments in which the difference is determined, the system may compare the difference to a threshold difference. For example, the criterion may indicate a difference in a value against which the proxy model may be measured to determine when, if ever, the proxy model should be deployed to replace the existing rule engine. The criterion may be keyed to the differences between the two outputs (e.g., a difference in its size, throughput speed, number of changes, etc.), the existing rule engine and the model (e.g., based on a difference in its age, update occurrences to its rule base, etc.), and/or comparisons between outputs of the models (e.g., based on differences in results, throughput speed, efficiency, etc.). For example, as opposed to directly comparing the modified rule engine to the existing rule engine, or even an output of the modified rule engine to an output of the existing rule engine, the system compares a difference in the outputs to the model deployment criterion.

In some embodiments, the threshold difference may be determined based on a third party request, an industry standard, a predetermined frequency, and/or in response to another trigger. For example, if a third party requests a threshold difference, it might involve manual intervention where a human expert or administrator sets the threshold based on specific requirements provided by the requester. Alternatively, models can be trained to analyze historical data or patterns to suggest suitable thresholds based on the request's context. In another example, industries often have established standards or regulations dictating certain thresholds for different parameters or metrics. The system can be programmed with these standards, and when a request aligns with the industry standards, the system can automatically apply those predefined thresholds. In some embodiments, setting thresholds based on a predetermined frequency involves monitoring data at regular intervals and updating thresholds accordingly. The system can analyze historical data, calculate statistical measures like mean, median, standard deviation, or use time-series analysis to determine thresholds at specified intervals. In some embodiments, the system may dynamically adjust thresholds based on triggers or events. For example, if a sudden spike in data occurs, the system might automatically adjust the threshold to account for the anomaly. This adaptive threshold determination could be based on outlier detection algorithms, anomaly detection techniques, or real-time monitoring systems.

In some embodiments, the system may combine these approaches. For example, the system may rely on predefined rules that take into account third-party requests, industry standards, and/or predetermined frequencies to set thresholds. For instance, if a request specifies a particular condition, a rule-based system can be designed to accommodate it. In another example, the system may be trained on historical data that includes thresholds set in the past based on various triggers or industry standards. These models can learn patterns and relationships to suggest or adjust thresholds when similar conditions are encountered.

In some embodiments, the system may analyze the results of validation checks to identify patterns and anomalies, indicating potential weaknesses, and/or gaps in the rules. Based on this analysis, the system may suggest refinements to the rules, optimizing their effectiveness, and/or reducing false positives. As a practical example, after a security breach, the system may analyze the attack vectors and refine validation rules. For example, if a SQL injection attack occurred, the system might suggest refining input validation rules to detect and block similar injection attempts, reducing the risk of future exploits. Additionally or alternatively, the system may anticipate potential security risks and generate rules to mitigate those risks before they become exploited. For instance, the system may identify emerging attack patterns and generate rules that block or flag similar inputs, preventing potential attacks before they occur. As a practical example, the system may analyze historical data and identifies a rising trend in cross-site scripting (XSS) attacks. The system proactively generates rules to block or sanitize input containing suspicious JavaScript code, preventing potential XSS attacks before they are attempted.

Figure 2B:
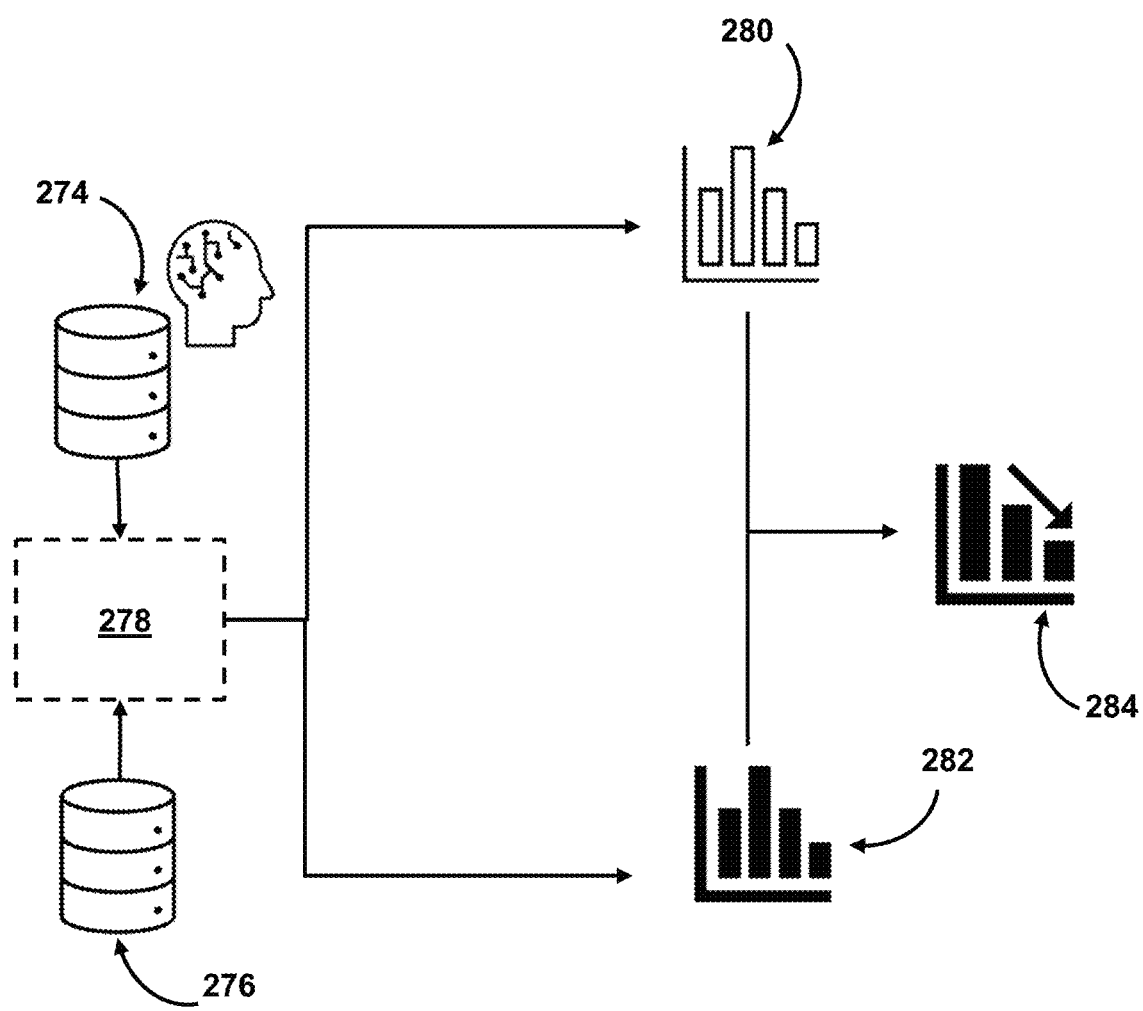
FIG. 2B shows an illustrative diagram for detecting required rule engine updated using artificial intelligence models, in accordance with one or more embodiments.

FIG. 2B shows an illustrative diagram for detecting required rule engine updated using artificial intelligence models, in accordance with one or more embodiments. For example, FIG. 2B illustrates system 272, which could be used to supplement and/or replace one or more components of system 200 (FIG. 2A). For example, in some embodiments, one or more components of system 200 may be used in combination with and/or alternative to one or more components of system 272.

System 272 represents a system for detecting required rule engine updated using artificial intelligence models. For example, the system may use artificial intelligence models to determine when a rule engine, model based on a rule engine, and/or rule base used to power a rule engine should be replaced. For example, a rule engine, model based on a rule engine, and/or rule base used to power a rule engine should be revised and/or retrained periodically to maintain their performance and relevance over time. This need may arise because the real-world environments in which the model may operate can change leading to concept drift or data drift, where the patterns and relationships in the data, which the model initially learned, might no longer hold true. For example, consumer behavior may evolve, new types of cyber threats might emerge, rules may change, and/or economic conditions might shift, all of which could render a previously trained model less effective or accurate. Retraining allows the model to learn from the most recent data, capturing latest trends and discarding outdated information.

In some embodiments, the system may perform this detection irrespective of the existing model components and/or an existing model objective as the system generates modified inputs to determine when a proposed modifications to the rule engine script is required as opposed to directly creating and/or updating the rule engine. The system may then generate outputs based on the modified inputs. The outputs of the current rule engine (using actual inputs) may then be compared to the outputs of the modified inputs. The system may then compare the outputs for differences to particular characteristics to determine whether or not to update the rule engine. For example, by determining modified inputs that may mirror potential changes in future actual inputs, the system may determine when a modification to the rule engine is required. Moreover, as the model used to generate the different inputs determines only changes to potential characteristics of actual inputs (as opposed to changes to the model to generate new outputs), the training burden and/or required for training data is significant reduced and/or eliminated.

For example, system 272 may represent the use of a modified input (e.g., inputs from synthetic database 274) to generate a modified output (e.g., modified output 280). System 272 may compare the modified output (e.g., modified output 280) to an actual output (e.g., output 282) that is based on an actual input (e.g., an input from database 276). The system may then compare the outputs for a difference (e.g., difference 284).

For example, system 272 may retrieve historical data for a first rule engine. The historical data may comprise historical inputs used by the first rule engine to generate historical outputs (e.g., from database 276). Historical data, for example when referring to the context of a rule engine, may comprise archived records of inputs and outputs that have been processed by the rule engine over time. This type of data may capture the specific conditions or scenarios under which the rule engine operated, along with the decisions it made. For instance, in a financial services context, a rule engine might evaluate loan applications based on criteria such as credit score, income, and employment history. The historical data in this case would include the details of each loan application (the historical inputs) and the resulting decisions, such as approval or rejection (the historical outputs). This data is invaluable for several purposes, including auditing past decisions, training machine learning models, refining the rules in the rule engine, and conducting various forms of analysis such as trend analysis or compliance checks. By analyzing historical data, system 272 can identify patterns, assess the effectiveness of the rule engine, and make informed adjustments to improve accuracy and efficiency in future decision-making processes. In some embodiments, the historical data may be stored in database 276.

As shown in FIG. 2B, system 272 may determine, using a first artificial intelligence model, modified inputs for a rule engine based on a first data characteristic of a first subset of the historical inputs, which may be stored in synthetic database 274. In some embodiments, to determine modified inputs for a rule engine using an artificial intelligence model, system 272 may analyze a subset of historical inputs based on specific data characteristics. This subset may be selected based on criteria such as particular patterns, anomalies, or representative samples of various classes of data. The model, for example a generative model like a Generative Adversarial Network (GAN) or a Variational Autoencoder (VAE), may then trained on this subset to learn the underlying data distributions and relationships. Once trained, the model can generate synthetic data that mirrors the learned characteristics of the historical inputs. These modified inputs may be designed to simulate realistic, plausible scenarios that have not necessarily occurred but are possible given the historical data patterns. This ability is particularly useful for testing and enhancing the rule engine's robustness. By feeding it modified inputs, the system can evaluate how the rule engine would respond to new or edge-case scenarios, thus identifying potential flaws or areas for improvement in the rule logic. The effectiveness of this approach relies heavily on the quality and diversity of the historical data subset used for training the Al model. The more comprehensive and representative the data, the better the Al model can generate modified inputs that are both diverse and realistic, ensuring that the rule engine is well-tested against a wide range of scenarios before being deployed in real-world applications.

As described herein, synthetic data may be data that is artificially generated data that mimics the properties of real-world data but does not directly correspond to any real-world events or entities (e.g., in contrast to "actual" data). It may be created using various techniques, such as statistical methods, algorithms, or simulations, to serve specific purposes where actual data is either unavailable, insufficient, and/or sensitive to use. Synthetic data is particularly valuable in scenarios where data privacy is paramount, such as in healthcare or finance, because it can be used to generate large datasets that do not expose personal information yet behave similarly to actual data in statistical analyses and machine learning training.

When system 272 needs to determine modified inputs for a rule engine based on data characteristics of a subset of historical inputs without resorting to new training data, it can use statistical methods that rely solely on the analysis and manipulation of existing data. For example, system 272 may apply statistical resampling techniques such as bootstrapping, which involves repeatedly sampling with replacement from the subset of historical inputs. Bootstrapping allows the creation of new, synthetic datasets that statistically resemble the original data in terms of distribution and variance, but are composed of different combinations of the input records. Additionally or alternatively, system 272 may use parametric methods, where the system first models the distribution of the historical inputs using assumed probability distributions (e.g., normal, binomial, Poisson). Once the parameters of these distributions are estimated, the system can generate synthetic data inputs by sampling from these distributions. This approach can effectively mimic the statistical properties of the historical data and generate modified inputs that reflect the same underlying behaviors and characteristics. These modified inputs, generated through statistical techniques, can then be fed into the rule engine to test and validate the rule sets under various simulated conditions. This process helps in identifying any potential weaknesses or biases in the rule engine without the need for gathering new training data, making it a cost-effective solution for enhancing system performance and reliability.

System 272 may input a first modified input into rule engine 278 to generate a first modified output (e.g., modified output 280). Once these modified inputs are prepared, system 272 feeds them into rule engine 278 just as actual data would be. For example, a rule engine may operate based on a set of predefined logic rules or algorithms that dictate how inputs are processed and what outputs are generated. As the modified inputs pass through rule engine 278, they are subjected to the same decision-making processes as actual data (e.g., an inputs of actual data). This may involve evaluating the modified inputs against the rules defined within the engine, which may include conditions, thresholds, and procedural logic designed to mirror real operational environments. The outputs produced by rule engine 278, in this case, modified outputs (e.g., modified output 280) are essentially the results or decisions made by rule engine 278 based on the modified inputs. They are valuable for various purposes, such as testing the rule engine's effectiveness, validating logic under simulated conditions, training staff, or demonstrating a system without exposing sensitive or real data. This method ensures that the rule engine is robust, accurate, and prepared for real-world data processing, all while maintaining data privacy and integrity.

System 272 may similarly input an actual input (e.g., an input based on real-world data) into rule engine 278 to generate an actual output (e.g., output 282). System 272 may then determine a difference (e.g., difference 284) between the first modified output and the first actual output. The system may then compare the first difference to a first model deployment criterion, which may indicate whether or not a rule engine, a model based on a rule engine, and/or a rule base used to power a rule engine should be replaced.

The system may then whether an update to a rule engine, a model based on a rule engine, and/or a rule base used to power a rule engine should be replaced based on the extent of the difference. For example, if the difference between a modified input (which may reflect new data, future trends, rule changes, model improvements, etc.) and an actual input (which reflects the status quo) is large, the system may determine that an update to a rule engine, a model based on a rule engine, and/or a rule base used to power a rule engine is required.

For example, if a significant discrepancy is observed, it indicates that the rule engine may no longer be aligned with emerging data trends or requirements. This discrepancy serves as a trigger for a deeper analysis to identify specific shortcomings or areas for enhancement within the rule engine or its rules. The system might employ analytical techniques, such as sensitivity analysis or impact assessment, to pinpoint which rules or parameters are causing the divergence and to understand the implications of these differences on performance and decision accuracy.

Based on this analysis, the system can then decide whether modifications to the rule base are required, if the model needs refinement, or if a more comprehensive overhaul of the rule engine is necessary to better capture the dynamics represented by the synthetic data. This decision-making process ensures that the rule engine remains robust, relevant, and capable of handling both current and anticipated future scenarios, thereby maintaining its efficacy and accuracy in operational environments.

FIG. 2C shows an illustrative diagram for generating code for rule engines using artificial intelligence models, in accordance with one or more embodiments. For example, FIG. 2C illustrates system 286, which could be used to supplement and/or replace one or more components of system 200 (FIG. 2A). For example, in some embodiments, one or more components of system 200 may be used in combination with and/or alternative to one or more components of system 272 (FIG. 2B) and/or system 286.

System 286, may in some embodiments, generate code to more effectively use current model components irrespective of the existing model components and/or an existing model objective. To do so, system 286 may generate modified rule engine script to determine potential modifications to the current rule engine script is required as opposed to directly creating and/or updating the rule engine. The system may then determine characteristics of current and modified rule engine scripts while generating outputs. The similarity of the outputs of the current rule engine and the modified rule engine may then be compared against the differences in the characteristics to determine what changes in processing efficiencies may be gained without modifying the outputs (or without modifying the outputs within a specified threshold). For example, by determining and comparing outputs of different versions of the rule engine script (e.g., versions that may rely on different model components, parameters, etc.), the system may indirectly determine different model components, parameters, etc. that result in similar (or improved) outputs. Moreover, as the model used to generate the modified rule engine script determines only changes to script, the training needs to only be specific to the script language not the existing model components and/or an existing model objective.

As shown in FIG. 2C, system 286 may retrieve a first script (e.g., script 288) for a first artificial intelligence model, wherein the first script processes historical inputs to a first rule engine to generate historical outputs. The historical data may comprise historical inputs used by a rule engine to generate historical outputs. The historical data may be retrieved from a database of historical data (e.g., from database 276 (FIG. 2B)). Additionally, system 286 may determine, using a second artificial intelligence model, a first modified script (e.g., script 290) based on the first script, wherein the second artificial intelligence model is trained to generate script modifications using language models for a script language of the first script.

In some embodiments, the training that system 286 performs (or receives from another system) may involve the collection and preparation of a large dataset of scripts written in the target script language. These scripts are may then be used by system 286 to teach the model the syntax, semantics, and/or typical patterns of the script language, which might include specific coding standards, libraries, and frameworks relevant to the language.

Once the dataset is prepared, system 286 may use the dataset to train a language model. This training could involve techniques like supervised learning, where the model learns from examples that include both the original scripts and their modified versions, possibly including annotations or comments explaining the modifications. Notably, the system 286 may generate this dataset irrespective of the existing model components and/or an existing model objective. The language model may be using a variant of transformer-based architectures, such as BERT (Bidirectional Encoder Representations from Transformers) or GPT (Generative Pre-trained Transformer), which are highly effective at understanding context and generating text based on learned patterns. The model may be trained to predict likely modifications by understanding the context within the scripts and applying learned modifications that fit the coding practices and requirements of the script language. During training, the model may learn to perform tasks such as code completion, bug fixing, refactoring, and/or even generating new code snippets that comply with the script's syntax and usage norms.

Once trained, the model can be fine-tuned and tested (e.g., by system 286) on a separate validation set to ensure it accurately understands and generates appropriate modifications. The effectiveness of the model may be evaluated based on its ability to accurately reproduce manual modifications or improve upon them in terms of performance, security, and maintainability of the scripts. In deployment, this trained model can assist developers by suggesting modifications, generating patches, or optimizing existing scripts automatically. This capability can significantly streamline coding workflows, reduce error rates, and enhance the overall quality of software development projects.

System 286 may then process a first input (e.g., from data 292, which in some embodiments may correspond to database 276 (FIG. 2B)) using the first script (e.g., script 288) to generate a first output (e.g., output 296). System 286 may also process a first input using the first modified script (e.g., script 290) to generate a second output (e.g., output 298).

In some embodiments, processing an input through a rule engine based on the script (e.g., script 288 and/or script 290) of a model may involve a structured sequence of operations designed to apply logical rules to the given input and produce an output. For example, the input (e.g., data or parameters relevant to the rules of the model) is fed into system 286. The input may represent various types of data, such as user details, transaction records, sensor readings, or any other information that needs to be processed according to specific rules. The core of system 286 may be the rule engine, which is essentially a software system that uses a set of pre-defined logical conditions (rules) written in a scripting language tailored for decision-making processes. These rules are developed based on the model's requirements, which dictate how data should be evaluated and manipulated. The script of the model (e.g., script 288 and/or script 290), which defines these rules, is structured to interpret the input data and apply the rules sequentially or based on certain conditions.

When the input data enters the rule engine, the script (e.g., script 288 and/or script 290) starts executing. It parses the input and begins applying the rules. This could involve checking conditions (if-then statements), looping through data, performing calculations, or executing various operations defined in the script. For instance, in a financial application, the rules might include checking if transaction amounts fall within certain limits, if account balances are sufficient, or if transactions meet predefined criteria for fraud detection. As the rules are applied, the script (e.g., script 288 and/or script 290) processes the input through various layers of logic, progressively refining the data or transforming it into decisions or classifications. This processing might also involve invoking external systems or databases for additional data necessary for rule validation.

In some embodiments, the script (e.g., script 288 and/or script 290) of a model defines rules for a rule engine and may be typically structured in a manner that facilitates the orderly interpretation and application of these rules to input data. This scripting involves a logical, often hierarchical organization where rules are written in a domain-specific language or a general programming language that supports conditional logic and data manipulation. At the foundational level, the script (e.g., script 288 and/or script 290) starts with definitions of various data elements and variables that will be used to store and manipulate input data. This includes setting up data types, structures, and perhaps default values. It also often involves preparing functions or methods that will perform specific operations, such as calculations, data transformations, or external system calls. Following the setup, the main body of the script (e.g., script 288 and/or script 290) comprises a series of conditional statements and control flow constructs, such as if-else statements, for loops, and while loops. These constructs allow the script to evaluate input data against specific criteria defined by the rules. For instance, an if statement might check whether the input data meets certain conditions (e.g., a numerical value falling within a specified range), and based on this check, different branches of logic might be executed.

In some embodiments, the rules can be applied sequentially, where each rule is evaluated in order, and the output of one rule might influence the conditions or operations of subsequent rules. Alternatively, rules can be structured to execute based on specific conditions or events. This means that not all rules are necessarily applied to all inputs; instead, specific triggers or data characteristics can determine which rules are relevant for a given piece of data. In some embodiments, the script may also include error handling to manage exceptions or unexpected input values effectively. This ensures that the system remains robust and can handle anomalies without failing.

To facilitate maintenance and scalability, the script may be modular, with rules encapsulated in separate functions or modules that can be tested independently. This structure supports easier updates and modifications, as changes to one rule or module can be made without impacting others. For example, the script (e.g., script 288 and/or script 290) of a model for a rule engine is a meticulously organized codebase that combines data handling, logical conditions, and control flow to interpret and process input data according to pre-defined rules, efficiently leading to decision-making outputs.

Once the input has been fully processed according to all relevant rules, the rule engine generates an output (e.g., output 296 and/or output 298). This output could be a simple decision (e.g., approve or deny), a classification, a recommendation, or any action that needs to be taken based on the input and the model's script. The output is then typically passed on to other components of the system for further action or presented to the user.

System 286 may determine a first characteristic (e.g., characteristic 294) of the first script (e.g., script 288) when generating the first output (e.g., output 296). System 286 may determine a second characteristic of the first modified script (e.g., script 290) when generating the second output (e.g., output 298). In some embodiments, characteristics may define how a rule engine handles inputs to generate outputs. For example, a characteristic may comprise any characteristic that distinguishes how two scripts processes a given input differently. For example, a characteristic may indicate what components of a model are used, how efficiently a script performs, and/or other information related to the processing of an input.

In some embodiments, a characteristic may indicate the rule engine's ability to evaluate conditions rapidly and efficiently. For example, as inputs are received, the rule engine parses and interprets these inputs against the conditions specified in each rule. The conditions are typically logical expressions that check for certain criteria within the input data, such as thresholds, relationships, or presence/absence of specific data points. The system may then generate a value that represents these conditions.

In some embodiments, a characteristic may indicate rule engine's capability to handle a large volume of rules and inputs with minimal latency. This may be achieved through optimized algorithms for rule matching and execution, such as the Rete algorithm, which reduces the need to reevaluate all conditions every time an input is processed. This optimization is crucial for applications requiring real-time decision making, such as in financial transactions or critical system monitoring. The system may then generate a value that represents these conditions.

In some embodiments, a characteristic may indicate a model component and/or rule used. For example, the rule engine may feature a high degree of modularity and scalability. Rules can be added, removed, or modified without altering the overall architecture of the system. This allows for dynamic updates and adaptations to the rule base as new requirements emerge or as existing policies evolve. For example, the system may use multiple rules-engines and the characteristic may reflect how different LLMs can be used to optimize various rules-engines individually and/or in a collective. The system may then generate a value that represents these conditions.

In some embodiments, a characteristic may indicate a workflow or path followed when processing an input. For example, rule engines can execute rules either in a sequence or in parallel, depending on dependencies among the rules and the design of the engine. Sequential processing might involve executing rules in a specific order where the outcome of one rule can influence the application of subsequent rules. In contrast, parallel processing can apply rules simultaneously, suitable for scenarios where rules are independent of each other. The system may then generate a value that represents these conditions.

In some embodiments, a characteristic may indicate information related to an output. Outputs can range from simple decisions or classifications to complex sets of actions. The rule engine not only determines what actions to take based on the inputs and rules but also can trigger these actions directly or pass decisions downstream to other systems or components for further action. The output may also include information related to hit rates, error rates, processing speeds, etc. The system may then generate a value that represents these conditions.

System 286 may determine a first difference between the first output and the second output. To do so, the system starts by capturing and storing both outputs under examination. If the outputs are numerical values or structured data, the difference might be calculated directly through simple arithmetic operations, such as subtraction or percentage difference calculations. For example, if the outputs represent predicted values, revenue figures, or any measurable metrics, the system can quantitatively assess the difference by comparing these figures directly. If the outputs are more complex, such as text, images, or multi-dimensional data structures, the system might employ more sophisticated methods. For textual outputs, techniques like text similarity metrics (e.g., Levenshtein distance or cosine similarity) can be used to quantify differences. In the case of images or other graphical outputs, image processing algorithms that assess pixel-by-pixel differences or structural similarities might be utilized. For outputs that involve categorical data or decisions (e.g., classification labels), the system might analyze differences in terms of changes in categories, frequency of specific outcomes, or shifts in probability distributions if the outputs include confidence scores or probabilistic estimates. Moreover, the system may apply statistical tests to determine if the differences between the two outputs are statistically significant, especially when the outputs are subject to variability or noise. This is important in scientific or financial applications where understanding the significance of a change can impact decision-making. In addition to direct comparison, the system might also employ visualization tools to graphically represent differences between outputs, providing intuitive insights into changes and trends. This can include plotting differences over time, heatmaps for data matrices, or side-by-side comparisons of graphical outputs. By employing these methods, the system effectively quantifies and interprets differences between model outputs, providing valuable feedback for model tuning, debugging, or updating, and ensuring that the model remains accurate and reliable in its predictive capabilities.

System 286 may determine a second difference between the first characteristic and the second characteristic. For example, system 286 may analyze and compare the processes and outcomes across different configurations or versions of the rule engine. This examination can reveal variations in performance, efficiency, and accuracy, which are critical for optimizing the rule engine's operation. The analysis may start by feeding the same input into different configurations of the rule engine. These configurations might differ in terms of rule sets, the implementation of the rule processing algorithms (like Rete versus sequential processing), or the underlying hardware and software environments. By maintaining the input constant, any difference in the output can be attributed directly to the changes in the rule engine's setup. Once the outputs are generated, the system measures various aspects of the characteristics. This can include the time taken to generate the output, the computational resources used, and the complexity of the computational steps involved. Such measurements help in assessing the efficiency and performance of each configuration. In addition to performance metrics, the system also examines the outputs for accuracy and consistency. This involves checking whether different configurations lead to the same decision or output and, if not, analyzing why discrepancies occur. For instance, differences might arise due to variations in how rules are prioritized or executed, which can lead to divergent outcomes even with the same input. Advanced statistical tools and data analysis techniques, such as variance analysis or regression models, can be employed to quantify the differences and understand the impact of specific configurations or changes in the rule engine. Visualization tools like graphs and charts are also useful in presenting these differences clearly, showing how changes in the rule engine's setup affect its characteristics. Furthermore, the system might utilize simulation and testing frameworks to repeatedly evaluate the rule engine under controlled conditions, enhancing the reliability of the findings. This iterative testing helps in pinpointing inefficiencies and identifying optimal configurations for the rule engine.

System 286 may compare the first difference to a first criterion and compare the second difference to a second criterion. For example, the criterion may relate to how a given model is updated. For example, the system may determine whether to deploy a first modified script (e.g., a new script) in the first artificial intelligence model based on comparing the first difference to the first criterion and comparing the second difference to the second criterion.

For example, when system 286 is tasked with determining updates to a model based on various criteria, it typically follows a structured decision-making process that involves comparing differences in outputs and characteristics to specific criteria. This method ensures that any modifications or updates not only improve the model's performance but also align with overall system requirements and constraints. The first step in this process may involve generating and quantifying two key differences: the first difference relates to changes in the outputs of the model when a modified script is applied, and the second difference involves variations in the characteristics, such as execution time or resource usage, under the modified script. Each of these differences is then assessed against a predefined criterion.

The first criterion typically pertains to the quality, accuracy, or relevance of the outputs. For example, if the outputs are decisions or classifications, the criterion might measure the accuracy, precision, or consistency of these outcomes. The first difference—the change in outputs caused by the modified script—is compared to this criterion to evaluate whether the modification leads to a significant improvement, meets a minimum threshold, or perhaps reduces error rates below a certain level. If the modified outputs meet or exceed this criterion, the change can be considered beneficial from an output-quality standpoint.

The second criterion relates to the efficiency and feasibility of the characteristics. This might involve metrics like processing time, cost of computation, or scalability. The second difference—the change in how the rule engine processes inputs with the new script—is assessed against this efficiency criterion. For instance, if a new script reduces processing time without compromising output quality or increases the cost but greatly enhances performance, it may be deemed acceptable.

The system uses these comparisons to make an informed decision about whether to deploy the modified script in the model. If both criteria are satisfactorily met—meaning the new script improves output quality according to the first criterion and aligns with efficiency or feasibility standards per the second criterion—the system may proceed with implementing the update. This dual assessment ensures that the model's enhancements are balanced, addressing both performance and operational efficiency.

Figure 2D:
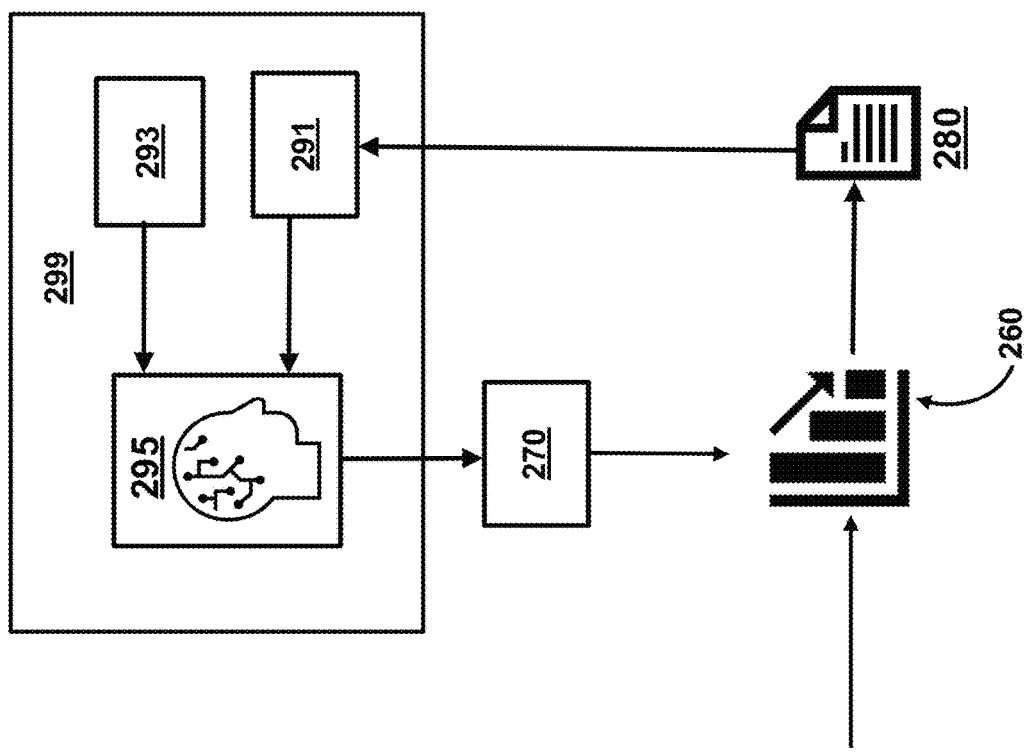
FIG. 2D is an illustrative diagram for updating decision engines during software development, according to further embodiments.

FIG. 2D is an illustrative diagram for updating decision engines during software development, according to further embodiments. Components illustrated in FIG. 2D have similar functionality to components described with respect to FIG. 2A, and thus discussion of these components has been omitted for clarity. However, FIG. 2D further illustrates that the system 200 can include a deployment criterion engine 299 that modifies deployment criteria.

As described with respect to FIG. 2A, a deployment criterion 270 is used to determine when to deploy a modified decision engine. A decision made by the decision engine 260 results in the system 200 deploying a decision engine. The decision engine 260 determines a difference between an output generated by an existing decision engine and an output generated by a modified decision engine and, based on whether the difference satisfies the deployment criterion 270, the system 200 deploys either the existing decision engine or the modified decision engine to process subsequent data items. For example, a modified decision engine is deployed as a deployed engine when a KPI or set of KPIs associated with the modified decision engine satisfy the deployment criterion 270, such as a given KPI being greater than a threshold specified by the deployment criterion 270 or a given KPI being less than a specified threshold. If the modified decision engine does not satisfy the deployment criterion, deployment of the existing decision engine is maintained. The deployment criterion 270 can include more than one criteria against which respective KPIs are compared to evaluate whether a modified decision engine should be deployed as engine. In this case, a modified decision engine can be deployed when, for example, a KPI in a set of KPIs associated with the modified decision engine satisfies at least one criterion within the deployment criterion 270, a set of associated KPIs each satisfy all of the criteria in the deployment criterion 270, or the set of associated KPIs satisfy at least a specified number of the criteria in the deployment criterion 270.

The deployment criterion engine 299 periodically modifies the deployment criterion 270 to modify the KPIs produced by decision engines. As shown in FIG. 2B, the deployment criterion engine 299 can include a metric generator 291 and a criterion generator 295.

The metric generator 291 generates a metric based on outputs produced by one or more deployed decision engines as the decision engines process data items. The metric can relate to a comparison of outputs generated by various deployed decision engines over time. In an example, after a modified decision engine is deployed, the metric generator 291 compares a set of outputs generated by the modified decision engine to a set of outputs generated by the existing decision engine most recently used. For example, the metric generator 291 compares an average value of the outputs produced by the modified decision engine in a specified time period after deployment of the modified decision engine, to an average value of the outputs produced by the last-deployed existing decision engine over another specified time period. The metric generator 291 generates a metric based on this comparison. Examples of this metric can include a difference between the outputs (e.g., the difference between the average value of the outputs from the modified decision engine and the average value of the outputs from the existing decision engine), a comparison of minimum/maximum outputs generated by each engine, a comparison of a distribution of the outputs from each engine, or the like. Alternatively, the metric can be a value that is computed based on the outputs themselves or based on actions resulting from the outputs, such as a frequency at which certain outputs or actions result, an analysis of a statistical distribution of outputs or actions, or a monetary cost incurred by the actions. In still other cases, the metric can relate to an analysis of the way decision engines themselves are deployed. For example, a metric can indicate how frequently a decision engine is being updated based on current deployment criteria.

In one example, the system 200 generates decision engines that process transaction data, such as credit card transaction data, to assess whether a requested transaction is likely to be fraudulent. Credit card transactions can be vulnerable to fraud because they are often anonymously conducted, and are readily initiated based on information that is vulnerable to misappropriation. To protect holders of credit cards and reduce the number of fraudulent transactions, a credit card processing system uses decision engines in real-time to process data associated with a requested transaction in order to predict whether the requested transaction is fraudulent. These decision engines use a set of rules that cause the credit card processing system to output a determination that a transaction is likely fraudulent or likely not fraudulent based on the transaction data. Based on this output, an action can be taken, such as denying a transaction that has been determined to be fraudulent or authorizing a transaction that has been determined to be not fraudulent. The system 200 periodically deploys new decision engines with new rules that result in some variations in the types and numbers of transactions that are labeled fraudulent. These variations can be used as the basis for computing a metric associated with the deployed decision engines. Some example metrics generated by the metric generator 291 are metrics based on transaction data of the transactions that are or are not labeled fraudulent. For example, the metric generator 291 can compare features of a transaction labeled as fraudulent by an existing decision engine to features of a transaction labeled fraudulent by a modified decision engine. The metric can relate, for example, to the number of features of these two transactions that are different or the number of features that are the same, or can be a characterization of the types of features that are possessed by both transactions or only one of the two transactions. Other example metrics generated by the metric generator 291 are metrics based on actions taken based on the decision engines' outputs, such as the denial or authorization of transactions that are labeled fraudulent or not fraudulent. For example, a metric can relate to a percentage of requested transactions that are denied before and after a modified decision engine is deployed, an assessment of a number of incorrectly labeled transactions (e.g., by comparing a number of fraud mitigation requests that are initiated by credit card holders before and after deployment of a modified decision engine), or a measure of profitability of a set of credit card transactions (e.g., balancing revenues earned from each completed credit card transaction against losses from fraudulent transactions and the cost to execute a given decision engine).

The criterion generator 295 modifies the deployment criterion 270 when the metric output by the metric generator 291 satisfies a condition 293. The condition 293 can specify, for example, that a deployment criterion should be modified when a metric is above a specified threshold or below a specified threshold, or when a metric satisfies a qualitative assessment. Human input can further be used as the condition 293 for triggering modification of the deployment criterion 270. The criterion generator 295 can include a generative model, such as an LLM, that evaluates the metric, the deployment criterion 270, and current or previously deployed decision engines to generate a recommendation for modifications to the deployment criterion 270 that will result in changes to the metric or that will achieve another specified goal. The generative model used by the criterion generator 295 can be the same model as the generative model 222 or a different model. In some embodiments, the recommendation output by the generative model can be reviewed by a human in the loop to confirm that the modified deployment criterion meets a goal of an organization or does not conflict with other goals.

Modifying the deployment criterion 270 can entail, in some cases, modifying a threshold to which a given KPI or set of KPIs is compared. For example, if the deployment criterion 270 causes a modified decision engine to be deployed when the modified decision engine runs 10% faster than an existing decision engine, the deployment criterion 270 can be modified to increase or decrease this speed threshold (e.g., such that a modified engine is deployed when it runs only 8% faster than the existing engine). In other cases, modifying the deployment criterion 270 can entail modifying a set of KPIs that are evaluated as part of the deployment criterion 270, such as adding KPIs to this set, removing KPIs from the set, combining KPIs within this set, or splitting a KPI into two or more new KPIs. For example, continuing the credit card fraud example discussed above, the criterion generator 295 can generate deployment criteria based on a metric of profitability of a credit card program. Profitability can be influenced by a variety of factors, including the number of credit card transactions that are completed (e.g., due to revenue resulting from each transaction), the number of transactions that are fraudulent but incorrectly labeled as non-fraudulent (e.g., due to losses incurred from reimbursing victims of fraud), the number of transactions that are not fraudulent but incorrectly labeled as fraudulent (e.g., due to opportunity cost of not gaining revenue from the transaction), the size of the decision engine (e.g., due to the computing costs to process transaction data through the engine, or due to slowed transaction speed caused by processing transaction data through a large engine), and so forth. The deployment criterion 270 used to deploy new fraud detection decision engines can include KPIs related to some or all of these factors, and thus modifying the deployment criterion 270 can include modifying these KPIs or thresholds corresponding to these KPIs. For example, if a first deployment criterion 270 causes a new decision engine to be deployed only based on the number of transactions that are authorized (e.g., resulting in a new decision engine deployment when the new engine increases the number of authorized transactions by a specified threshold), the criterion generator 295 may recommend adding criteria that relate to one or more of the other factors affecting profitability. These criteria can be recommended for inclusion in the deployment criterion based on observing how these criteria affect the overall metric of profitability resulting from the transactions processed through decision engines.

Figure 3A:
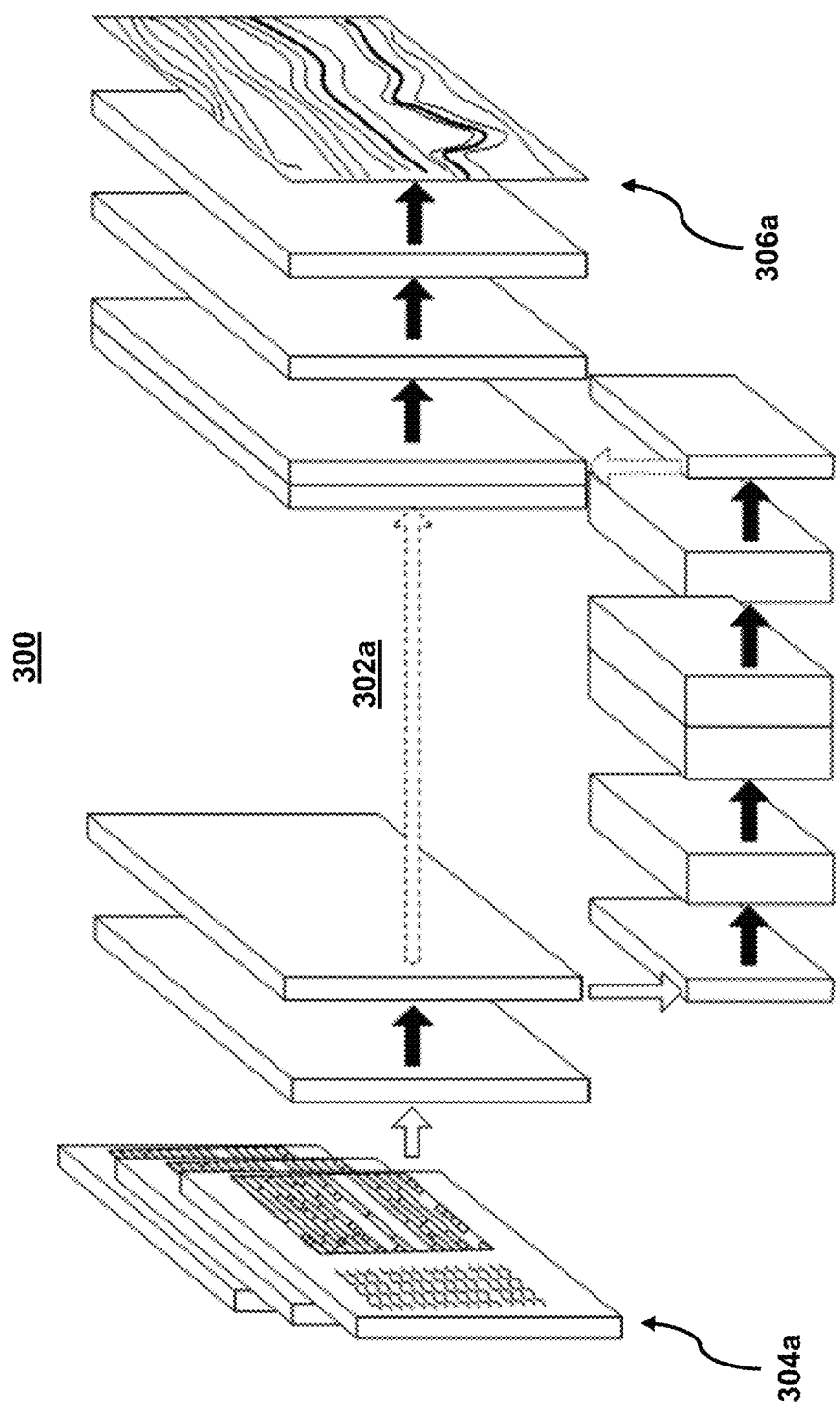
FIGS. 3A-B show illustrative components for a system used to generate modified rule engines, in accordance with one or more embodiments.
Figure 3B:
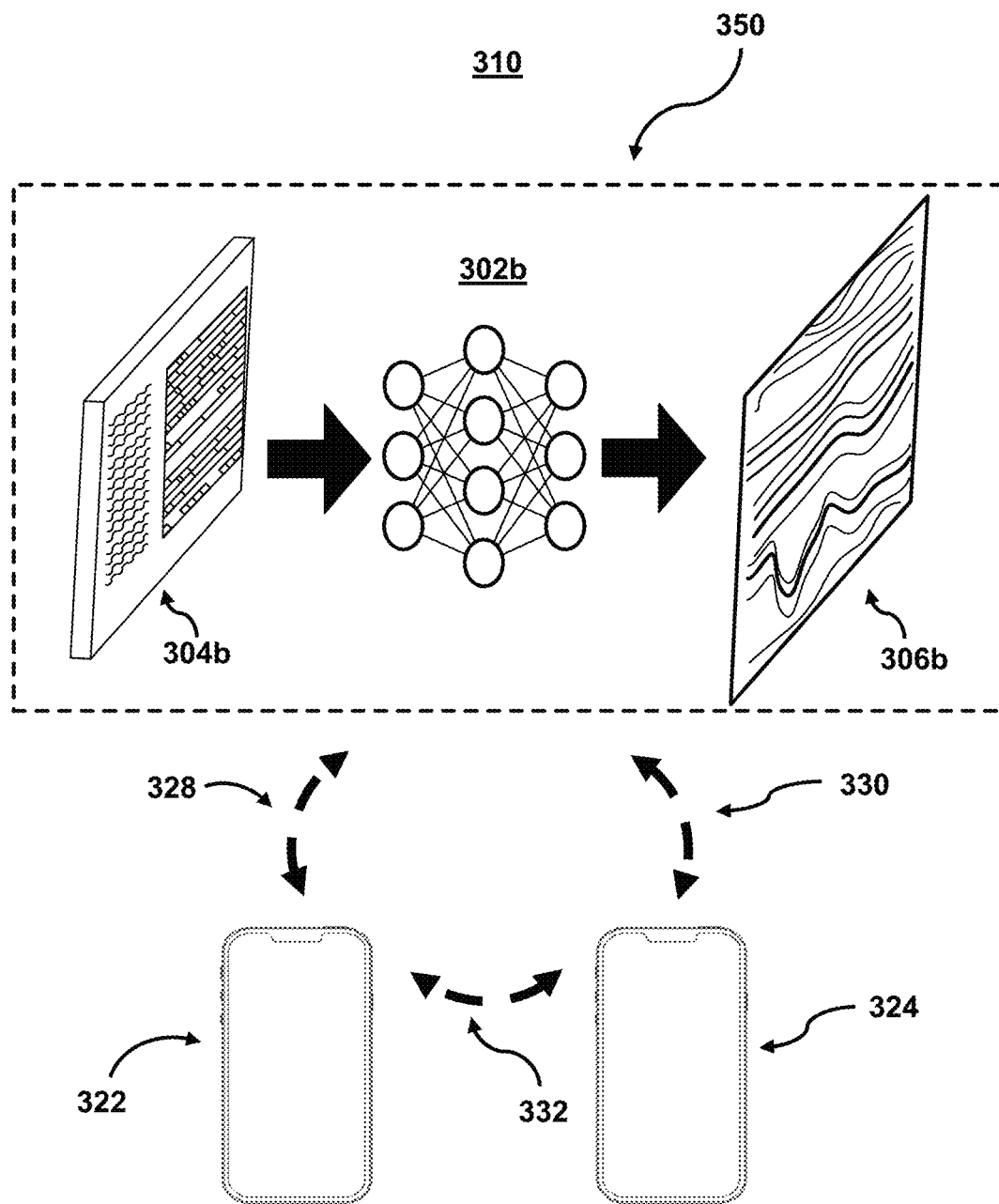

FIGS. 3A-B show illustrative components for a system used to generate modified rule engines, in accordance with one or more embodiments. For example, FIG. 3A may represent a model architecture used to generate modified rule engine script. A software development workflow, also known as a software development process or software development lifecycle (SDLC), may be a systematic series of steps, phases, or activities that guide the creation, testing, deployment, and maintenance of software applications (e.g., a rule engine). It may provide a structured framework for managing the development of software from initial concept to the final product. Different organizations and teams may adopt various software development workflows, depending on their specific needs, methodologies, and project requirements.

System 300 includes model 302*a*, which may be a machine learning model, an artificial intelligence model, etc. (which may be referred to collectively as "models" herein). Model 302*a* may take inputs 304*a* and provide outputs 306*a*. The inputs may include multiple datasets, such as a training dataset and a test dataset. Each of the plurality of datasets (e.g., inputs 304*a*) may include data subsets related to user data, predicted forecasts and/or errors, and/or actual forecasts and/or errors. In some embodiments, outputs 306*a* may be fed back to model 302*a* as input to train model 302*a* (e.g., alone or in conjunction with user indications of the accuracy of outputs 306*a*, labels associated with the inputs, or other reference feedback information). For example, the system may receive a first labeled feature input, wherein the first labeled feature input is labeled with a known prediction for the first labeled feature input. The system may then train the first model to classify the first labeled feature input with the known prediction (e.g., generate a modified rule engine script).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on output 306a. In some embodiments, the model (e.g., model 302a) may not perform any actions. The output of the model (e.g., model 302a) may be used to generate a modified rule engine script. For example, model 302a may comprise an artificial intelligence model that determines a first modified script for a first modified rule engine based on a first script extracted from a first existing rule engine. The artificial intelligence model may be trained to generate rule engine script based on comparisons of historic script interpretations of historic rule bases for historic rule engines.

FIG. 3B shows illustrative components for a system used to determine when to deploy a modified rule engine, in accordance with one or more embodiments. For example, FIG. 3B may show illustrative components for generating a modified rule engine script. As shown in FIG. 3B, system 310 may include user device 322 and user device 324. While shown as smartphones in FIG. 3B, it should be noted that user device 322 and user device 324 may be any computing device, including, but not limited to, a laptop computer, a tablet computer, a hand-held computer, and other computer equipment (e.g., a server), including "smart," wireless, wearable, and/or mobile devices. System 310 may also include cloud components. For example, cloud components may be implemented as a cloud computing system, and may feature one or more component devices. It should be noted that, while one or more operations are described herein as being performed by particular components of system 310, these operations may, in some embodiments, be performed by other components of system 310. As an example, while one or more operations are described herein as being performed by components of user device 322, these operations may, in some embodiments, be performed by cloud components. In some embodiments, the various computers and systems described herein may include one or more computing devices that are programmed to perform the described functions. Additionally, or alternatively, multiple users may interact with system 310 and/or one or more components of system 310.

With respect to the components of user device 322 and user device 324, each of these devices may receive content and data via I/O paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3B, both user device 322 and user device 324 include a display upon which to display data.

Additionally, as user device 322 and user device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 310 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on user device 322 or user device 324. Alternatively or additionally, API layer 350 may reside on one or more components of system 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 310 may be partially based on API layer 350, such that there is strong adoption of SOAP and RESTful Web services, using resources like Service Repository and Developer Portal, but with low governance, standardization, and separation of concerns. Alternatively, system 310 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

As shown in FIG. 3B, in some embodiments, model 302b may be trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving, as compared to traditional computer programs. During training, an output layer of model 302b may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, backpropagation techniques may be utilized by model 302b where forward stimulation is used to reset weights on the "front" neural units. In some embodiments, stimulation and inhibition for model 302b may be more free-flowing, with connections interacting in a more chaotic and complex fashion. During testing, an output layer of model 302b may indicate whether or not a given input corresponds to a classification of model 302b (e.g., generate a modified rule engine script).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
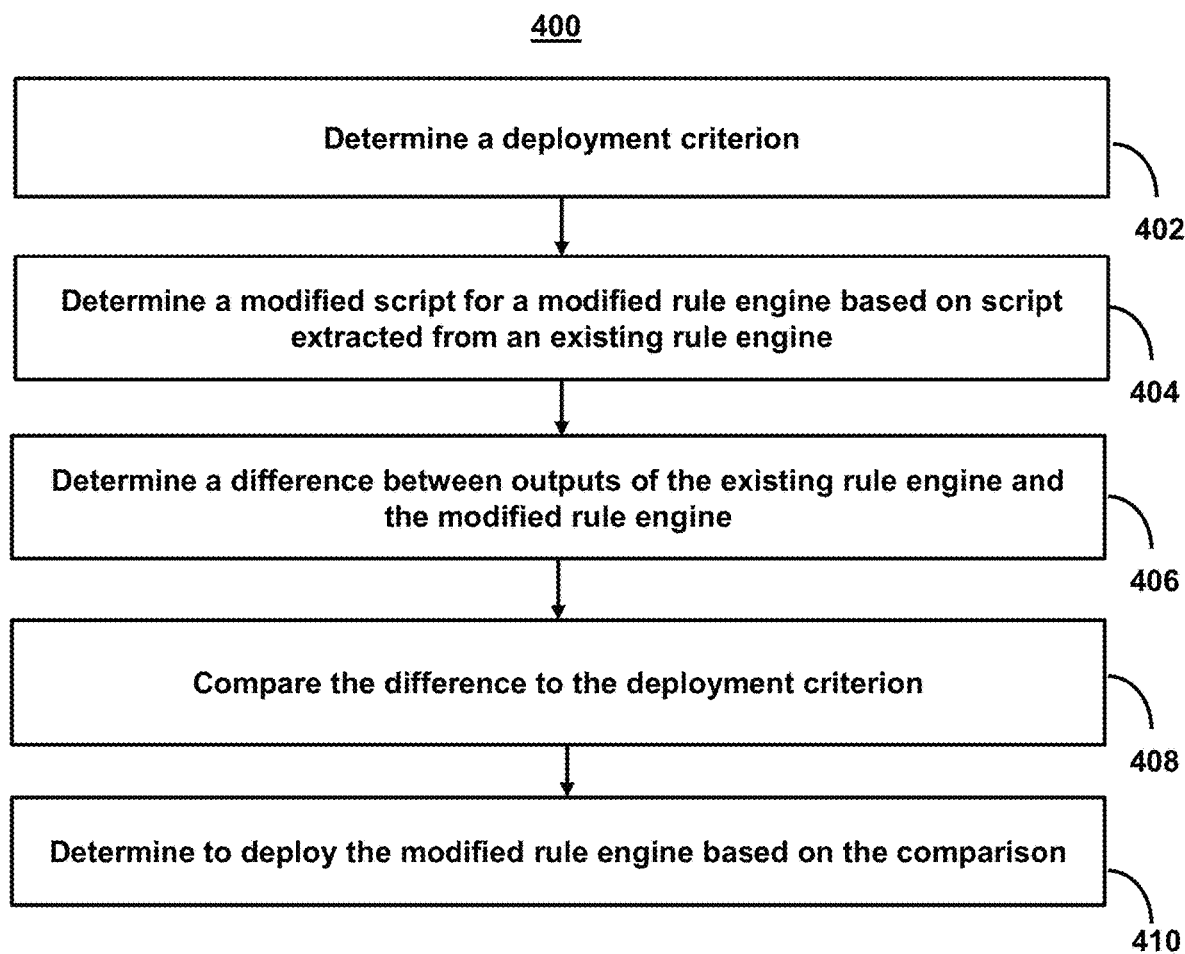
FIG. 4 shows a flowchart of the steps involved in updating rule engines during software development using generated proxy models, in accordance with one or more embodiments.

FIG. 4 shows a flowchart of the steps involved in updating rule engines during software development using generated proxy models, in accordance with one or more embodiments. For example, the system may use process 400 (e.g., as implemented on one or more system components described above) in order to update rule engines using generated proxy models with predefined model deployment criteria that mimics formats and structures of existing rule engines.

At step 402, process 400 (e.g., using one or more components described above) determines a deployment criterion. For example, the system may determine a first model deployment criterion based on a user input (e.g., into a user interface), based on a rule engine, and/or based on some other factor. As a practical example, a continuous rule monitoring module within an application may identify a novel SQL injection technique called "Double Encoding Injection." This discovery is based on information found in manual updates, media articles, threat intelligence feeds, vulnerability reports, and/or other sources. Double encoding injection may involve exploiting input validation by using double encoding on certain characters, making them appear harmless to traditional validation checks. The system may generate a deployment criterion that corresponds to whether or not existing script is susceptible to double encoding injection.

For example, the deployment criterion may comprise a criterion to determine when an existing rule engine should receive a modification. The deployment criterion may be based on a difference (e.g., in accuracy, performance, validations, robustness, security, compliance, scalability, latency, throughput, etc.) between outputs. For example, the model should meet predefined accuracy and performance thresholds. These metrics may vary depending on the specific use case but are essential to ensure that the model can effectively perform its intended task. Additionally or alternatively, the model may undergo thorough validation and testing procedures, including cross-validation, holdout testing, and evaluation against a validation dataset, to verify its generalization performance. Additionally or alternatively, the model may be tested for robustness and resilience against various types of data, including noisy, missing, or out-of-distribution data. It should perform reliably under different conditions. Additionally or alternatively, the model may be assessed for potential security risks, such as vulnerability to adversarial attacks, data leakage, and unauthorized access. Security measures should be in place to protect the model and the data it processes. Additionally or alternatively, the model may adhere to relevant legal and regulatory requirements, such as data protection and privacy laws, industry-specific standards, and ethical guidelines. Compliance with regulations such as GDPR, HIPAA, or industry-specific regulations is essential. Additionally or alternatively, the model may be capable of scaling to handle the expected workload in a production environment. Scalability tests should ensure that the model can meet performance requirements as the data volume and user load increase. Additionally or alternatively, the model's response time (latency) and its ability to handle a specific number of requests per unit of time (throughput) may be evaluated to ensure it can meet real-time or near-real-time processing requirements.

At step 404, process 400 (e.g., using one or more components described above) determines a modified script for a modified rule engine based on script extracted from an existing rule engine. For example, the system may determine, using a first artificial intelligence model, a first modified script for a first modified rule engine based on a first script extracted from a first existing rule engine, wherein the first artificial intelligence model is trained to generate rule engine script based on comparisons of historic script interpretations of historic rule bases for historic rule engines. For example, the model may compare historical data to make predictions by learning patterns and relationships within the historical data. The model is trained using the historical data and associated labels by adjusting the model's parameters to minimize the difference between its predictions and the actual outcomes in the training data. As a practical example, the system may analyze a researcher's report, understanding that an attacker that employs double encoding on SQL-related keywords and characters such as a single quotation mark of a semicolon. In response the system may generate new rules. For example, a first rule may check for double encoding of SQL keywords ('SELECT', 'INSERT', 'UPDATE', etc.). A second rule may detect and block input with double-encoded special characters like %2527 (encoded single quote) and %253B (encoded semicolon).

In some embodiments, determining the first modified script for the first modified rule engine based on the first script extracted from the first existing rule engine may comprise the system determining a first scripting language for the first script. The system may determine a first efficiency of the first scripting language. The system may determine a second scripting language that comprises a second efficiency. The system may determine to generate the first modified script in the second scripting language based on the second efficiency exceeding the first efficiency. In some embodiments, determining the first efficiency of the first scripting language may comprise the system determining a level of compatibility of the first scripting language with other script in the first existing rule engine. The system may determine the first efficiency based on the level of compatibility. In some embodiments, determining the first efficiency of the first scripting language may comprise the system comparing a performance characteristic of the first scripting language with other script in the first existing rule engine. The system may determine the first efficiency based on the performance characteristic.

In some embodiments, determining the first modified script for the first modified rule engine based on the first script extracted from the first existing rule engine may comprise the system determining a first function in the first script, wherein the first function has a first script length. The system may determine a second function for the first modified script, wherein the second function has a second script length, and wherein the second script length is shorter than the first script length.

In some embodiments, determining the first modified script for the first modified rule engine based on the first script extracted from the first existing rule engine may comprise the system determining a hard-coded number string in the first script. The system may determine a named constant corresponding to the hard-coded number string. The system may replace the hard-coded number string with the named constant in the first modified script.

In some embodiments, determining the first modified script for the first modified rule engine based on the first script extracted from the first existing rule engine may comprise the system determining a first class in the first script. The system may determine a second class corresponding to the first class. The system may replace the first class with the second class in the first modified script.

In some embodiments, determining the first modified script for the first modified rule engine based on the first script extracted from the first existing rule engine may comprise the system determining a syntax in the first modified script. The system may validate the first modified script based on the syntax.

In some embodiments, determining the first modified script for the first modified rule engine based on the first script extracted from the first existing rule engine may comprise determining a dependency in the first modified script. The system may validate the first modified script based on the dependency.

At step 406, process 400 (e.g., using one or more components described above) determines a difference between outputs of the existing rule engine and the modified rule engine. For example, the system may input first rule base data into the first existing rule engine, wherein the first existing rule engine processes the first rule base data to generate a first output. The system may input the first rule base data into the first modified rule engine, wherein the first modified rule engine processes the first rule base data with the first modified script to generate a first modified output. The system may determine a first difference between the first output and the first modified output. As a practical example, the system may determine that existing rules check for traditional SQL injection patterns, but do not account for the aforementioned double encoding.

At step 408, process 400 (e.g., using one or more components described above) compares the difference to the deployment criterion. For example, the system may compare the first difference to the first model deployment criterion. In some embodiments, the deployment criterion may comprise a threshold difference between two outputs. For example, comparing the first difference to the first model deployment criterion may comprise the system determining a threshold hit rate difference. The system may then compare the threshold hit rate difference to the first difference. As a practical example, the system may determine that the fact that the existing rules check for traditional SQL injection patterns, but do not account for the aforementioned double encoding corresponds to a deployment criterion.

In some embodiments, determining the first difference between the first output and the first modified output may comprise the system determining a first hit rate for the first existing rule engine in the first output. The system may determine a second hit rate for the first modified rule engine in the first modified output. The system may determine the first difference based on the first hit rate and the second hit rate. In some embodiments, determining the first difference between the first output and the first modified output may comprise the system determining a first performance metric for the first existing rule engine in the first output. The system may determine a second performance metric for the first modified rule engine in the first modified output. The system may determine the first difference based on the first performance metric and the second performance metric. In some embodiments, determining the first difference between the first output and the first modified output may comprise the system determining a first number of errors in the first output. The system may determine a second number of errors in the first modified output. The system may determine the first difference based on the first number of errors and the second number of errors.

In some embodiments, determining the first difference between the first output and the first modified output may comprise the system determining a first variable in the first output. The system may determine a second variable in the first modified output. The system may determine the first difference based on the first variable and the second variable.

At step 410, process 400 (e.g., using one or more components described above) determines to deploy the modified rule engine based on the comparison. For example, the system may determine whether to deploy the first modified rule engine based on comparing the first difference to the first model deployment criterion. In some embodiments, deploying the first modified rule engine may comprise replacing the first existing rule engine with the first modified rule engine to generate a second existing rule engine. Additionally or alternatively, the system may determine a second model deployment criterion. For example, the system may continuously train and/or determine when to deploy a new rule engine. As a practical example, the system may evaluate the current rules and identifies a gap in handling double-encoded characters as described above. In response the system may deploy the modified rule and/or suggests modifications. For example, the system may update a rule to strengthen existing checks for single-encoded SQL keywords. As another example, the system may introduce checks specifically looking for double-encoded characters in input. In such cases, an automated system may integrate the new and updated rules into the application's input validation module. Now, the application is equipped to detect and prevent the "Double Encoding Injection" technique.

In some embodiments, the system may continuously monitor and/or perform continuous learning and improvement. For example, the application may log attempted attacks, including any instances of the double encoding injection technique as well as new vectors for attacks. These logs may be used to determine new deployment criteria. For example, the system may feed this information back into a model, allowing it to refine its understanding of emerging threats and further enhance rule generation. As the model identifies new attack vectors or variations, the system may automatically generate updated rules. These rules may be seamlessly integrated into the validation process, ensuring ongoing protection against evolving security threats.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
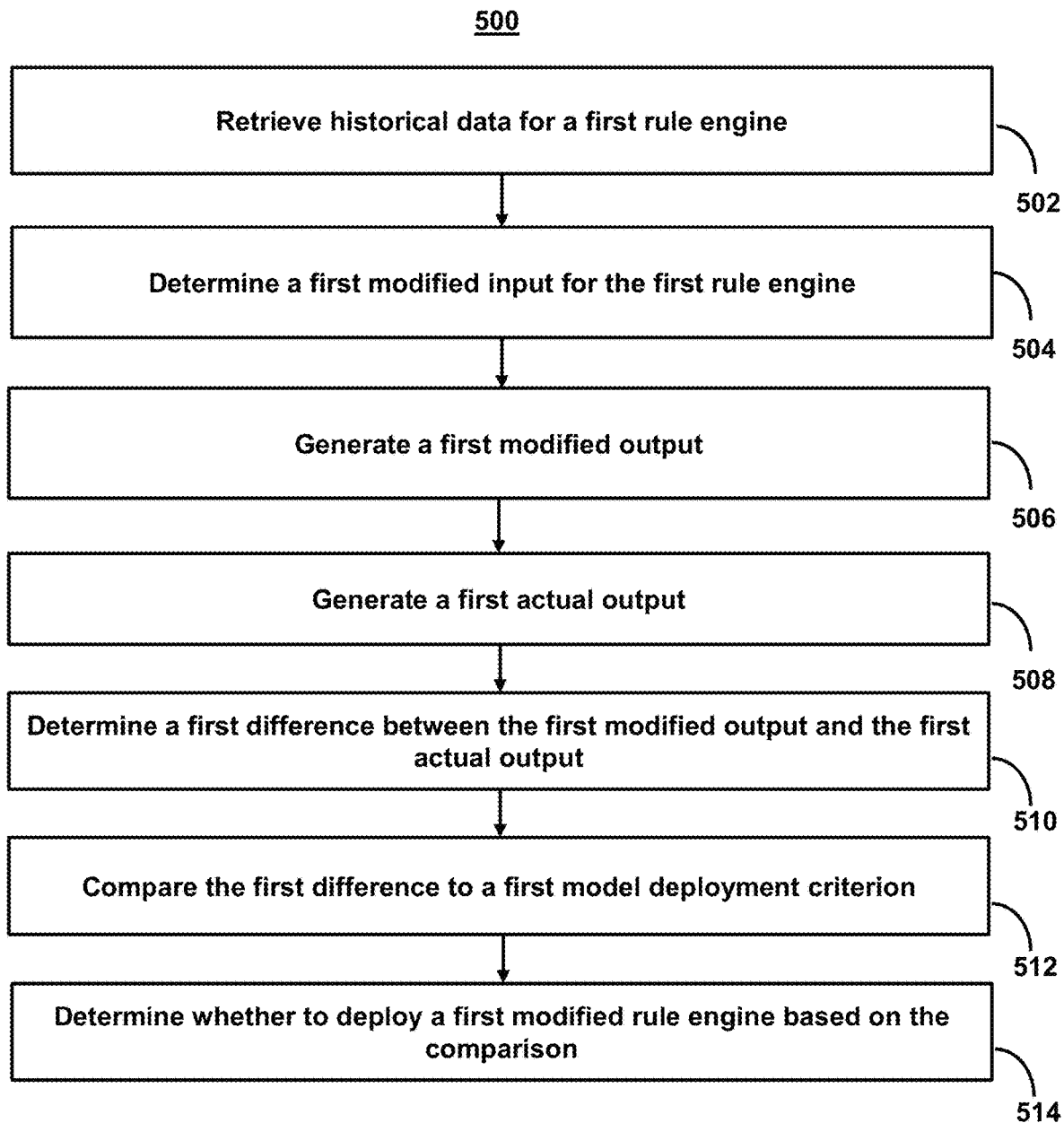
FIG. 5 shows a flowchart of the steps involved in detecting required rule engine updates, in accordance with one or more embodiments.

FIG. 5 shows a flowchart of the steps involved in detecting required rule engine updates, in accordance with one or more embodiments. For example, the system may use process 500 (e.g., as implemented on one or more system components described above) in order to detect required rule engine updated using artificial intelligence models that do not require training specific to model components and objectives. For example, process 500 may be used for stress testing rule engines by modifying potential inputs. That is, the system may generate modified inputs that may reflect potential changes in data to ensure that a model continues to be appropriate as the data changes. One practical example may be a model that determines whether a user qualifies for a bank account. A model may use information about a user (e.g., current account status, credit score, demographic information, etc.) and/or information about current statewide conditions (e.g., unemployment rate, interest rate, default rates, etc.) as an actual input to the model. The system may then make a modified input by adjusting one or more values in the actual input (e.g., to reflect the interest rate potentially rising in one year, to reflect the birth of a child, to reflect an increase in default rates, etc.). The system may then process the modified input and compare its output to one or more thresholds to determine whether or not the output corresponds to one or more criterion (e.g., an accuracy rate, a model objective, etc.).

At step 502, process 500 (e.g., using one or more components described above) retrieves historical data for a first rule engine. For example, the system may retrieve historical data for a first rule engine, wherein the historical data comprises historical inputs used by the first rule engine to generate historical outputs.

At step 504, process 500 (e.g., using one or more components described above) determines a first modified input for the first rule engine. For example, the system may determine, using a first artificial intelligence model, a first modified input for the first rule engine based on a first data characteristic of a first subset of the historical inputs.

In some embodiments, determining, using the first artificial intelligence model, the first modified input for the first rule engine based on the first data characteristic of the first subset of the historical inputs comprises the system retrieving a first synthetic data generation rule and comparing the first data characteristic to the first synthetic data generation rule. The system then generates the first modified input based on comparing the first data characteristic to the first synthetic data generation rule. For example, to determine the first modified input for a rule engine using an artificial intelligence model, the system follows a structured approach that leverages synthetic data generation rules tailored to the specific characteristics of historical data inputs. During this analysis, the system identifies key data characteristics, such as distributions, trends, typical values, and anomalies within this subset. These characteristics are essential as they provide a basis for generating realistic synthetic data that reflects the complexities and nuances of actual data.

Once the key data characteristics are identified, the system retrieves a set of synthetic data generation rules. These rules are designed to guide the creation of synthetic data based on specific attributes or patterns identified in the historical data. The rules might include instructions on how to manipulate data distributions, simulate rare events, or ensure that certain constraints or relationships among data elements are maintained in the synthetic dataset. The system then compares the identified data characteristics from the historical inputs to the retrieved synthetic data generation rules. This comparison is crucial as it dictates how the synthetic data should be structured to ensure it is both useful for testing and analysis and representative of real operational conditions. The rules may specify, for instance, that the modified inputs should mirror certain probability distributions or maintain specific correlations between data points. Based on the comparison between the historical data characteristics and the synthetic data generation rules, the system generates the first modified input. This input is constructed to align closely with the rules, ensuring that it effectively simulates potential real-world inputs that the rule engine might need to process.

In some embodiments, determining, using the first artificial intelligence model, the first modified input for the first rule engine based on the first data characteristic of the first subset of the historical inputs by determining a first trend in the first subset based on the first data characteristic and determining a second data characteristic based on the first trend. The system may then replace a first value in the first actual input based on the second data characteristic to generate the first modified input. For example, the system begins by analyzing a subset of historical inputs that have been previously processed by the rule engine. This analysis focuses on identifying specific data characteristics, such as patterns, anomalies, or typical values within this subset. From these characteristics, the system determines a primary trend. For example, if the historical data comprises financial transactions, the trend might be an increasing transaction volume during certain periods. Using the identified trend, the system then determines secondary data characteristics. This involves extrapolating or inferring additional attributes or patterns that are likely influenced by the primary trend. For instance, an increase in transaction volume might correlate with higher incidences of fraud or changes in customer behavior. These secondary characteristics are crucial for generating modified inputs that are not just random but are instead reflective of specific conditions likely to affect the rule engine's operation.

With the secondary data characteristics identified, the system modifies actual inputs to reflect these characteristics. This may involve the system replacing specific values within the actual inputs. For example, if the trend analysis suggests an increase in transaction values, the system might increase the amounts in a subset of transaction data to create the modified input. This replacement is guided by the secondary characteristics, ensuring that the modified input is realistic and aligned with expected data trends. The modified data, now representing the first modified input, is finalized and prepared for use. This modified input serves multiple purposes: it allows the rule engine to be tested under conditions that simulate future or altered scenarios based on real historical trends, and it helps in validating or refining the rule engine's algorithms by exposing them to tailored data scenarios that are likely to occur in actual operations.

In some embodiments, the system determines, using the first artificial intelligence model, the first modified input for the first rule engine based on the first data characteristic of the first subset of the historical inputs by determining a first normal distribution (or first standard deviation) in the first subset based on the first data characteristic and determining a first outlier to the first normal distribution. The system may determine a second data characteristic based on the first outlier and replace a first value in the first actual input based on the second data characteristic to generate the first modified input. For example, to generate a first modified input for a rule engine using an artificial intelligence model, a system may employ a comprehensive approach that involves statistical analysis of historical data to identify normal distributions and outliers, which then inform the creation of the modified input. The system may analyze a subset of historical inputs that have been used previously by the rule engine. During this analysis, the system identifies the first data characteristic of interest—this could be a feature such as transaction amount, time duration, or any numerical attribute relevant to the rule engine's operations. The system then applies statistical methods to model the distribution of this data characteristic, determining that it follows a normal distribution. This involves calculating the mean and standard deviation of the data and fitting these parameters to a normal distribution curve. With the normal distribution established, the system next identifies data points that qualify as outliers. Outliers are those data points that deviate significantly from the established normal distribution, based on a predetermined threshold (e.g., data points that lie beyond three standard deviations from the mean). These outliers are crucial as they may represent anomalies or extreme cases that could significantly impact the rule engine's processing and decision-making.

After identifying an outlier, the system determines a second data characteristic related to this outlier. This might involve understanding the context or conditions under which the outlier occurred, such as during a peak business period or a technical glitch. This secondary characteristic is intended to provide additional insights that can inform the creation of more nuanced and scenario-specific modified inputs. Using the insights gained from the analysis of the outlier and its related data characteristics, the system modifies an actual input to reflect these findings. This modification typically involves replacing or adjusting the values in the actual input data that correspond to the identified outlier and its associated characteristics. For instance, if the outlier represents an unusually high transaction during a festive season, the modified input may include similar high-value transactions under comparable conditions but within a controlled setting to test how well the rule engine handles such extremes. The resulting modified data constitutes the first modified input, which is then utilized to test or train the rule engine. This modified input allows the rule engine to simulate handling real-world extreme scenarios or anomalies, providing a robust platform for testing the rule engine's effectiveness and resilience under varied conditions.

In some embodiments, the first artificial intelligence model may be an autoregressive model. The system may determine, using the first artificial intelligence model, the first modified input for the first rule engine based on the first data characteristic of the first subset of the historical inputs by predicting a first subsequent element in a sequence of values of the first subset based on the first data characteristic and determining a second data characteristic based on the first subsequent element. The system may then replace a first value in the first actual input based on the second data characteristic to generate the first modified input.

For example, the system may select a subset of historical inputs that have been previously used by the rule engine. The system may identify a specific data characteristic within this subset, such as a sequence of numerical values related to a particular variable (e.g., sales figures, temperature readings, etc.). The system then employs an autoregressive model to analyze this sequence. An autoregressive model is a type of statistical model that predicts future data points based on past values; essentially, it regresses the variable on its own prior values. In this context, the model predicts the next element in the sequence (the first subsequent element) based on the known sequence of data points. Once the first subsequent element is predicted using the autoregressive model, the system assesses this element to determine a second data characteristic. This characteristic could be an attribute or feature inferred from the predicted value, such as a trend direction, volatility, or an anomaly indicator. For example, the system translates the statistical output into actionable data that can inform the modified input generation.

With the second data characteristic defined, the system then proceeds to modify an actual input that is part of the historical dataset. This modification involves replacing or adjusting a specific value in the actual input with one that reflects the predicted subsequent element and the determined second characteristic. For instance, if the predicted subsequent element indicates an unusual spike in sales during a typically low season, the modified input might be constructed to include similar spikes, thereby testing the rule engine's responsiveness to such atypical data. The modified actual input now serves as the first modified input. This input is specifically designed to challenge and test the rule engine under simulated yet plausible conditions that are extrapolated from historical and predicted data. By using this modified input, the rule engine can be evaluated for its effectiveness in handling potential future scenarios, which are not yet observed but are likely given current trends.

In some embodiments, the first artificial intelligence model is a generative adversarial network (GAN). The system may determine, using the first artificial intelligence model, the first modified input for the first rule engine based on the first data characteristic of the first subset of the historical inputs by predicting a second data characteristic based on the first data characteristic and replacing a first value in the first actual input based on the second data characteristic to generate the first modified input. For example, to generate a first modified input for a rule engine using a generative adversarial network, the system engages in a sophisticated process that harnesses the capabilities of this deep learning framework to produce realistic and contextually relevant synthetic data. GANs, comprising two neural networks—the generator and the discriminator—work in tandem to improve each other, creating highly accurate synthetic data outputs. The system first trains the GAN on a subset of historical inputs that are relevant to the rule engine's operations. These inputs are characterized by specific data attributes (the first data characteristic), such as transaction amounts, time intervals, sensor readings, or any other numerical or categorical data relevant to the scenario. The training process involves the generator trying to create data that mimics the real historical data, while the discriminator evaluates its authenticity, effectively teaching the generator to produce increasingly realistic data over time.

Once the GAN is adequately trained, it is used to predict a second data characteristic based on the first data characteristic of the historical data. This involves the generator proposing new data instances that reflect plausible, yet previously unobserved, scenarios based on learned data patterns. The second data characteristic could be a derivative feature or an inferred attribute that adds depth or complexity to the synthetic data, such as predicting unusual but plausible peaks in transaction data during atypical periods. With the second data characteristic predicted by the GAN, the system then modifies an actual input from the historical dataset. This modification entails replacing or adjusting a value in the actual input with one that embodies the predicted second characteristic. For example, if the second data characteristic involves an unexpected increase in demand for a product, the modified input might include sales figures that reflect this surge, providing a test scenario for the rule engine to handle. The result of this modification is a modified input that closely resembles real-world data but includes variations that test the rule engine's ability to process and respond to new and evolving scenarios. This modified input is then used to challenge the rule engine, ensuring it can adapt to and operate effectively under new conditions that may arise in actual deployment.

In some embodiments, the first artificial intelligence model is a variational autoencoder. The system may determine, using the first artificial intelligence model, the first modified input for the first rule engine based on the first data characteristic of the first subset of the historical inputs by predicting a first latent space of the first subset based on the first data characteristic, determining a second data characteristic based on the first latent space, and replacing a first value in the first actual input based on the second data characteristic to generate the first modified input. To generate a first modified input for a rule engine using a Variational Autoencoder (VAE), a system undertakes a series of steps involving deep learning techniques to model and manipulate complex data distributions. VAEs are particularly suited for this task due to their ability to encode data into a latent space and then generate new data from that space, offering a sophisticated method for creating realistic synthetic data.

The system may analyze a subset of historical inputs that have previously been processed by the rule engine. This subset is characterized by a specific data characteristic, such as patterns in customer behavior, sales figures, or sensor readings. The VAE then learns to encode this data into a latent space-a compressed representation that captures the underlying statistical properties and relationships within the data. The encoding process involves the VAE's encoder, which takes the high-dimensional data and maps it into a lower-dimensional, dense representation. Once the data is encoded into the latent space, the system uses the VAE's decoder to predict new data characteristics based on the latent representation. This involves sampling from the latent space to generate new data instances that have not been explicitly observed but are statistically plausible given the learned data distribution. The decoded data often reveals hidden or less obvious patterns and trends, referred to here as the second data characteristic, which could be crucial for testing how the rule engine handles novel or extreme data scenarios.

With the second data characteristic identified, the system modifies an actual input from the historical dataset. This modification typically involves replacing or adjusting a value in the actual input to align with the predicted second data characteristic. For example, if the latent space analysis suggests an emerging trend of increased transaction volumes during certain periods, the modified input might be constructed to include such a scenario, testing the rule engine's ability to process higher-than-normal volumes. The resulting modified data serves as the first modified input. This input is specifically tailored to provide a realistic yet challenging scenario for the rule engine, allowing it to be tested under conditions that mirror potential future data interactions. The use of a VAE ensures that the modified inputs are not only diverse but also representative of complex and subtle data relationships, enhancing the rule engine's preparedness for real-world operations.

In some embodiments, the first artificial intelligence model uses synthetic minority over-sampling. The system may determine, using the first artificial intelligence model, the first modified input for the first rule engine based on the first data characteristic of the first subset of the historical inputs by predicting a minority class of the first subset based on the first data characteristic, determining a second data characteristic based on the minority class, and replacing a first value in the first actual input based on the second data characteristic to generate the first modified input.

To generate a first modified input for a rule engine using Synthetic Minority Over-sampling Technique (SMOTE), a system utilizes a method specifically designed to address class imbalance in datasets by augmenting the minority class through synthetic data generation. This approach is particularly useful in scenarios where certain classes of data are underrepresented, which can skew the rule engine's learning and prediction accuracy. For example, the system may system analyze a subset of historical inputs that have been processed by the rule engine. The focus here is on identifying a minority class within this subset based on the first data characteristic—this could be any feature that distinguishes a smaller group within the dataset, such as rare types of transactions in financial data or infrequent fault conditions in sensor data from industrial processes. Identifying the minority class helps the system in targeting the synthetic data generation process to areas where the rule engine might lack sufficient data to make accurate predictions.

Once the minority class is identified, the system uses the identified first data characteristic to predict other potential instances of the minority class or to better understand its characteristics. This is typically achieved through a combination of statistical analysis and machine learning models that can discern patterns or conditions common to the minority class but rare in the dataset as a whole. Based on the analysis of the minority class, a second data characteristic is determined. This characteristic represents additional features or attributes associated with the minority class, which might not be evident from the original dataset. For instance, if the minority class involves customers who default on payments, the second data characteristic might involve specific spending patterns or account behaviors leading up to a default.

Using the insights gained from the analysis of the minority class and the second data characteristic, the system modifies an actual input from the historical dataset. This modification involves replacing or adjusting a value in the actual input to include or emphasize the second data characteristic. The purpose here is to enrich the dataset with enhanced representations of the minority class, thereby creating a modified input that can help the rule engine better understand and react to these rare but important scenarios.

At step 506, process 500 (e.g., using one or more components described above) generates a first modified output. For example, the system may input the first modified input into the first rule engine, wherein the first rule engine processes the first modified input to generate a first modified output.

At step 508, process 500 (e.g., using one or more components described above) generates a first actual output. For example, the system may input a first actual input into the first rule engine to generate a first actual output.

At step 510, process 500 (e.g., using one or more components described above) determines a first difference between the first modified output and the first actual output. For example, the system may determine a first difference between the first modified output and the first actual output.

In some embodiments, the system may determine the first difference between the first modified output and the first actual output by comparing various characteristics. For example, the system may determine a first variable in the first modified output. The system may determine a second variable in the first actual output. The system may determine the first difference based on the first variable and the second variable.

For example, to determine the difference between a modified output and an actual output of a model, a system may undertake a systematic comparison based on predefined variables that are relevant to the outputs' characteristics. This process may involve comparing synthetic versions (designed to simulate real outcomes under hypothetical or modified conditions) to the actual output (derived from real-world data and conditions). The system may identify and isolate key variables within both the synthetic and actual outputs. These variables are chosen based on their relevance to the model's purpose and the specific aspects of the outputs that are critical for evaluation. For instance, in a financial forecasting model, such variables might include predicted revenue figures, cost estimates, or risk scores. Once the relevant variables are determined, the system measures these variables independently in both the synthetic and actual outputs. This measurement could involve extracting numerical values, categorizing textual information, or quantifying changes in trends or patterns.

The system may calculate the first difference between the corresponding variables of the synthetic and actual outputs. This calculation typically involves a direct comparison, such as subtracting one value from the other, computing percentage differences, or using more complex statistical measures such as root mean square error (RMSE) or mean absolute error (MAE) if the variables are part of a continuous data set. The significance of the first difference is then assessed to determine its practical implications. For example, a significant difference in predicted revenues between synthetic and actual outputs could indicate potential inaccuracies in the model under simulated conditions, or it might reveal new insights about variables that were not fully accounted for in the model's initial configuration.

The system may use this difference as a basis for further analysis or model refinement. If the difference exceeds acceptable thresholds, it might prompt a review and adjustment of the model's parameters or the introduction of new data or variables to bridge the gap between synthetic and actual outputs. This iterative process ensures that the model remains robust, accurate, and reflective of both current and potential future scenarios, thereby enhancing its reliability and utility in decision-making processes.

In some embodiments, the system may determine the first difference between the first modified output and the first actual output by determining a first number of errors in the first modified output and determining a second number of errors in the first actual output. The system may determine the first difference based on the first number of errors and the second number of errors. For example, the system may determine discrepancies between the model's predictions and the actual or expected results. The system may define what constitutes an error within the context of the model's intended use and outputs. For quantitative models, such as those predicting numerical values, errors are often measured by comparing the predicted values against actual values obtained from real-world data or a validation dataset. The system calculates the difference for each prediction, and specific criteria are used to decide whether each difference qualifies as an error. For example, in a financial forecasting model, an error might be defined as any prediction that deviates from the actual value by more than a predetermined percentage or amount.

In classification models, errors are typically identified by comparing the predicted labels or categories with the true labels provided in the dataset. The system counts each instance where the predicted label does not match the true label as an error. This can be visualized and analyzed using tools like a confusion matrix, which not only shows the number of correct predictions but also breaks down the types of errors (e.g., false positives and false negatives). For more complex outputs, such as those from models generating textual or image data, error determination might involve more subjective measures or specialized metrics. For instance, in natural language processing, errors might be assessed based on semantic accuracy or relevance to the context, while in image recognition, errors could be evaluated through pixel-wise comparisons or structural similarity indices.

Once errors are defined and identified, the system aggregates these errors to provide an overall error count. This count is then used to calculate error rates or other performance metrics like accuracy, precision, recall, and F1-score, which provide insights into the model's effectiveness and areas that may require improvement. The analysis might also involve deeper dives into the types of errors, their patterns, and potential causes, which can inform further model tuning, feature engineering, or even adjustments to the model architecture. This thorough evaluation helps ensure that the model is robust, reliable, and aligned with its application goals, thereby supporting better decision-making based on its outputs.

In some embodiments, determining the first difference between the first modified output and the first actual output may comprise the system determining a first performance metric for the first rule engine in the first modified output and determining a second performance metric for the first rule engine in the first actual output. The system may determine the first difference based on the first performance metric and the second performance metric. For example, the system may determine various performance metrics, characteristics, and/or other information related to generating an output.

In some embodiments, determining the first difference between the first modified output and the first actual output the system may determine a first hit rate for the first rule engine in the first actual output and determine a second hit rate for the first rule engine in the first modified output. The system may then determine the first difference based on the first hit rate and the second hit rate.

For example, to determine the difference between a modified output and an actual output of a rule engine, the system assesses how frequently specific rules, components, functions, variables, layers, parameters, etc. are triggered (e.g., referred to as the hit rate). The hit rate effectively quantifies how often a rule leads to an actionable output when the rule engine processes data. This approach provides a clear metric for evaluating the rule engine's responsiveness and adaptability to different data conditions, which in turn, is crucial for identifying any disparities that might influence the engine's performance.

The system computes the hit rate for the rule engine when it processes the actual output. This may be done by analyzing how many times each rule is applied successfully to the input data to generate the output, divided by the total number of inputs processed, expressed as a percentage. This metric, the first hit rate, serves as a baseline for real-world performance. Next, the system calculates the hit rate for the same rule engine but using the first modified output. The modified output is generated under controlled, simulated conditions that might represent new or anticipated future scenarios. This second hit rate reveals how the rule engine performs under different, perhaps more challenging or varied, conditions.

The first difference between the hit rates is then determined by subtracting the actual output's hit rate from the modified output's hit rate. This difference highlights discrepancies in performance, which can indicate areas where the rule engine might require adjustments to better accommodate new types of data or evolving data trends.

At step 512, process 500 (e.g., using one or more components described above) compares the first difference to a first model deployment criterion. For example, the system may compare the first difference to a first model deployment criterion.

At step 514, process 500 (e.g., using one or more components described above) determines whether to deploy a first modified rule engine based on the comparison. For example, the system may determine whether to deploy a first modified rule engine based on comparing the first difference to the first model deployment criterion.

In some embodiments, comparing the first difference to the first model deployment criterion may comprise the system determining a threshold hit rate difference and comparing the threshold hit rate difference to the first difference. For example, to decide whether to release a new model or update the rule engine, the system may set a predefined threshold for acceptable hit rate differences. This threshold represents the maximum allowable variation in performance that the system considers acceptable without compromising the overall efficiency and reliability of the rule engine. The system compares the first difference to this threshold. If the difference exceeds the threshold, it indicates that the current rule engine is potentially underperforming or overperforming under synthetic conditions compared to real conditions. This scenario would typically trigger a review and possibly the deployment of a revised model or rule set designed to bring the synthetic and actual performance closer together, thus ensuring that the rule engine remains effective and relevant.

In some embodiments, the system may determine whether to deploy the first modified rule engine based on comparing the first difference to the first model deployment criterion by replacing the first rule engine with the first modified rule engine to generate a second rule engine and determining a second model deployment criterion. For example, ff the modified rule engine satisfies both the first and second deployment criteria, the system proceeds to fully integrate and deploy this engine, replacing the old one. If it fails to meet either criterion, the modifications may be further refined, or the deployment may be postponed until the necessary standards can be met.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
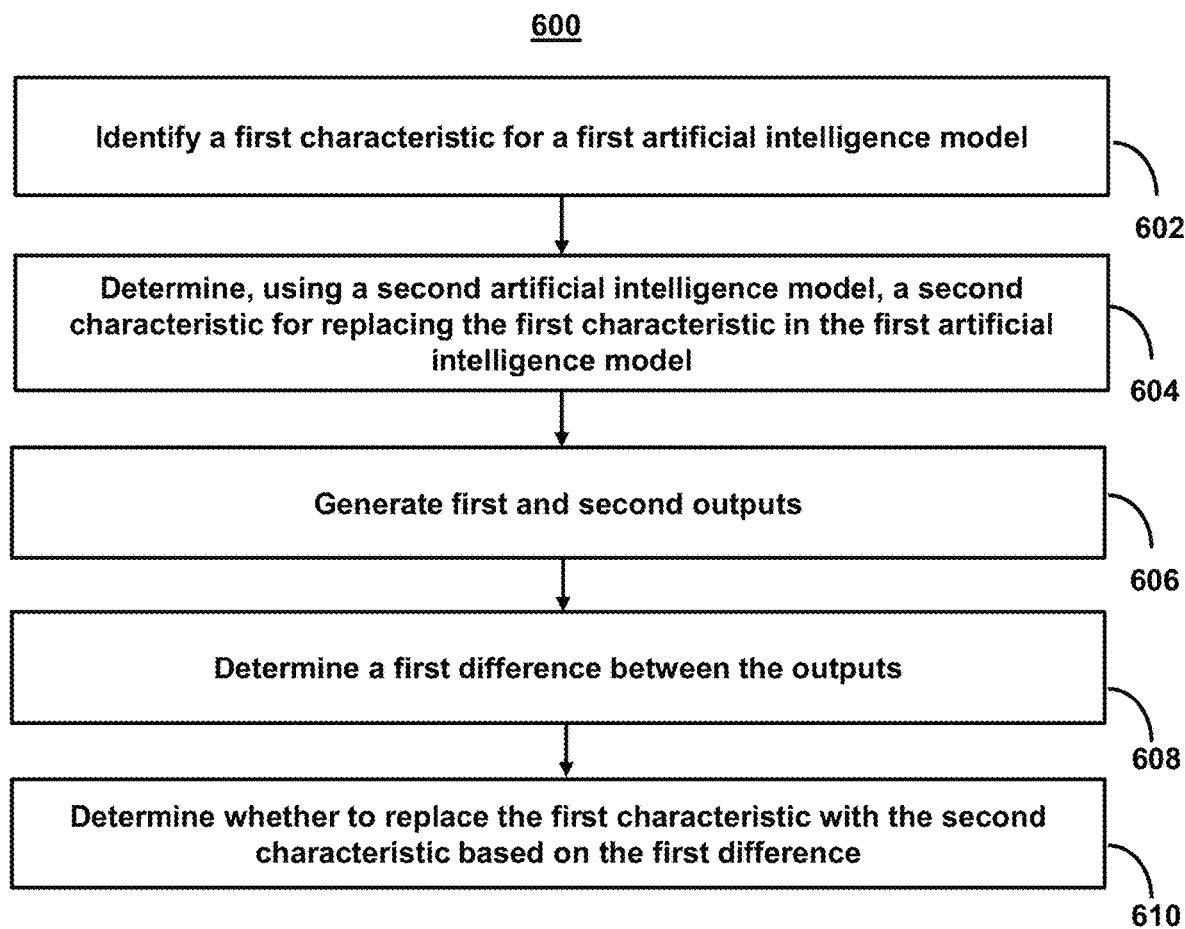
FIG. 6 shows a flowchart of the steps involved in generating code for rule engine, in accordance with one or more embodiments.

FIG. 6 shows a flowchart of the steps involved in generating code for rule engine, in accordance with one or more embodiments. For example, the system may use process 600 (e.g., as implemented on one or more system components described above) in order to generate code for rule engines using artificial intelligence models without requiring training data that is specific to model components and objectives. For example, process 600 may be used to allow a first model to improve a second model.

At step 602, process 600 (e.g., using one or more components described above) identifies a first characteristic for a first artificial intelligence model. For example, a characteristic may indicate what components of a model are used, how efficiently a script performs, and/or other information related to the processing of an input. In some embodiments, the system retrieves a first script for a first artificial intelligence model. For example, the system may retrieve a first script for a first artificial intelligence model, wherein the first script processes historical inputs to a first rule engine to generate historical outputs.

At step 604, process 600 (e.g., using one or more components described above) determines, using a second artificial intelligence model, a second characteristic for replacing the first characteristic in the first artificial intelligence model. In some embodiments, the system determines a first modified script based on the first script. For example, the system may determine, using a second artificial intelligence model, a first modified script based on the first script, wherein the second artificial intelligence model is trained to generate script modifications using language models for a script language of the first script.

At step 606, process 600 (e.g., using one or more components described above) generates first and second outputs. For example, the system may process a first input through the first artificial intelligence model using the first characteristic to generate a first output. The system may also process a second input through the first artificial intelligence model using the second characteristic to generate a second output. In some embodiments, the system may process a first input using the first script (e.g., a first characteristic) to generate a first output. The system may also process the first input using the first modified script (e.g., the second characteristic) to generate a second output.

In some embodiments, the characteristics may comprise (or result in) first and second characteristics. For example, the system may determine a first characteristic of the first script when generating the first output. The system may also determine a second characteristic of the first modified script when generating the second output.

In some embodiments, determining the first characteristic of the first script when generating the first output comprises the system retrieving a component identifier for a first model component in the first artificial intelligence model and determining a first hit rate for the component identifier in the first script. For example, to determine a first characteristic of a first script when generating a first output in an artificial intelligence system, the system may examine how specific components of the model interact with or influence the script. The system may identify a specific component within the model such as a function, a module, and/or any part of the model that plays a significant role in processing the input data. The identifier for this component is retrieved, which uniquely distinguishes it within the model's architecture. This identifier is used for tracking the usage and impact of the component in the script's execution.

Once the component identifier is retrieved, the system then focuses on determining the hit rate of this component within the script. The hit rate is a measure of how frequently the component is utilized during the script's operation, particularly when generating outputs. This can involve analyzing execution logs, data flow analyses, or runtime monitoring to assess how often the component is activated or called upon in the script. The hit rate provides a quantitative measure of the component's involvement and importance in the script's functionality. By evaluating this rate, the system can infer the component's influence on the characteristics of the script, such as its efficiency, reliability, or speed in generating outputs. For example, a high hit rate might indicate that the component is crucial for certain calculations or decision-making processes within the script, impacting how quickly and accurately outputs are generated. Based on the hit rate and the role of the component, the system determines the first characteristic of the script. This characteristic could relate to performance aspects like computational efficiency, throughput, or error rate.

In some embodiments, the system may retrieve an event log for components used by the first artificial intelligence model while processing the first input and compare the event log to the component identifier to determine the first characteristic. For example, the system may track and record the activities of various components within the model as it processes an input. This may be done through logging mechanisms that capture detailed information about the execution of different parts of the model, such as function calls, data manipulations, and interactions between modules. These logs are stored in an event log, which is a chronological record of all actions taken by the model components during the processing of the input. The event log includes timestamps, component identifiers, and descriptions of each event, providing a comprehensive overview of the model's operational dynamics. Simultaneously, the system maintains a list of component identifiers, which are unique identifiers assigned to each component of the model. These identifiers help in tracking specific components' performance and usage within the model. Each entry in the event log associated with a component action includes the component's identifier, making it possible to filter the log for events related to specific parts of the model.

Once the event log is populated with data from a particular input processing session, the system then compares these log entries to the predefined list of component identifiers. For example, the event log may include functions in script that are used, hard-coded number strings, classes, hit rates, numbers of errors, and/or other variables. This comparison is crucial to isolate the actions of specific components of interest. The system filters the event log to extract records that match the component identifiers relevant to the inquiry. With the filtered data, the system then analyzes the frequency, timing, and nature of each component's actions. This analysis helps determine the hit rate, which is the frequency of use of each component during the processing of the input. Additionally, the system can assess other characteristics such as the component's impact on processing times, its involvement in critical tasks, and any errors or exceptions linked to it. Based on this comprehensive analysis, the system determines the characteristics of the model. These characteristics might include performance metrics like efficiency, error rates, throughput, and the overall reliability of specific components. This detailed insight allows for targeted optimizations and adjustments to the model to improve its performance in future processing tasks.

In some embodiments, the system determines differences in a script based on functions in script that are used, hard-coded number strings in the script, classes in the script, hit rates based on the scripts, numbers of errors detected, and/or other variables. For example, the system may compare functions and classes within different versions or instances of the script. The system may check for additions, deletions, or modifications of function definitions and class structures. This analysis helps identify changes in the logic and capabilities of the script, such as new functionalities or removed features. The system might use parsing techniques to extract and compare syntactic elements directly from the script's source code. In another example, hard-coded number strings within the script are identified and compared. These could be constants used for configuration, thresholds, or other specific values that dictate script behavior under certain conditions. Changes in these numbers can significantly alter the script's behavior, so detecting these differences may indicate modifications in script functionality. In another example, the system also examines the hit rates of specific functions or components within the script. Hit rates refer to how frequently certain parts of the script are executed during its runtime. By comparing hit rates between different script versions or under different operating conditions, the system can infer which parts of the script are more active or critical to its overall function. This analysis often involves runtime monitoring or log analysis. The system also examines the hit rates of specific functions or components within the script. Hit rates refer to how frequently certain parts of the script are executed during its runtime. By comparing hit rates between different script versions or under different operating conditions, the system can infer which parts of the script are more active or critical to its overall function. This analysis often involves runtime monitoring or log analysis.

In yet another example, the counts and categorizes errors that occur during the execution of the script. By comparing the number and types of errors between script iterations, the system can gauge the stability and reliability of each version. Increases in error rates can indicate problematic changes, while decreases might suggest improvements. The system may also examine other variables that could impact script performance or behavior. These could include changes in data input formats, external dependencies, or environmental configurations. Each of these factors can affect how the script operates and may be crucial for understanding differences between script versions.

At step 608, process 600 (e.g., using one or more components described above) determines a first difference between the outputs. For example, the system may determine a first difference between the first output and the second output. For example, the system may compare the first difference to a first criterion. In some embodiments, the first criterion indicates a threshold similarity between two outputs required to deploy script modifications.

At step 610, process 600 (e.g., using one or more components described above) determines whether to replace the first characteristic with the second characteristic based on the first difference. For example, the system may determine whether to replace the first characteristic with the second characteristic in the first artificial intelligence model based on the first difference.

In some embodiments, the system determines whether to deploy a first modified rule engine based on the comparison. For example, the system may determine whether to deploy the first modified script in the first artificial intelligence model based on comparing the first difference to the first criterion and comparing the second difference to the second criterion.

In some embodiments, the system determines a second difference between the characteristics. For example, the system may determine a second difference between the first characteristic and the second characteristic. The system may also compare the second difference to a second criterion. For example, the second criterion may indicate a threshold difference between two characteristics required to deploy script modifications.

For example, the system may retrieve a first value corresponding to the threshold similarity. The system may determine whether the first difference exceeds the first value. The system may retrieve a second value corresponding to the threshold difference. The system may determine whether the first difference exceeds the second value. The system may determine to deploy the first modified script in the first artificial intelligence model based on the first difference exceeding the first value and the second difference not exceeding the second value. For example, the system may determine to deploy the first modified script and deploy the first modified script by replacing the first script with the first modified script. Alternatively, the system may determine not to deploy the first modified script in the first artificial intelligence model based on the first difference not exceeding the first value or the second difference exceeding the second value.

In some embodiments, determining whether to deploy a first modified rule engine based on the comparison may comprise selecting one or more models, one or more rule engines, model components, and/or model architectures. For example, the system may use a second model to generate modified script for a first model. The system may then compare the difference in the outputs of the two models to a first criterion (e.g., a guardrail) and the difference in characteristics of the two models when generating the outputs to a second to a second criterion to determine whether to deploy the modification to the first artificial intelligence model. For example, the system may utilize a second artificial intelligence model to refine and enhance a first artificial intelligence model by comparing their outputs and characteristics against predefined criteria. The system may use a second model to generate potential modifications for the first model. These modifications may include selections of various sub-models, rule engines, model components, and/or different model architectures. The system may then evaluate the outputs of both models against a first criterion, such as a performance guardrail, to assess the effectiveness of these modifications. Simultaneously, the system may compare the characteristics of the two models such as their sub-models, rule engines, components, and architectures- against a second criterion. This dual comparison allows the system to determine if the proposed changes not only improve performance but also align with desired characteristics or constraints. Additionally or alternatively, the second comparison may allow the system to generate recommendations for modifications (e.g., selecting one or more models, one or more rule engines, model components, and/or model architectures) for improving an existing model while maintaining (or improving performance). If both criteria are satisfied, (e.g., indicating that the modifications improve output quality and meet the necessary characteristics), the system may determine to deploy the modifications to the first artificial intelligence model. This iterative process ensures continuous optimization and adaptability of the model, enhancing its performance and alignment with specific goals or constraints.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
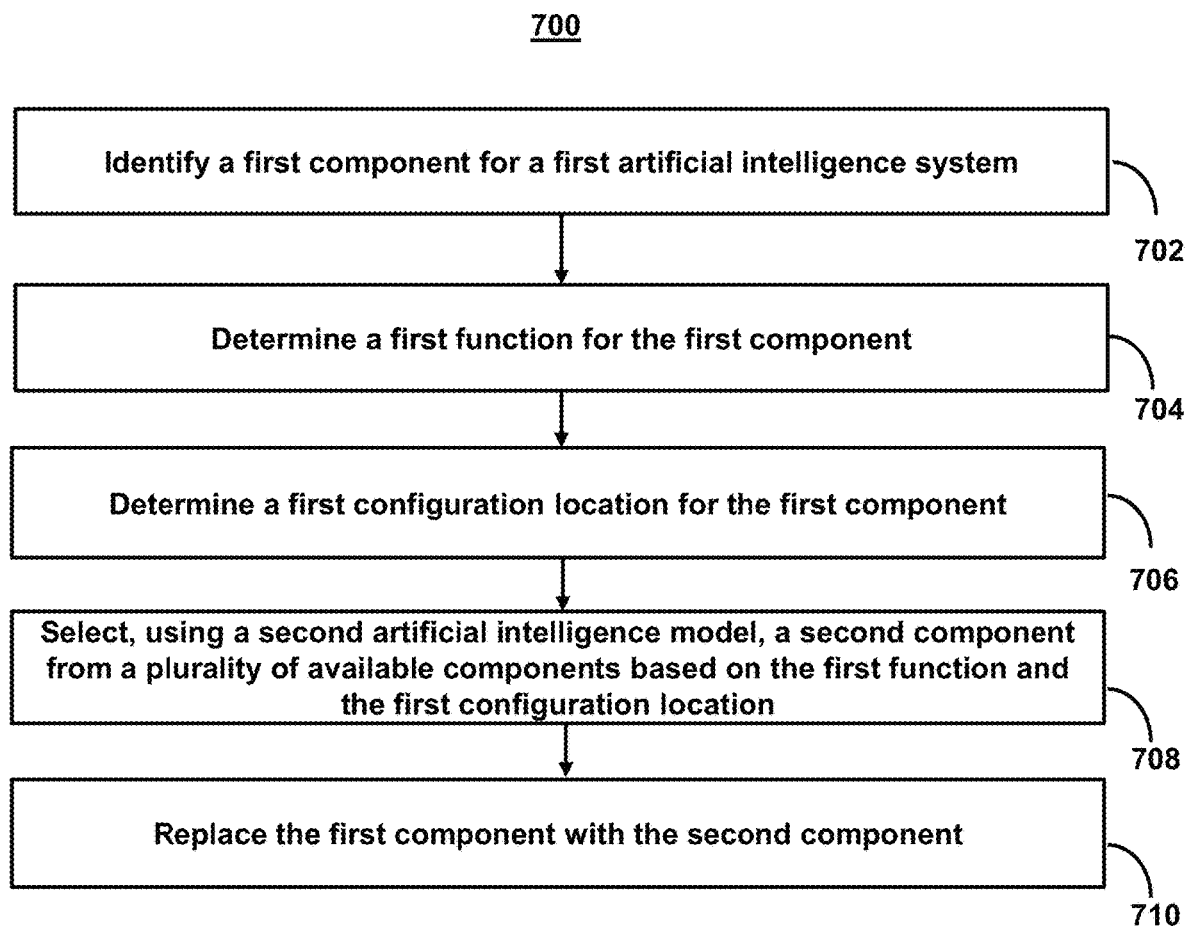
FIG. 7 shows a flowchart of the steps involved in modifying ensembles of artificial intelligence models, in accordance with one or more embodiments.

FIG. 7 shows a flowchart of the steps involved in modifying ensembles of artificial intelligence models, in accordance with one or more embodiments. For example, the system may use process 700 (e.g., as implemented on one or more system components described above) in order to generate code modifying ensembles of artificial intelligence models without requiring training data that is specific to model components and objectives. For example, in one example, process 700 may be used to providing better security. In such cases, the system may train an orchestrator that may determine when and where various components are used. By doing so, the system allows for more robustness against attacks that are targeted at a given objective.

As described herein, a model orchestrator may be a system or framework designed to manage the deployment, coordination, and/or execution of models, components, and/or workflows. The orchestrator may handle critical tasks such as scheduling, monitoring, scaling, and/or updating the system to ensure efficient and smooth operations. The orchestrator may manage deployment of different components and may facilitate this in various environments, whether cloud-based or on-premises, while coordination manages dependencies and interactions between different models or components of a machine learning pipeline. The orchestrator may schedule updates to components to ensure models are current, execute at appropriate times, conserve resource availability, and/or manage workload priorities. For example, scaling may be automatically adjusted based on demand, optimizing performance and cost-efficiency. Monitoring may track the performance and health of deployed models, providing insights and alerts for any arising issues. The orchestrator may also manage the versioning and updating of models, ensuring new versions are deployed smoothly without disrupting existing workflows. Additionally, it allows integration with other systems and tools, such as data pipelines, monitoring services, and user interfaces. By employing a model orchestrator, organizations can streamline their machine learning operations, enhance the reliability and scalability of their models, and reduce the complexity associated with managing multiple models and workflows.

The system may also be hierarchical or non-hierarchical. For example, the components may work in a coordinated, but not a hierarchical way. In such cases, an individual component is not dispositive on an output, but the system may determine an overall rating form the ensemble given its components (and their outputs). For example, the system may coordinate model components in a non-hierarchical manner by utilizing ensemble methods that integrate the outputs of individual models to determine an overall outcome. Each model component operates independently, contributing its analysis or prediction without being dispositive on the system's final decision. The system may employ techniques such as voting, averaging, and/or stacking to combine these outputs effectively. Voting methods aggregate the predictions of all models, using majority or weighted votes to reach a consensus. Averaging methods take the mean or weighted average of the outputs, balancing the influence of each model. Stacking involves training a meta-model to learn the best way to combine the predictions of the base models, optimizing the final output. By treating each model component as an independent contributor and leveraging ensemble techniques, the system can generate a cohesive and robust overall rating, reflecting the collective insights of all its components. This approach ensures that no single model dominates the outcome, promoting a balanced and coordinated assessment from the ensemble.

In some embodiments, the system (e.g., via the orchestrator) may direct each component. For example, the system may assign objectives to various components (e.g., the controller assigns a model or a series of models that look at a particular cyber attack). For example, the system directs each component in an ensemble model to various objectives by strategically assigning specific tasks or focus areas to different models, components, and/or series of models based on their strengths and expertise. For instance, in the context of cybersecurity, the system might designate one model to specialize in detecting phishing attacks, another to monitor for malware, and a third to identify unusual network behavior indicative of a cyber breach. This allocation is typically informed by the unique capabilities and training of each model, ensuring that the most suitable model addresses each specific aspect of the problem. The system integrates these models within a coordinated framework, allowing them to operate concurrently and share their findings. It continuously monitors their performance and adjusts their assignments as needed to adapt to new threats or changing conditions. By distributing the objectives among various models, the system leverages their collective expertise, enabling a comprehensive and multifaceted approach to identifying and mitigating cyber attacks. This targeted delegation of tasks ensures that each model can focus on its designated area, contributing to the overall effectiveness and accuracy of the ensemble's analysis and response.

In some embodiments, components may be run in a predetermined order or series, which may be done with or without an orchestrator. The outputs of the models are then used to determine further models to be used, changes to one or more components, etc. (e.g., accordingly to a predetermined order or dynamically based on the outputs of a previous model). For example, the system can run components of an ensemble model in a predetermined order or series by implementing a structured workflow or pipeline, either with or without an orchestrator. In a predetermined order, each model component is executed sequentially, with the output of one model serving as the input for the next. This step-by-step process ensures that the models are applied in a logical sequence, aligning with the overall analytical strategy. Alternatively, the system can dynamically adjust the sequence based on the outputs of previous models. This adaptive approach involves real-time analysis of model outputs, which informs decisions on subsequent models to deploy or modifications to existing components. For example, if an initial model detects a potential phishing attempt, the system may then activate additional models focused on analyzing email metadata or network traffic for further investigation. This dynamic sequencing enables the system to respond flexibly to varying conditions and findings, optimizing the analysis process. Whether following a fixed order or adapting dynamically, the system can effectively manage the workflow to ensure comprehensive and accurate outcomes, utilizing the strengths of each model component and making necessary adjustments based on real-time insights.

At step 702, process 700 (e.g., using one or more components described above) identifies a first component for a first artificial intelligence system. For example, the system (e.g., an orchestrator for the system) may identify a first component for a first artificial intelligence system, wherein the first artificial intelligence system comprises a plurality of components, and wherein the first artificial intelligence system comprises a first model architecture.

A component in the first artificial intelligence system may refer to an individual module or element that performs a specific function or set of functions within the larger artificial intelligence framework. Each component is designed to handle a particular aspect of data processing, analysis, or decision-making. For example, in an AI system designed for image recognition, one component might be responsible for preprocessing the raw image data, such as resizing and normalizing the images. Another component could be a convolutional neural network (CNN) that extracts features from the images, identifying edges, textures, and other relevant patterns. Additionally, there might be components for classification, which take the extracted features and categorize the images into predefined classes. Components can also include decision-making algorithms, such as support vector machines (SVMs) or decision trees, which further refine the predictions or classifications made by the system. By dividing the artificial intelligence system into distinct components, each specializing in different tasks, the system can achieve greater efficiency, flexibility, and accuracy. This modular approach allows for easier updates and improvements, as individual components can be modified or replaced without overhauling the entire system.

In some embodiments, the first component comprises an architecture component, and wherein identifying the first function for the first ensemble component in the first artificial intelligence system by determining a model layer corresponding to the architecture component; and identifying the first function based on the layer.

For example, an architecture component in an artificial intelligence system may refer to a fundamental building block that defines the structure and behavior of the system. These components encompass the various layers, modules, and connections that form the overall architecture, enabling the system to process inputs, perform computations, and generate outputs. For instance, in a deep learning model, architecture components include input layers that receive raw data, hidden layers that perform transformations and feature extraction, and output layers that produce the final predictions. Each layer consists of nodes or neurons, which are interconnected and apply specific mathematical operations, such as activation functions, to transform the data as it flows through the network. Additionally, architecture components can include mechanisms for data flow control, such as attention mechanisms in transformer models, which allow the system to focus on relevant parts of the input data. Other components might involve recurrent structures for handling sequential data, as seen in recurrent neural networks (RNNs), or convolutional layers in convolutional neural networks (CNNs) for spatial data processing. The design and configuration of these architecture components are crucial, as they determine the model's ability to learn patterns, generalize from data, and perform effectively on specific tasks. By carefully designing and integrating these components, a system can achieve high performance and adaptability, catering to the unique requirements of various applications.

In some embodiments, the system determines a model layer corresponding to the architecture component through a combination of design principles, empirical testing, and domain-specific considerations. The process may begin with defining the problem and understanding the nature of the data. Based on this initial analysis, the system may choose an appropriate model architecture, such as a convolutional neural network (CNN) for image processing or a recurrent neural network (RNN) for sequence data. Each type of architecture has predefined components or layers tailored to handle specific data characteristics.

For example, in a CNN, the first layers are usually convolutional layers that detect local patterns like edges and textures in images. These are followed by pooling layers that reduce the spatial dimensions and computational load while retaining essential features. In RNNs, the layers are designed to handle temporal dependencies in sequential data, with recurrent layers that maintain a hidden state to capture information over time.

The specific number and type of layers are often determined through a combination of theoretical knowledge and experimental validation. The system may start with a standard architecture and then iteratively adjust the number of layers, the types of activation functions, and the connectivity patterns based on performance metrics such as accuracy, loss, and computational efficiency. Hyperparameter tuning techniques, such as grid search or random search, can also be used to find the optimal layer configuration.

In some embodiments, determining the model layer corresponding to the architecture component comprises the system determining an activation function for the architecture component and determining the model layer based on the activation function. For example, the system determines the model layer corresponding to the architecture component by first identifying the activation function associated with that component. The activation function is a critical element in neural network layers, influencing how the layer processes input data and contributes to the network's overall learning process. Common activation functions include ReLU (Rectified Linear Unit), Sigmoid, Tanh, and Softmax, each serving different purposes and being suitable for different types of layers.

To begin, the system identifies the specific activation function used by the architecture component. This involves analyzing the component's configuration or predefined settings within the model architecture. For instance, a ReLU activation function is typically used in hidden layers to introduce non-linearity and help the network learn complex patterns, while a Softmax activation function is often used in the output layer of a classification network to convert logits into probability distributions.

Once the activation function is determined, the system utilizes this information to infer the type of model layer that corresponds to the architecture component. The activation function provides significant clues about the layer's role and placement within the network. For example, if the activation function is ReLU, the corresponding layer is likely a hidden layer focused on feature extraction and transformation. If the activation function is Softmax, the corresponding layer is likely the final output layer used for classification tasks.

The system then matches the determined activation function to the appropriate layer type and integrates this layer into the overall model architecture. This involves setting up the layer with the correct parameters, such as the number of neurons, input and output dimensions, and ensuring that the activation function is properly configured to influence the layer's operations as intended.

By determining the activation function and using it as a basis for identifying the corresponding model layer, the system ensures that the architecture component is accurately represented within the model. This systematic approach allows for the precise placement and configuration of layers, ensuring that each component functions optimally within the neural network, contributing to the model's performance and effectiveness in learning and making predictions.

At step 704, process 700 (e.g., using one or more components described above) determines a first function for the first component. For example, the system may determine a first function for the first component in the first artificial intelligence system.

A first function for a first ensemble component in a first artificial intelligence model may involve performing a specific task that contributes to the overall decision-making process of the ensemble. This function can vary depending on the model's application but often includes tasks such as data preprocessing, feature extraction, or initial predictions. For instance, in a machine learning ensemble used for image classification, the first component might be a convolutional neural network (CNN) that processes raw image data to extract features like edges, textures, and shapes. These extracted features are then passed to subsequent components of the ensemble for further analysis and classification. By dividing tasks among different components, each specializing in a particular function, the ensemble model can achieve higher accuracy and robustness compared to individual models. This division of labor allows the ensemble to leverage the strengths of various algorithms, combining their outputs to produce a final, more accurate prediction or decision.

In some embodiments, the first component comprises an ensemble component, and identifying the first function for the first ensemble component in the first artificial intelligence comprises the system determining a plurality of ensemble models in the first artificial intelligence system, determining an ensemble function for a first ensemble model in the plurality of ensemble models, and identifying the first function based on the ensemble function. For example, in some embodiments, the system determines an ensemble function for a first ensemble model in a plurality of ensemble models by evaluating the specific requirements of the task, the characteristics of the available data, and the strengths and weaknesses of individual models. The process typically begins with a thorough analysis of the problem domain to identify key performance metrics and objectives, such as accuracy, precision, recall, or robustness to overfitting. Based on this analysis, the system selects a diverse set of base models that are likely to perform well on different aspects of the task. For example, in a classification problem, the system might choose decision trees for their interpretability, support vector machines for their effectiveness with small datasets, and neural networks for their ability to capture complex patterns.

Once the base models are selected, the system determines the ensemble function, which defines how the outputs of these models will be combined to produce a final prediction. Common ensemble functions include averaging, voting, and stacking. Averaging is often used in regression tasks, where the final prediction is the mean of the individual model predictions, helping to smooth out errors. Voting, on the other hand, is frequently employed in classification tasks, where each model votes on the predicted class, and the class with the majority of votes is chosen, leveraging the principle of majority rule to improve accuracy.

In more complex scenarios, the system may employ stacking, where a meta-model is trained to combine the predictions of the base models. The meta-model learns to weigh the contributions of each base model, optimizing the final prediction based on their combined outputs. This method can capture intricate relationships between the predictions of different models and typically leads to superior performance.

The system iteratively tests and validates the ensemble function using cross-validation or hold-out validation to ensure that it generalizes well to unseen data. By carefully selecting and combining base models and ensemble functions, the system can enhance overall performance, making the first ensemble model a robust and integral part of the plurality of ensemble models.

In some embodiments, the system determines the ensemble function for the first ensemble model in the plurality of ensemble models by determining an ensemble output from the first ensemble model and determining the first ensemble function based on the ensemble output. For example, the system determines the ensemble function for the first ensemble model in a plurality of ensemble models through a methodical process that involves analyzing the ensemble output and selecting the function that best aggregates the individual model predictions. Initially, the system gathers the predictions from all individual models within the first ensemble model. These predictions can be in the form of class probabilities, regression values, or other relevant outputs depending on the task at hand.

Next, the system evaluates the ensemble output, which is the combined result derived from these individual model predictions. The evaluation involves assessing how well different ensemble functions, such as voting, averaging, weighted averaging, or more sophisticated techniques like stacking, perform in aggregating these predictions. For example, in a classification task, a majority voting mechanism might be tested, where the class predicted by the majority of models is chosen as the final output. In regression tasks, simple averaging or weighted averaging might be evaluated, where the final prediction is the mean or a weighted mean of the individual predictions.

The system systematically applies various ensemble functions to the individual model outputs and measures the performance of each function using appropriate metrics such as accuracy, precision, recall, or mean squared error. This involves cross-validation or holdout validation to ensure that the performance evaluation is robust and generalizes well to unseen data.

Based on the performance assessment, the system determines the first ensemble function that yields the best ensemble output. This function is then selected as the optimal method for combining the predictions of the individual models within the first ensemble model. The chosen ensemble function ensures that the aggregated output is accurate and reliable, leveraging the strengths of the individual models while mitigating their weaknesses.

By analyzing the ensemble output and rigorously evaluating different ensemble functions, the system identifies the most effective method for combining individual predictions. This process results in a robust ensemble function that enhances the overall performance of the first ensemble model, contributing to the effectiveness and reliability of the AI system as a whole.

At step 706, process 700 (e.g., using one or more components described above) determines a first configuration location for the first component. For example, the system may determine a first function for the first component in the first artificial intelligence system.

A configuration location for a component, whether it is an ensemble component or an architecture component, in a model architecture refers to the specific placement and/or setting within the overall structure of the artificial intelligence system where the component is integrated and utilized. This location may be defined by the component's role and interaction within the model, including its connections to other components, its input and output data pathways, and its operational parameters. For an ensemble component, the configuration location may detail how individual models within the ensemble are combined, the voting or averaging mechanisms used, and/or the sequence in which predictions are aggregated. For an architecture component, such as a layer in a neural network, the configuration location specifies its position within the layer stack, the type of layer (e.g., convolutional, fully connected, recurrent), the activation functions employed, and the hyperparameters that govern its behavior (e.g., number of neurons, kernel size, stride). Properly defining the configuration location ensures that each component functions cohesively within the larger model, contributing to the model's overall performance and effectiveness.

In some embodiments, determining the first configuration location for the first component in the first model architecture comprises the system determining a first setting for the first component and determining the first configuration location based on the first setting. For example, the system may determine the setting for a component in the model architecture by analyzing both the component's characteristics and the specific requirements of the model. This process involves several steps. Initially, the system assesses the role of the component within the architecture, understanding the data it will handle, the transformations it will perform, and the interactions it will have with other components. Based on this analysis, the system identifies suitable hyperparameters and operational settings for the component, such as learning rates, the number of layers, activation functions, or filter sizes, depending on the type of component.

The system then employs optimization techniques to fine-tune these settings. This may involve grid search, random search, or more advanced methods like Bayesian optimization or evolutionary algorithms. During optimization, the system iteratively adjusts the settings and evaluates the performance of the model through metrics like accuracy, loss, or computational efficiency. Cross-validation is often used to ensure that the settings provide robust performance across different subsets of the data. Additionally, the system may leverage historical data and knowledge from previous models to inform its choices, applying transfer learning or heuristic rules derived from past successes.

In some cases, the system can use machine learning itself to predict optimal settings, training a meta-model on a dataset of component configurations and their associated performance outcomes. Once the best settings are determined, they are integrated into the model architecture, ensuring that the component operates effectively within the overall system, thereby enhancing the model's accuracy, efficiency, and generalization capabilities.

In some embodiments, determining the first configuration location for the first component in the first model architecture comprises the system determining a first setting for the first component and determining the first configuration location based on the first setting. For example, the system may determine the setting for a component in the model architecture by analyzing both the component's characteristics and the specific requirements of the model. This process involves several steps. Initially, the system assesses the role of the component within the architecture, understanding the data it will handle, the transformations it will perform, and the interactions it will have with other components. Based on this analysis, the system identifies suitable hyperparameters and operational settings for the component, such as learning rates, the number of layers, activation functions, or filter sizes, depending on the type of component.

The system then employs optimization techniques to fine-tune these settings. This may involve grid search, random search, or more advanced methods like Bayesian optimization or evolutionary algorithms. During optimization, the system iteratively adjusts the settings and evaluates the performance of the model through metrics like accuracy, loss, or computational efficiency. Cross-validation is often used to ensure that the settings provide robust performance across different subsets of the data. Additionally, the system may leverage historical data and knowledge from previous models to inform its choices, applying transfer learning or heuristic rules derived from past successes.

In some cases, the system can use machine learning itself to predict optimal settings, training a meta-model on a dataset of component configurations and their associated performance outcomes. Once the best settings are determined, they are integrated into the model architecture, ensuring that the component operates effectively within the overall system, thereby enhancing the model's accuracy, efficiency, and generalization capabilities.

In some embodiments, determining the first setting for the first component comprises the system determining a learning rate for the first component and determining the first setting based on the learning rate. For example, the system evaluates the first component's role and context within the model to understand its specific requirements. The learning rate, a crucial hyperparameter, dictates how quickly or slowly the model adjusts its weights in response to the calculated error during training.

To determine an appropriate learning rate, the system may perform a learning rate search, where it experiments with different values to observe their effects on the model's training dynamics. This can be done using techniques such as learning rate scheduling, where the rate is systematically varied during the training process, or employing methods like grid search or random search to identify an optimal range. During this search, the system monitors key performance metrics, such as the loss function, convergence speed, and overall model accuracy, to assess the impact of each learning rate value.

Once an optimal learning rate is identified, the system uses this information to establish the first setting for the component. This setting not only includes the determined learning rate but may also incorporate related configurations that complement the learning rate, such as batch size, momentum, and weight initialization strategies. The system ensures that these settings are harmonized to achieve stable and efficient training, preventing issues like oscillation or slow convergence.

By basing the first setting on the learning rate and its associated parameters, the system fine-tunes the component's configuration to enhance its performance within the model. This approach ensures that the component operates effectively, contributing to the overall accuracy, efficiency, and robustness of the system.

In some embodiments, the system determines the first setting for the first component comprises the system determining a first hyperparameter for the first component and determining the first setting based on the first hyperparameter. For example, the system determines a first setting for a first component by first identifying a key hyperparameter that significantly influences the component's performance and behavior. Hyperparameters are configuration variables external to the model that guide the learning process, and they need to be set before training begins. For the first component, the system selects a critical hyperparameter—such as the learning rate for a neural network layer, the number of trees in a random forest, or the regularization parameter in a support vector machine—based on the component's nature and role within the model.

To determine the optimal value for this hyperparameter, the system employs a combination of techniques. It may use grid search, where it evaluates a predefined set of hyperparameter values, or random search, where it samples hyperparameter values randomly within a specified range. More advanced methods, such as Bayesian optimization or hyperband, can also be utilized to find the most suitable hyperparameter value efficiently. During this process, the system trains the component multiple times, each with different values of the selected hyperparameter, and evaluates the performance using metrics like accuracy, loss, or validation error.

After identifying the optimal value for the first hyperparameter through this iterative process, the system establishes the first setting for the component based on this value. This setting includes the selected hyperparameter value and potentially other related configurations that complement it, ensuring a balanced and effective configuration. For example, if the chosen hyperparameter is the learning rate, the system might also adjust other settings such as batch size and momentum to harmonize the training process.

By focusing on a critical hyperparameter and fine-tuning it through systematic experimentation and evaluation, the system determines a first setting that optimizes the performance of the first component. This meticulous approach ensures that the component is configured to function at its best, contributing positively to the overall effectiveness and efficiency of the model.

In some embodiments, determining the first setting for the first component comprises the system determining a first filter size for the first component and determining the first setting based on the first filter size. For example, the system determines a first setting for a first component, such as a convolutional layer in a neural network, by initially identifying the appropriate filter size for the component. The filter size, also known as the kernel size, is a crucial hyperparameter that defines the dimensions of the filter applied to the input data, affecting the feature extraction process, the receptive field, and ultimately the model's performance.

To determine the optimal filter size, the system engages in an exploration process that may involve empirical testing and theoretical considerations. The system evaluates different filter sizes by training the model with various configurations and observing their impact on performance metrics such as accuracy, loss, and convergence speed. Smaller filter sizes may capture finer details, while larger filter sizes can capture more global patterns, so the system balances these trade-offs based on the specific application and dataset.

During this exploration, the system might use techniques like cross-validation to ensure robust evaluation and prevent overfitting. By analyzing the results, the system identifies the filter size that provides the best performance, ensuring it captures the most relevant features from the input data while maintaining computational efficiency.

Once the optimal filter size is determined, the system sets this as the first setting for the component. This setting includes the chosen filter size and any related parameters, such as stride and padding, that complement the filter size and enhance the layer's performance. For instance, if the selected filter size is 3×3, the system might also adjust the stride to 1 and use appropriate padding to preserve the spatial dimensions of the input data.

By basing the first setting on the determined filter size, the system ensures that the convolutional layer is configured to effectively extract meaningful features, contributing to the overall performance and accuracy of the AI model. This systematic approach allows the component to operate optimally within the model, leveraging the chosen filter size to enhance the model's capability in tasks such as image recognition, object detection, or other relevant applications.

In some embodiments, determining the first configuration location for the first component in the first model architecture comprises the system determining a first placement for the first component and determining the first configuration location based on the first placement. For example, the system may determine the placement for a component in the model architecture through a structured analysis of the component's functionality and the overall design goals of the model. This process begins with understanding the specific role the component is intended to play, such as feature extraction, dimensionality reduction, or classification. The system assesses how the component's capabilities align with the stages of the data processing pipeline, from input handling and preprocessing to intermediate transformations and final output generation.

Based on this understanding, the system evaluates the dependencies and interactions between components. It considers how data flows through the architecture, ensuring that the component receives the appropriate inputs and that its outputs are correctly utilized by subsequent components. For example, in a neural network, a convolutional layer might be placed early in the architecture to perform feature extraction, followed by pooling layers to reduce dimensionality, and fully connected layers towards the end for classification.

Optimization techniques, such as trial-and-error experimentation, grid search, or more sophisticated methods like reinforcement learning, may be employed to refine the placement of components. These techniques involve iterative testing of different configurations and evaluating the model's performance to identify the most effective arrangement. The system also leverages design principles and heuristics derived from domain knowledge and prior experience with similar models.

Moreover, the system might use automated architecture search methods, such as Neural Architecture Search (NAS), to explore a vast space of potential placements and configurations, selecting the optimal architecture based on predefined performance metrics. Ultimately, the goal is to ensure that each component is strategically positioned to maximize the model's accuracy, efficiency, and generalization capabilities, leading to a cohesive and robust AI system.

At step 708, process 700 (e.g., using one or more components described above) selects, using a second artificial intelligence model, a second component from a plurality of available components based on the first function and the first configuration location. For example, the system may select, using a second artificial intelligence model, a second component from a plurality of available components based on the first function and the first configuration location, wherein the second artificial intelligence model is trained to select substitute components based on matching characteristics of known components and known artificial intelligence systems.

The system may be designed to select substitute components for the artificial intelligence system, which comprises a plurality of components, operates by leveraging a database of known components and established artificial intelligence systems. The selection process involves identifying and matching the characteristics of the existing components with those of potential substitutes. This is achieved by analyzing parameters such as functionality, performance metrics, compatibility, and cost. The system employs algorithms that assess these characteristics and rank potential substitutes based on how closely they align with the requirements of the original components. Furthermore, the system can utilize machine learning models trained on historical data of component replacements to predict the most suitable substitutes. This ensures that the selected components not only match the technical specifications but also maintain the overall efficiency and effectiveness of the artificial intelligence system. By continuously updating its database with new components and systems, the selection system remains adaptive and capable of recommending the most current and optimal substitutes.

The characteristics of a component within a model architecture, component and/or artificial intelligence system may encompass various attributes that define its functionality, performance, and/or compatibility with other components. These characteristics include the component's type, such as whether it is a neural network layer, an ensemble method, or a preprocessing module. Each type has specific properties, such as the number of neurons in a neural network layer, the voting mechanism in an ensemble method, or the transformation applied by a preprocessing module. Additionally, the component's hyperparameters, such as learning rates, activation functions, and filter sizes, are characteristics that influence its behavior and effectiveness.

Performance metrics, like accuracy, precision, recall, and computational efficiency, are also characteristics that determine how well the component contributes to the overall model. The input and output data formats and dimensions are essential for ensuring compatibility with other components, facilitating smooth data flow through the architecture. Furthermore, the component's scalability, robustness to noise, and ability to generalize from training data to unseen data are vital for maintaining the model's reliability and adaptability in various contexts.

Interdependencies with other components, such as how a layer interacts with preceding and succeeding layers or how an ensemble method combines predictions from multiple models, are also important. These characteristics collectively define the role and contribution of a component within an artificial intelligence model, guiding the selection, configuration, and optimization processes to ensure cohesive and effective model performance.

At step 710, process 700 (e.g., using one or more components described above) replaces the first component with the second component. For example, the system may modify the first artificial intelligence system by replacing the first component with the second component.

For example, after the system identifies the first component to be replaced, understanding its role, connections, and/or contributions to the overall model, the system may modify. The second component, selected based on its compatibility and enhanced characteristics, is then assessed to ensure it can fulfill the same function or offer improved performance without disrupting the existing architecture.

The replacement process begins by disconnecting the first component from the model, carefully preserving the input and output interfaces to maintain data flow integrity. The system maps the input and output specifications of the second component to match those of the first component, ensuring compatibility in terms of data format, dimensions, and processing requirements. This mapping may involve adjusting parameters or preprocessing steps to align with the new component's characteristics.

The second component may be integrated into the model at the exact location of the first component. The system conducts thorough testing and validation to verify that the new component functions correctly within the existing architecture. This includes running the modified model on a validation dataset to compare its performance against the original model, ensuring that the replacement has not introduced errors or degraded performance. Optimization techniques, such as fine-tuning hyperparameters and retraining the model, may be applied to maximize the new component's effectiveness.

Throughout the process, the system maintains detailed documentation of the changes made, including the rationale for the replacement, the characteristics of the new component, and the outcomes of the validation tests. By following this methodical approach, the system ensures that the transition from the first component to the second component is smooth, maintaining or enhancing the overall performance and reliability of the system.

In some embodiments, modifying the first artificial intelligence system by replacing the first component with the second component comprises the system determining an input interface for the first component, determining an output interface for the first component, preserving the input interface and the output interface, and disconnecting the first component from the first artificial intelligence system. For example, the system determines the input interface for the first component, identifying how data enters the component, including the format, dimensions, and preprocessing requirements. Simultaneously, the system determines the output interface for the first component, understanding how data exits the component, including the resultant format and dimensions.

To preserve the input and output interfaces, the system maps these specifications to ensure that the new component can seamlessly integrate into the existing architecture. This involves analyzing the second component's input and output requirements and making necessary adjustments, such as reformatting data or modifying preprocessing steps, to align with the preserved interfaces. The goal is to maintain the same data flow and structural integrity so that the rest of the system remains unaffected by the replacement.

Once the mappings are established, the system carefully disconnects the first component from the system. This disconnection involves removing the first component while keeping the input and output pathways intact. The preserved interfaces are then connected to the second component, ensuring that it receives the correct input data and produces the expected output.

To validate the replacement, the system conducts a series of tests, running the modified system through validation datasets to ensure that the new component functions correctly within the established architecture. Performance metrics are compared to ensure that the new component meets or exceeds the original component's performance.

In some embodiments, modifying the first artificial intelligence system by replacing the first component with the second component comprises the system determining a first data format for the first component, determining a second data format for the second component, determining a format difference between the first data format and the second data format, and determining a compatibility of the second data format based on determining the format difference. For example, the system determines the first data format for the first component, analyzing how data is structured, including its type, dimensions, and any preprocessing applied. This involves understanding the specific characteristics of the data that the first component expects to receive and produce.

Next, the system determines the second data format for the second component, assessing how this component handles data input and output. This includes a detailed examination of the data structure, types, and any necessary preprocessing steps required for the second component to function optimally.

Once both data formats are established, the system determines the format difference between the first data format and the second data format. This involves comparing the data structures, types, dimensions, and any preprocessing steps to identify discrepancies. The system meticulously analyzes aspects such as data type mismatches (e.g., integers vs. floats), dimensional differences (e.g., 2D arrays vs. 3D arrays), and any required normalization or scaling differences.

To determine the compatibility of the second data format, the system evaluates whether the second component can handle the data as currently formatted or if adjustments are necessary. This evaluation includes checking if the second component can directly process the data or if intermediate steps, such as data transformation or additional preprocessing, are required to bridge the format difference. The system might use automated tools or algorithms to suggest or implement these adjustments, ensuring that data flows correctly through the new component.

After ensuring compatibility, the system proceeds to replace the first component with the second component. This involves disconnecting the first component while preserving the data pathways and integrating the second component with the necessary adjustments applied to the data formats. The system then conducts validation tests to ensure that the new component operates correctly within the system, producing the expected outputs without errors or performance degradation.

In some embodiments, modifying the first artificial intelligence system by replacing the first component with the second component comprises the system determining a first data dimension for the first component, determining a second data dimension for the second component, and converting the first data dimension to the second data dimension. For example, the system determines the first data format for the first component by analyzing the structure, type, dimensions, and any preprocessing applied to the data it receives and produces. This involves a comprehensive understanding of how data is presented to and output from the first component, including specifics such as data types (e.g., integers, floats), array shapes (e.g., 2D matrices, 3D tensors), and any normalization or encoding methods used.

Next, the system determines the second data format for the second component. This step involves a similar analysis to understand how the second component expects to receive and output data. The system examines the data structure, types, dimensions, and any preprocessing requirements specific to the second component.

Once both data formats are established, the system determines the format difference between the first data format and the second data format. This comparison highlights discrepancies such as mismatches in data types (e.g., if the first component outputs integers while the second expects floats), dimensional differences (e.g., 2D arrays versus 3D tensors), or differences in preprocessing steps (e.g., scaling, normalization).

To determine the compatibility of the second data format, the system evaluates whether the second component can directly process the data as formatted by the first component or if transformations are necessary. This involves assessing if the second component can handle the data format or if intermediate steps like data conversion, reshaping, or additional preprocessing are required to bridge the format differences. The system may use algorithms or predefined rules to suggest or implement these adjustments, ensuring that data flows correctly from the previous components through to the new component.

After confirming compatibility, the system proceeds with the replacement by disconnecting the first component from the system and integrating the second component. This integration involves applying any necessary data transformations to ensure that the input data conforms to the second component's expected format and that the output data can be correctly utilized by subsequent components in the system.

Finally, the system conducts validation tests to ensure that the modified system, with the second component in place, operates correctly and maintains or improves performance. By following this detailed process, the system ensures that the second component is compatible with the existing data formats and that the system continues to function effectively and efficiently after the replacement.

In some embodiments, modifying the first artificial intelligence system by replacing the first component with the second component comprises the system determining a first output specification for the first component, determining a second output specification for the second component, and mapping the second output specification to match the first output specification. For example, the system determines the first output specification for the first component, which involves analyzing how the first component processes and presents its output data. This includes examining the data format, type, structure, dimensions, and any specific post-processing applied to the output. For instance, the system would document whether the output is a 2D array, a probability distribution, or a set of class labels, along with any associated metadata.

Next, the system determines the second output specification for the second component. This involves a similar analysis to understand the format, type, structure, dimensions, and post-processing of the data that the second component produces. By identifying these details, the system gains a clear understanding of how the second component's output is structured and how it might differ from the first component's output.

Once both output specifications are established, the system proceeds to map the second output specification to match the first output specification. This mapping process involves aligning the data formats, structures, and dimensions of the second component's output to ensure compatibility with the existing system. If there are discrepancies, the system may need to apply transformations or adjustments. For example, if the second component outputs a 3D tensor but the first component's output was a 2D matrix, the system would implement the necessary reshaping or dimensionality reduction techniques to match the specifications.

This mapping also includes ensuring that the data types and any post-processing requirements, such as scaling or normalization, are consistent with the original specifications. The system may employ data transformation tools, algorithms, or custom scripts to achieve the required alignment.

After mapping the second output specification to match the first output specification, the system integrates the second component into the system. This integration involves disconnecting the first component and connecting the second component in such a way that its output seamlessly feeds into the subsequent components of the system.

Finally, the system conducts validation tests to ensure that the modified system operates correctly with the second component in place. These tests verify that the output produced by the second component, after mapping, meets the expected format and performance criteria set by the original system. By following this meticulous process, the system ensures that the second component integrates smoothly, maintaining the functionality and performance of the system.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Figure 8:
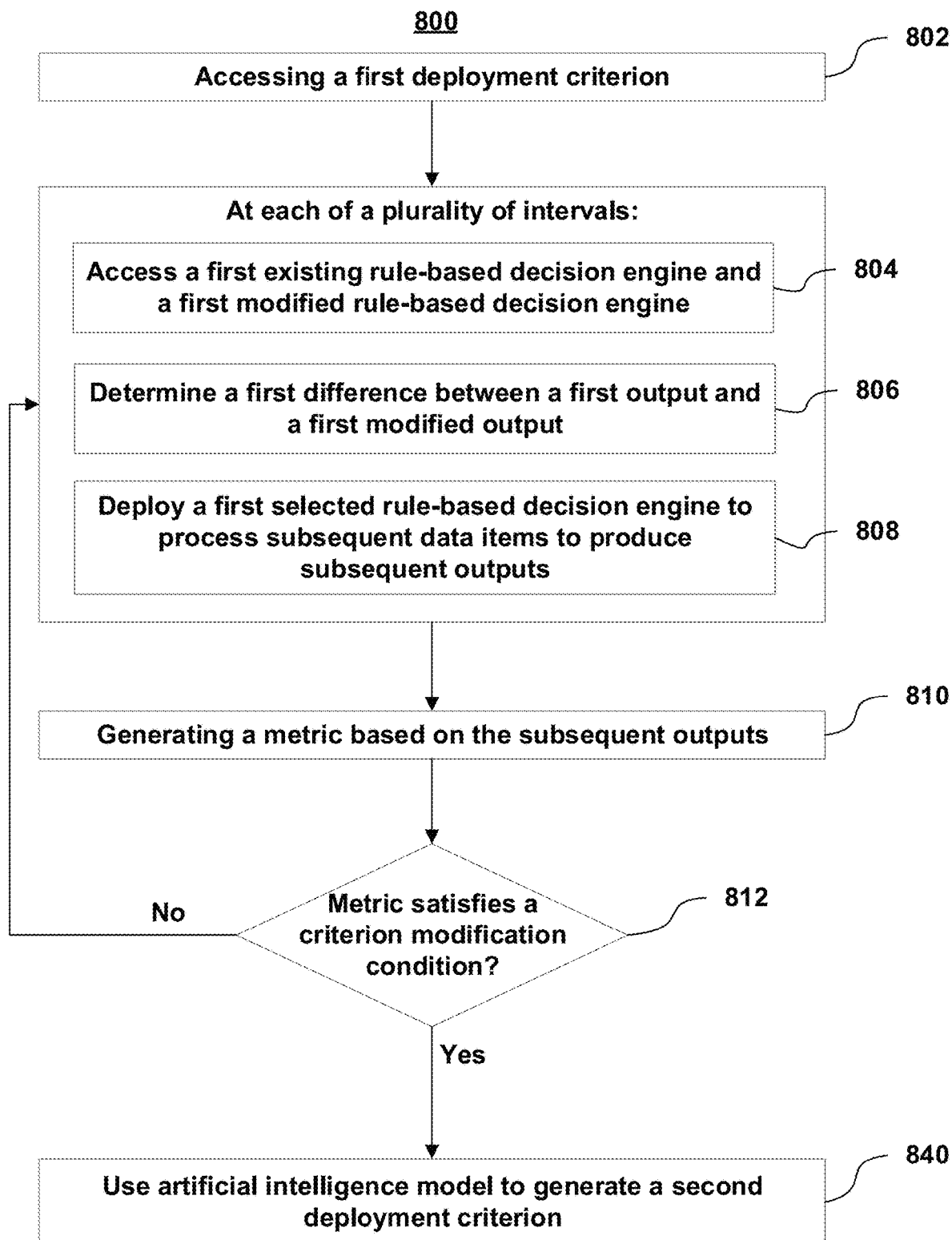
FIG. 8 shows a flowchart of steps involved in updating rule engines during software development using variable deployment criteria, in accordance with one or more embodiments.

FIG. 8 shows a flowchart of steps involved in updating rule engines during software development using variable deployment criteria, in accordance with one or more embodiments. For example, the system may use process 800 (e.g., as implemented on one or more system components described above) in order to update decision engines using generated proxy models that mimic formats and structures of existing rule engines, as well as to update the deployment criteria by which the decision engines are updated.

At operation 802, process 800 (e.g., using one or more components described above) accesses a first deployment criterion. At each of a plurality of intervals, process 800 uses the first deployment criterion to select a decision engine that is to be deployed to process data and make decisions based on the data.

For example, at operation 804, process 800 accesses a first existing rule-based decision engine and a first modified rule-based decision engine. The first modified rule-based decision engine includes rule data that was generated by an artificial intelligence model based on the first existing rule-based decision engine, such as to modify an existing rule in the first existing rule-based decision engine, to add a rule to the first existing rule-based decision engine, or to remove a rule from the first existing rule-based decision engine. The rule data is data that is actionable by a computer system to process data and compute a decision that satisfies one or more conditions within the rule data.

At operation 806, process 800 determines a first difference between a first output and a first modified output, where the first existing rule-based decision engine processes a first data item to generate the first output, and where the first modified rule-based decision engine processes the first data item with the rule data to generate the first modified output.

At operation 808, process 800 deploys a first selected rule-based decision engine to process subsequent data items to produce subsequent outputs. The first selected rule-based decision engine can be selected for deployment between the first existing rule-based decision engine and the first modified rule-based decision engine. For example, the first existing rule-based decision engine is deployed when the first difference does not satisfy the first deployment criterion, and the first modified rule-based decision engine when the first difference satisfies the first deployment criterion.

At operation 810, process 800 (e.g., using one or more components described above) generates a metric based on the subsequent outputs generated by the deployed decision engine. The metric can be computed based on a comparison of a first set of outputs from the first existing rule-based decision engine and a second set of outputs from the first modified rule-based decision engine. Alternatively, the metric can be computed based on the outputs from the deployed decision engine itself or actions taken based on the outputs from the deployed decision engine. For example, process 800 can generate a metric based on a first set of actions performed in response to a first set of outputs from the deployed decision engine.

At operation 812, process 800 determines whether the metric satisfies a criterion modification condition. If the metric does not satisfy the criterion modification condition, process 800 returns to operation 804 to await a new modified rule-based decision engine. If the metric does satisfy the condition, process 800 uses the artificial intelligence model to generate a second deployment criterion that is different from the first deployment criterion.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for updating rule engines using generated proxy models with predefined model deployment criteria that mimics formats and structures of existing rule engines, detecting required rule engine updated using artificial intelligence models that do not require training specific to model components and objectives, and/or generating code for rule engines using artificial intelligence models without requiring training data that is specific to model components and objectives.

2. The method of the preceding embodiment, further comprising: determining a first model deployment criterion; determining, using a first artificial intelligence model, a first modified script for a first modified rule engine based on a first script extracted from a first existing rule engine, wherein the first artificial intelligence model is trained to generate rule engine script based on comparisons of historic script interpretations of historic rule bases for historic rule engines; inputting first rule base data into the first existing rule engine, wherein the first existing rule engine processes the first rule base data to generate a first output; inputting the first rule base data into the first modified rule engine, wherein the first modified rule engine processes the first rule base data with the first modified script to generate a first modified output; determining a first difference between the first output and the first modified output; comparing the first difference to the first model deployment criterion; and determining whether to deploy the first modified rule engine based on comparing the first difference to the first model deployment criterion.

3. The method of any one of the preceding embodiments, wherein determining the first modified script for the first modified rule engine based on the first script extracted from the first existing rule engine further comprises: determining a first scripting language for the first script; determining a first efficiency of the first scripting language; determining a second scripting language that comprises a second efficiency; and determining to generate the first modified script in the second scripting language based on the second efficiency exceeding the first efficiency.

4. The method of any one of the preceding embodiments, wherein determining the first efficiency of the first scripting language further comprises: determining a level of compatibility of the first scripting language with other script in the first existing rule engine; and determining the first efficiency based on the level of compatibility.

5. The method of any one of the preceding embodiments, wherein determining the first efficiency of the first scripting language further comprises: comparing a performance characteristic of the first scripting language with other script in the first existing rule engine; and determining the first efficiency based on the performance characteristic.

6. The method of any one of the preceding embodiments, wherein determining the first modified script for the first modified rule engine based on the first script extracted from the first existing rule engine further comprises: determining a first function in the first script, wherein the first function has a first script length; and determining a second function for the first modified script, wherein the second function has a second script length, and wherein the second script length is shorter than the first script length.

7. The method of any one of the preceding embodiments, wherein determining the first modified script for the first modified rule engine based on the first script extracted from the first existing rule engine further comprises: determining a hard-coded number string in the first script; determining a named constant corresponding to the hard-coded number string; and replacing the hard-coded number string with the named constant in the first modified script.

8. The method of any one of the preceding embodiments, wherein determining the first modified script for the first modified rule engine based on the first script extracted from the first existing rule engine further comprises: determining a first class in the first script; determining a second class corresponding to the first class; and replacing the first class with the second class in the first modified script.

9. The method of any one of the preceding embodiments, wherein determining the first modified script for the first modified rule engine based on the first script extracted from the first existing rule engine further comprises: determining a syntax in the first modified script; and validating the first modified script based on the syntax.

10. The method of any one of the preceding embodiments, wherein determining the first modified script for the first modified rule engine based on the first script extracted from the first existing rule engine further comprises: determining a dependency in the first modified script; and validating the first modified script based on the dependency.

11. The method of any one of the preceding embodiments, wherein determining the first difference between the first output and the first modified output further comprises: determining a first variable in the first output; determining a second variable in the first modified output; and determining the first difference based on the first variable and the second variable.

12. The method of any one of the preceding embodiments, wherein determining the first difference between the first output and the first modified output further comprises: determining a first number of errors in the first output; determining a second number of errors in the first modified output; and determining the first difference based on the first number of errors and the second number of errors.

13. The method of any one of the preceding embodiments, wherein determining the first difference between the first output and the first modified output further comprises: determining a first performance metric for the first existing rule engine in the first output; determining a second performance metric for the first modified rule engine in the first modified output; and determining the first difference based on the first performance metric and the second performance metric.

14. The method of any one of the preceding embodiments, wherein determining the first difference between the first output and the first modified output further comprises: determining a first hit rate for the first existing rule engine in the first output; determining a second hit rate for the first modified rule engine in the first modified output; and determining the first difference based on the first hit rate and the second hit rate.

15. The method of any one of the preceding embodiments, wherein comparing the first difference to the first model deployment criterion further comprises: determining a threshold hit rate difference; and comparing the threshold hit rate difference to the first difference.

16. The method of any one of the preceding embodiments, wherein determining whether to deploy the first modified rule engine based on comparing the first difference to the first model deployment criterion further comprises: replacing the first existing rule engine with the first modified rule engine to generate a second existing rule engine; and determining a second model deployment criterion.

17. The method of any one of the preceding embodiments, further comprising: determining a first model deployment criterion; determining, using a first artificial intelligence model, a first modified script for a first modified rule engine based on a first script extracted from a first existing rule engine, wherein the first artificial intelligence model is trained to generate rule engine script based on comparisons of historic script interpretations of historic rule bases for historic rule engines; determining a first difference between a first output and a first modified output, wherein the first existing rule engine processes first rule base data to generate the first output, and wherein the first modified rule engine processes the first rule base data with the first modified script to generate the first modified output; comparing the first difference between the first output and the first modified output to the first model deployment criterion; and determining whether to deploy the first modified rule engine based on comparing the first difference to the first model deployment criterion.

18. The method of any one of the preceding embodiments, further comprising: retrieving historical data for a first rule engine, wherein the historical data comprises historical inputs used by the first rule engine to generate historical outputs; determining, using a first artificial intelligence model, a first modified input for the first rule engine based on a first data characteristic of a first subset of the historical inputs; inputting the first modified input into the first rule engine, wherein the first rule engine processes the first modified input to generate a first modified output; inputting a first actual input into the first rule engine to generate a first actual output; determining a first difference between the first modified output and the first actual output; comparing the first difference to a first model deployment criterion; and determining whether to deploy a first modified rule engine based on comparing the first difference to the first model deployment criterion.

19. The method of any one of the preceding embodiments, wherein determining the first difference between the first modified output and the first actual output further comprises: determining a first variable in the first modified output; determining a second variable in the first actual output; and determining the first difference based on the first variable and the second variable.

20. The method of any one of the preceding embodiments, wherein determining the first difference between the first modified output and the first actual output further comprises: determining a first number of errors in the first modified output; determining a second number of errors in the first actual output; and determining the first difference based on the first number of errors and the second number of errors.

21. The method of any one of the preceding embodiments, wherein determining the first difference between the first modified output and the first actual output further comprises: determining a first performance metric for the first rule engine in the first modified output; determining a second performance metric for the first rule engine in the first actual output; and determining the first difference based on the first performance metric and the second performance metric.

22. The method of any one of the preceding embodiments, wherein determining the first difference between the first modified output and the first actual output further comprises: determining a first hit rate for the first rule engine in the first actual output; determining a second hit rate for the first rule engine in the first modified output; and determining the first difference based on the first hit rate and the second hit rate.

23. The method of any one of the preceding embodiments, wherein comparing the first difference to the first model deployment criterion further comprises: determining a threshold hit rate difference; and comparing the threshold hit rate difference to the first difference.

24. The method of any one of the preceding embodiments, wherein determining whether to deploy the first modified rule engine based on comparing the first difference to the first model deployment criterion further comprises: replacing the first rule engine with the first modified rule engine to generate a second rule engine; and determining a second model deployment criterion.

25. The method of any one of the preceding embodiments, wherein determining, using the first artificial intelligence model, the first modified input for the first rule engine based on the first data characteristic of the first subset of the historical inputs further comprises: retrieving a first synthetic data generation rule; comparing the first data characteristic to the first synthetic data generation rule; and generating the first modified input based on comparing the first data characteristic to the first synthetic data generation rule.

26. The method of any one of the preceding embodiments, wherein determining, using the first artificial intelligence model, the first modified input for the first rule engine based on the first data characteristic of the first subset of the historical inputs further comprises: determining a first trend in the first subset based on the first data characteristic; determining a second data characteristic based on the first trend; and replacing a first value in the first actual input based on the second data characteristic to generate the first modified input.

27. The method of any one of the preceding embodiments, wherein determining, using the first artificial intelligence model, the first modified input for the first rule engine based on the first data characteristic of the first subset of the historical inputs further comprises: determining a first normal distribution in the first subset based on the first data characteristic; determining a first outlier to the first normal distribution; determining a second data characteristic based on the first outlier; and replacing a first value in the first actual input based on the second data characteristic to generate the first modified input.

28. The method of any one of the preceding embodiments, wherein determining, using the first artificial intelligence model, the first modified input for the first rule engine based on the first data characteristic of the first subset of the historical inputs further comprises: determining a first standard deviation in the first subset based on the first data characteristic; determining a first outlier to the first standard deviation; determining a second data characteristic based on the first outlier; and replacing a first value in the first actual input based on the second data characteristic to generate the first modified input.

29. The method of any one of the preceding embodiments, wherein the first artificial intelligence model is an autoregressive model, and wherein determining, using the first artificial intelligence model, the first modified input for the first rule engine based on the first data characteristic of the first subset of the historical inputs further comprises: predicting a first subsequent element in a sequence of values of the first subset based on the first data characteristic; determining a second data characteristic based on the first subsequent element; and replacing a first value in the first actual input based on the second data characteristic to generate the first modified input.

30. The method of any one of the preceding embodiments, wherein the first artificial intelligence model is a generative adversarial network, and wherein determining, using the first artificial intelligence model, the first modified input for the first rule engine based on the first data characteristic of the first subset of the historical inputs further comprises: predicting a second data characteristic based on the first data characteristic; and replacing a first value in the first actual input based on the second data characteristic to generate the first modified input.

31. The method of any one of the preceding embodiments, wherein the first artificial intelligence model is a variational autoencoder, and wherein determining, using the first artificial intelligence model, the first modified input for the first rule engine based on the first data characteristic of the first subset of the historical inputs further comprises: predicting a first latent space of the first subset based on the first data characteristic; determining a second data characteristic based on the first latent space; and replacing a first value in the first actual input based on the second data characteristic to generate the first modified input.

32. The method of any one of the preceding embodiments, wherein the first artificial intelligence model uses synthetic minority over-sampling, and wherein determining, using the first artificial intelligence model, the first modified input for the first rule engine based on the first data characteristic of the first subset of the historical inputs further comprises: predicting a minority class of the first subset based on the first data characteristic; determining a second data characteristic based on the minority class; and replacing a first value in the first actual input based on the second data characteristic to generate the first modified input.

33. The method of any one of the preceding embodiments, further comprising: identifying a first characteristic for a first artificial intelligence model, wherein the first artificial intelligence model comprises a plurality of characteristics; determining, using a second artificial intelligence model, a second characteristic for replacing the first characteristic in the first artificial intelligence model, wherein the second artificial intelligence model is trained to generate characteristic modifications based on detected patterns between labeled inputs to the first artificial intelligence model and characteristics used to process the labeled inputs; processing a first input through the first artificial intelligence model using the first characteristic to generate a first output; processing a second input through the first artificial intelligence model using the second characteristic to generate a second output; determining a first difference between the first output and the second output; and determining whether to replace the first characteristic with the second characteristic in the first artificial intelligence model based on the first difference by deploying first modified script in the first artificial intelligence model corresponding to the second characteristic.

34. The method of any one of the preceding embodiments, wherein identifying the first characteristic for the first artificial intelligence model comprises retrieving a first script for a first artificial intelligence model, and wherein the first script processes historical inputs to a first rule engine to generate historical outputs.

35. The method of any one of the preceding embodiments, further comprising: comparing the first difference to a first criterion; determining a second difference between the first characteristic and the second characteristic; comparing the second difference to a second criterion; and further determining whether to replace the first characteristic with the second characteristic based on the second difference.

36. The method of any one of the preceding embodiments, wherein the first criterion indicates a threshold similarity between two outputs required to deploy script modifications, and wherein the second criterion indicates a threshold difference between two characteristics required to deploy script modifications.

37. The method of any one of the preceding embodiments, wherein determining whether to deploy the first modified script in the first artificial intelligence model based on comparing the first difference to the first criterion and comparing the second difference to the second criterion further comprises: retrieving a first value corresponding to the threshold similarity; determining whether the first difference exceeds the first value; retrieving a second value corresponding to the threshold difference; determining whether the first difference exceeds the second value; and determining to deploy the first modified script in the first artificial intelligence model based on the first difference exceeding the first value and the second difference not exceeding the second value.

38. The method of any one of the preceding embodiments, wherein determining whether to deploy the first modified script in the first artificial intelligence model based on comparing the first difference to the first criterion and comparing the second difference to the second criterion further comprises: retrieving a first value corresponding to the threshold similarity; determining whether the first difference exceeds the first value; retrieving a second value corresponding to the threshold difference; determining whether the first difference exceeds the second value; and determining not to deploy the first modified script in the first artificial intelligence model based on the first difference not exceeding the first value or the second difference exceeding the second value.

39. The method of any one of the preceding embodiments, further comprising: determining to deploy the first modified script; and deploying the first modified script by replacing the first characteristic with the second characteristic.

40. The method of any one of the preceding embodiments, wherein processing the first input through the first artificial intelligence model using the first characteristic to generate the first output further comprises: retrieving a component identifier for a first model component in the first artificial intelligence model; determining a first hit rate for the component identifier; and determining the first characteristic based on the first hit rate.

41. The method of any one of the preceding embodiments, wherein processing the first input through the first artificial intelligence model using the first characteristic to generate the first output further comprises: retrieving a component identifier for a first model component in the first artificial intelligence model; retrieving an event log for components used by the first artificial intelligence model while processing the first input; and comparing the event log to the component identifier to determine the first characteristic.

42. The method of any one of the preceding embodiments, wherein determining, using the second artificial intelligence model, the second characteristic further comprises: determining a first function in first script for the first artificial intelligence model, wherein the first function has a first script length; determining the first characteristic based on the first function; and determining a second function for the first modified script, wherein the second function has a second script length, and wherein the second script length is shorter than the first script length.

43. The method of any one of the preceding embodiments, wherein determining, using the second artificial intelligence model, the second characteristic further comprises: determining a hard-coded number string in first script for the first artificial intelligence model; determining a named constant corresponding to the hard-coded number string; and replacing the hard-coded number string with the named constant in the first modified script.

44. The method of any one of the preceding embodiments, wherein determining, using the second artificial intelligence model, the second characteristic further comprises: determining a first class in first script for the first artificial intelligence model; determining the first characteristic based on the first class; determining a second class corresponding to the first class; and replacing the first class with the second class in the first modified script.

45. The method of any one of the preceding embodiments, wherein determining the first difference between the first output and the second output further comprises: determining a first variable in the first output; determining a second variable in the second output; and determining the first difference based on the first variable and the second variable.

46. The method of any one of the preceding embodiments, wherein determining the first difference between the first output and the second output further comprises: determining a first number of errors in the first output; determining a second number of errors in the second output; and determining the first difference based on the first number of errors and the second number of errors.

47. The method of any one of the preceding embodiments, further comprising: determining a script language of first script for the first artificial intelligence model; and selecting the second artificial intelligence model from a plurality of artificial intelligence models based on the second artificial intelligence model comprising a large language model trained on the script language.

48. A method for updating rule-based decision engines during software development, comprising: accessing a first deployment criterion; at each of a plurality of intervals: accessing a first existing rule-based decision engine and a first modified rule-based decision engine, wherein the first modified rule-based decision engine include an actionable rule that was generated by an artificial intelligence model based on the first existing rule-based decision engine; determining a first difference between a first output and a first modified output, wherein the first existing rule-based decision engine processes a first data item to generate the first output, and wherein the first modified rule-based decision engine processes the first data item with the actionable rule to generate the first modified output; deploying a first selected rule-based decision engine to process subsequent data items to produce subsequent outputs, wherein deploying the first selected rule-based decision engine comprises: deploying the first existing rule-based decision engine when the first difference does not satisfy the first deployment criterion, and deploying the first modified rule-based decision engine when the first difference satisfies the first deployment criterion; generating a metric based on the subsequent outputs; and when the metric satisfies a criterion modification condition, using the artificial intelligence model to generate a second deployment criterion, wherein a second selected rule-based decision engine is deployed based on a comparison between the second deployment criterion and a second difference between: (i) a second output generated by a second existing rule-based decision engine and (ii) a second modified output generated by a second modified rule-based decision engine.

49. The method of any one of the preceding embodiments, wherein generating the metric based on the subsequent outputs comprises: comparing a first set of outputs from the first existing rule-based decision engine to a second set of outputs from the first modified rule-based decision engine; and generating the metric based on the comparison.

50. The method of any of the previous embodiments, wherein generating the metric based on the subsequent outputs comprises: detecting a first set of actions performed in response to a first set of outputs from the first selected rule-based decision engine; and generating the metric based on the first set of actions.

51. The method of any of the previous embodiments, wherein the first set of actions comprise actions authorizing requested transactions, and wherein generating the metric based on the first set of actions comprises: detecting an incidence of fraudulent transactions from among the authorized transactions; and computing a profitability of the first set of actions based on a revenue received from each authorized transaction and based on losses incurred from the fraudulent transactions.

52. The method of any one of the preceding embodiments, wherein the criterion modification condition specifies a threshold profitability, and wherein the artificial intelligence model is used to generate the second deployment criterion in response to the computed profitability being less than the threshold profitability.

53. The method of any of the previous embodiments, wherein the artificial intelligence model is a large language model (LLM), and wherein the method further comprises: generating a prompt to the LLM to cause the LLM to generate the rule data, wherein the prompt identifies one or more data sources, and wherein the LLM is configured to use the one or more data sources when generating the rule data.

54. The method of any of the previous embodiments, wherein the artificial intelligence model is a large language model (LLM), and wherein the method further comprises: generating a prompt to the LLM that instructs the LLM to generate: the rule data to enact a rule, and a reasoned explanation for the rule.

55. The method of any of the previous embodiments, wherein the first deployment criterion comprises a first threshold to which the first difference is compared; and wherein the second deployment criterion comprises a second threshold, different from the first threshold, to which the second difference is compared.

56. The method of any of the previous embodiments, wherein the first deployment criterion comprises a set of first thresholds to which each of a plurality of first differences between the first output and the first modified output are compared; and wherein the second deployment criterion comprises at least one of: a modification of one of the first thresholds in the set of first thresholds to a second threshold; an addition of a second threshold to the set of first thresholds; or a removal of one of the first thresholds from the set of first thresholds.

57. The method of any of the previous embodiments, further comprising: identifying a first component for a first artificial intelligence system, wherein the first artificial intelligence system comprises a plurality of components, and wherein the first artificial intelligence system comprises a first model architecture; determining a first function for the first component in the first artificial intelligence system; determining a first configuration location for the first component in the first model architecture; selecting, using a second artificial intelligence model, a second component from a plurality of available components based on the first function and the first configuration location, wherein the second artificial intelligence system is trained to select substitute components based on matching characteristics of known components and known artificial intelligence systems; and modifying the first artificial intelligence system by replacing the first component with the second component.

58. The method of any of the previous embodiments, wherein the first component comprises an architecture component, and wherein identifying the first function for the first ensemble component in the first artificial intelligence system further comprises: determining a model layer corresponding to the architecture component; and identifying the first function based on the layer.

59. The method of any of the previous embodiments, wherein determining the model layer corresponding to the architecture component further comprises: determining an activation function for the architecture component; and determining the model layer based on the activation function.

60. The method of any of the previous embodiments, wherein the first component comprises an ensemble component, and wherein identifying the first function for the first ensemble component in the first artificial intelligence system further comprises: determining a plurality of ensemble models in the first artificial intelligence system; determining an ensemble function for a first ensemble model in the plurality of ensemble models; and identifying the first function based on the ensemble function.

61. The method of any of the previous embodiments, wherein determine the ensemble function for the first ensemble model in the plurality of ensemble models further comprises: determining an ensemble output from the first ensemble model; and determining the first ensemble function based on the ensemble output.

62. The method of any of the previous embodiments, wherein determining the first configuration location for the first component in the first model architecture further comprises: determining a first setting for the first component; and determining the first configuration location based on the first setting.

63. The method of any of the previous embodiments, wherein determining the first setting for the first component further comprises: determining a learning rate for the first component; and determining the first setting based on the learning rate.

64. The method of any of the previous embodiments, wherein determining the first setting for the first component further comprises: determining a first hyperparameter for the first component; and determining the first setting based on the first hyperparameter.

65. The method of any of the previous embodiments, wherein determining the first setting for the first component further comprises: determining a first filter size for the first component; and determining the first setting based on the first filter size.

66. The method of any of the previous embodiments, wherein determining the first configuration location for the first component in the first model architecture further comprises: determining a first placement for the first component; and determining the first configuration location based on the first placement.

67. The method of any of the previous embodiments, wherein modifying the first artificial intelligence system by replacing the first component with the second component further comprises: determining an input interface for the first component; determining an output interface for the first component; preserving the input interface and the output interface; and disconnecting the first component from the first artificial intelligence system.

68. The method of any of the previous embodiments, wherein modifying the first artificial intelligence system by replacing the first component with the second component further comprises: determining a first data format for the first component; determining a second data format for the second component; determining a format difference between the first data format and the second data format; determining a compatibility of the second data format based on determining the format difference.

69. The method of any of the previous embodiments, wherein modifying the first artificial intelligence system by replacing the first component with the second component further comprises: determining a first data dimension for the first component; determining a second data dimension for the second component; and converting the first data dimension to the second data dimension.

70. The method of any of the previous embodiments, wherein modifying the first artificial intelligence system by replacing the first component with the second component further comprises: determining a first output specification for the first component; determining a second output specification for the second component; and mapping the second output specification to match the first output specification.

71. One or more non-transitory, computer-readable mediums storing instructions that, when executed by a data processing apparatus, cause the data processing apparatus to perform operations comprising those of any of embodiments 1-70.

72. A system comprising one or more processors; and memory storing instructions that, when executed by the processors, cause the processors to effectuate operations comprising those of any of embodiments 1-70.

73. A system comprising means for performing any of embodiments 1-70.

What is claimed is:

1. A system for detecting required rule engine updated using artificial intelligence models that do not require training specific to model components and objectives, the system comprising:
one or more processors; and
one or more non-transitory, computer-readable media comprising instructions recorded thereon that when executed by the one or more processors cause operations comprising:
retrieving historical data for a first rule engine, wherein the historical data comprises historical inputs used by the first rule engine to generate historical outputs, wherein the historical data comprises processing data traversing a cloud computing network, and wherein the first rule engine comprises processing rules for directing processing requests through the cloud computing network;
determining, using a first artificial intelligence model, a first trend in a first subset of the historical inputs, wherein the first artificial intelligence model does not require the historical data for training;
determining a first data characteristic for the first subset based on the first trend;
retrieving a first actual input for the first rule engine, wherein the first actual input is processed by the first rule engine to generate a first actual output, and wherein the first actual input comprises data for a processing request being processed through the cloud computing network;
replacing a first value in a first actual input based on the first data characteristic to generate a first modified input;
inputting the first modified input into the first rule engine, wherein the first rule engine processes the first modified input to generate a first modified output;
determining a first difference between the first modified output and the first actual output, wherein determining the first difference between the first modified output and the first actual output further comprises:
determining a first variable in the first modified output;
determining a second variable in the first actual output; and
determining the first difference based on the first variable and the second variable;
comparing the first difference to a first model deployment criterion; and
determining whether to deploy a first modified rule engine based on comparing the first difference to the first model deployment criterion, wherein the first model deployment criterion corresponds to a requirement for an update to the first rule engine.

2. A method for detecting required rule engine updated using artificial intelligence models that do not require training specific to model components and objectives, the method comprising:
retrieving historical data for a first rule engine, wherein the historical data comprises historical inputs used by the first rule engine to generate historical outputs;

determining, using a first artificial intelligence model, a first modified input for the first rule engine based on a first data characteristic of a first subset of the historical inputs;
inputting the first modified input into the first rule engine, wherein the first rule engine processes the first modified input to generate a first modified output;
inputting a first actual input into the first rule engine to generate a first actual output;
determining a first difference between the first modified output and the first actual output, wherein determining the first difference between the first modified output and the first actual output further comprises:
determining a first variable in the first modified output:
determining a second variable in the first actual output; and
determining the first difference based on the first variable and the second variable;
comparing the first difference to a first model deployment criterion; and
determining whether to deploy a first modified rule engine based on comparing the first difference to the first model deployment criterion.

3. The method of claim 2, wherein determining the first difference between the first modified output and the first actual output further comprises:
determining a first number of errors in the first modified output;
determining a second number of errors in the first actual output; and
determining the first difference based on the first number of errors and the second number of errors.

4. The method of claim 2, wherein determining the first difference between the first modified output and the first actual output further comprises:
determining a first performance metric for the first rule engine in the first modified output;
determining a second performance metric for the first rule engine in the first actual output; and
determining the first difference based on the first performance metric and the second performance metric.

5. The method of claim 2, wherein determining the first difference between the first modified output and the first actual output further comprises:
determining a first hit rate for the first rule engine in the first actual output;
determining a second hit rate for the first rule engine in the first modified output; and
determining the first difference based on the first hit rate and the second hit rate.

6. The method of claim 5, wherein comparing the first difference to the first model deployment criterion further comprises:
determining a threshold hit rate difference; and
comparing the threshold hit rate difference to the first difference.

7. The method of claim 2, wherein determining whether to deploy the first modified rule engine based on comparing the first difference to the first model deployment criterion further comprises:
replacing the first rule engine with the first modified rule engine to generate a second rule engine; and
determining a second model deployment criterion.

8. The method of claim 2, wherein determining, using the first artificial intelligence model, the first modified input for the first rule engine based on the first data characteristic of the first subset of the historical inputs further comprises:
retrieving a first synthetic data generation rule;
comparing the first data characteristic to the first synthetic data generation rule; and
generating the first modified input based on comparing the first data characteristic to the first synthetic data generation rule.

9. The method of claim 2, wherein determining, using the first artificial intelligence model, the first modified input for the first rule engine based on the first data characteristic of the first subset of the historical inputs further comprises:
determining a first trend in the first subset based on the first data characteristic;
determining a second data characteristic based on the first trend; and
replacing a first value in the first actual input based on the second data characteristic to generate the first modified input.

10. The method of claim 2, wherein determining, using the first artificial intelligence model, the first modified input for the first rule engine based on the first data characteristic of the first subset of the historical inputs further comprises:
determining a first normal distribution in the first subset based on the first data characteristic;
determining a first outlier to the first normal distribution;
determining a second data characteristic based on the first outlier; and
replacing a first value in the first actual input based on the second data characteristic to generate the first modified input.

11. The method of claim 2, wherein determining, using the first artificial intelligence model, the first modified input for the first rule engine based on the first data characteristic of the first subset of the historical inputs further comprises:
determining a first standard deviation in the first subset based on the first data characteristic;
determining a first outlier to the first standard deviation;
determining a second data characteristic based on the first outlier; and
replacing a first value in the first actual input based on the second data characteristic to generate the first modified input.

12. The method of claim 2, wherein the first artificial intelligence model is an autoregressive model, and wherein determining, using the first artificial intelligence model, the first modified input for the first rule engine based on the first data characteristic of the first subset of the historical inputs further comprises:
predicting a first subsequent element in a sequence of values of the first subset based on the first data characteristic;
determining a second data characteristic based on the first subsequent element; and
replacing a first value in the first actual input based on the second data characteristic to generate the first modified input.

13. The method of claim 2, wherein the first artificial intelligence model is a generative adversarial network, and wherein determining, using the first artificial intelligence model, the first modified input for the first rule engine based on the first data characteristic of the first subset of the historical inputs further comprises:
predicting a second data characteristic based on the first data characteristic; and
replacing a first value in the first actual input based on the second data characteristic to generate the first modified input.

14. The method of claim 2, wherein the first artificial intelligence model is a variational autoencoder, and wherein determining, using the first artificial intelligence model, the first modified input for the first rule engine based on the first data characteristic of the first subset of the historical inputs further comprises:
   predicting a first latent space of the first subset based on the first data characteristic;
   determining a second data characteristic based on the first latent space; and
   replacing a first value in the first actual input based on the second data characteristic to generate the first modified input.

15. The method of claim 2, wherein the first artificial intelligence model uses synthetic minority over-sampling, and wherein determining, using the first artificial intelligence model, the first modified input for the first rule engine based on the first data characteristic of the first subset of the historical inputs further comprises:
   predicting a minority class of the first subset based on the first data characteristic;
   determining a second data characteristic based on the minority class; and
   replacing a first value in the first actual input based on the second data characteristic to generate the first modified input.

16. One or more non-transitory, computer-readable media comprising instructions recorded thereon that when executed by one or more processors cause operations comprising:
   retrieving historical data for a first rule engine, wherein the historical data comprises historical inputs used by the first rule engine to generate historical outputs;
   determining, using a first artificial intelligence model, a first modified input for the first rule engine based on a first data characteristic of a first subset of the historical inputs;
   inputting the first modified input into the first rule engine, wherein the first rule engine processes the first modified input to generate a first modified output;
   inputting a first actual input into the first rule engine to generate a first actual output;
   determining a first difference between the first modified output and the first actual output, wherein determining the first difference between the first modified output and the first actual output further comprises:
      determining a first variable in the first modified output;
      determining a second variable in the first actual output; and
      determining the first difference based on the first variable and the second variable;
   comparing the first difference to a first model deployment criterion; and
   determining whether to deploy a first modified rule engine based on comparing the first difference to the first model deployment criterion.

17. The one or more non-transitory, computer-readable media of claim 16, wherein determining the first difference between the first modified output and the first actual output further comprises:
   determining a first number of errors in the first modified output;
   determining a second number of errors in the first actual output; and
   determining the first difference based on the first number of errors and the second number of errors.

18. The one or more non-transitory, computer-readable media of claim 16, wherein determining the first difference between the first modified output and the first actual output further comprises:
   determining a first performance metric for the first rule engine in the first modified output;
   determining a second performance metric for the first rule engine in the first actual output; and
   determining the first difference based on the first performance metric and the second performance metric.

* * * * *